United States Patent [19]
Miyazawa et al.

[11] Patent Number: 5,761,560
[45] Date of Patent: Jun. 2, 1998

[54] INTERCHANGEABLE LENS HAVING A DATA OUTPUTTING FUNCTION

[75] Inventors: Masayuki Miyazawa, Sakai; Masayuki Ueyama, Takarazuka; Yasuaki Serita, Sakai; Yoshihiro Hara, Kishiwada, all of Japan

[73] Assignee: Minolta Co., Ltd., Osaka, Japan

[21] Appl. No.: 708,903

[22] Filed: Sep. 5, 1996

Related U.S. Application Data

[63] Continuation of Ser. No. 263,959, Jun. 16, 1994, abandoned, which is a continuation of Ser. No. 889,116, May 27, 1992, abandoned.

[30] Foreign Application Priority Data

May 28, 1991 [JP] Japan ................................. 3-153992
May 28, 1991 [JP] Japan ................................. 3-153993

[51] Int. Cl.$^6$ .................................................. G03B 17/00
[52] U.S. Cl. ............................................................ 396/532
[58] Field of Search ................................... 396/529, 531, 396/532; 348/360, 361

[56] References Cited

U.S. PATENT DOCUMENTS

| | | | |
|---|---|---|---|
| 4,560,267 | 12/1985 | Nakai et al. | 396/532 |
| 4,896,181 | 1/1990 | Saegusa | 354/286 |
| 4,945,376 | 7/1990 | Kawasaki et al. | 354/400 |
| 5,003,399 | 3/1991 | Ishimaru et al. | 358/209 |
| 5,060,005 | 10/1991 | Itoh et al. | 354/412 |
| 5,117,246 | 5/1992 | Takahashi et al. | 354/202 |
| 5,157,431 | 10/1992 | Mabuchi et al. | 354/286 |
| 5,166,717 | 11/1992 | Kawasaki et al. | 354/195.11 |
| 5,214,464 | 5/1993 | Karasaki et al. | 354/286 |

*Primary Examiner*—Safet Metjahic
*Assistant Examiner*—Nicholas J. Tuccillo
*Attorney, Agent, or Firm*—Burns, Doane, Swecker & Mathis, LLP

[57] ABSTRACT

A camera system includes a camera body and an interchangeable lens. A microcomputer for operation control is provided on each of the camera body and the interchangeable lens. Data communication is performed between the microcomputers. The camera body transmits a signal representing the type of the camera body to the interchangeable lens, and based on the signal, the interchangeable lens chooses a data to be communicated.

19 Claims, 45 Drawing Sheets

Fig. 6A AF LOCK
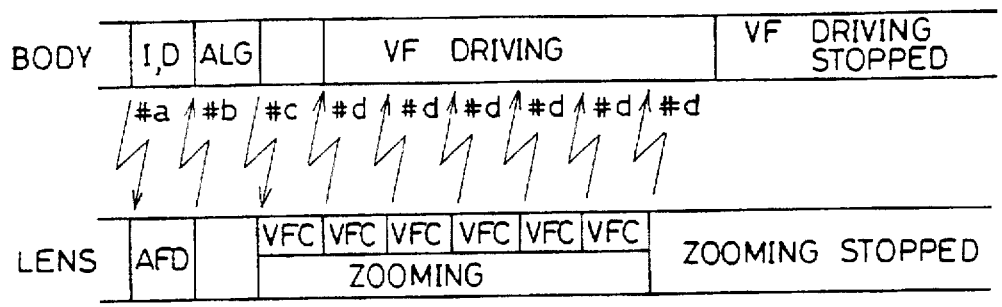
Fig. 6B CONTINUOUS AF
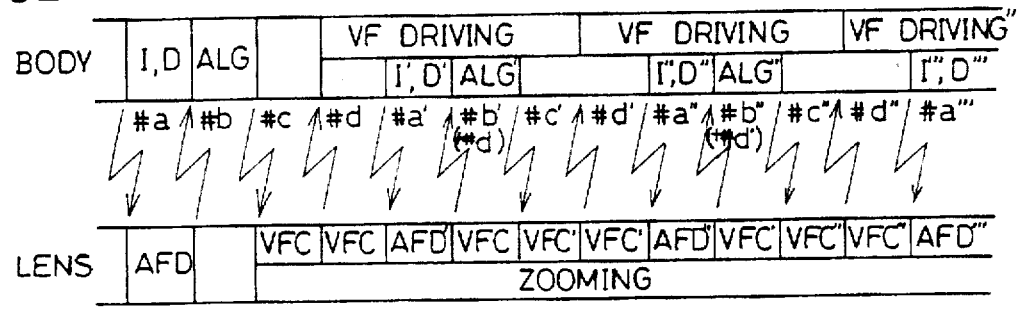
Fig. 7
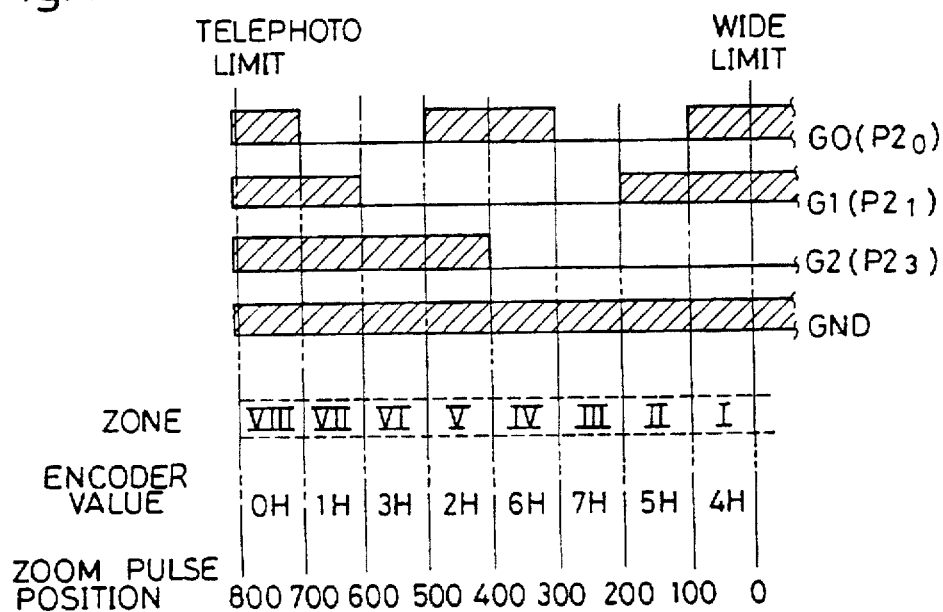

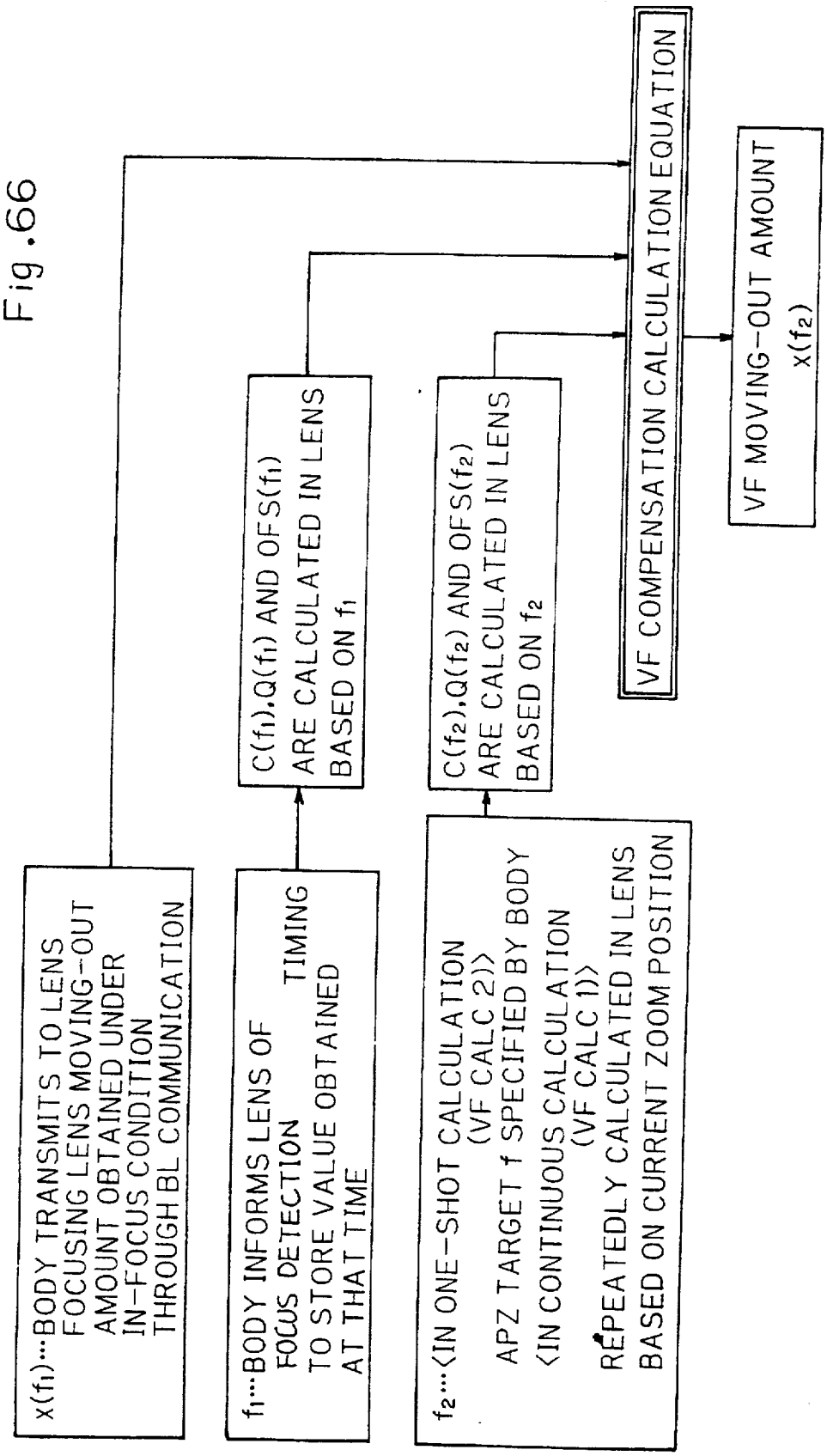

ONE-SHOT CALCULATION

501 CALCULATION RESULT

500 IDEAL MOVING-OUT AMOUNT

502 ACTUAL MOVING-OUT AMOUNT

CONTINUOUS CALCULATION

INTERCHANGEABLE LENS HAVING A DATA OUTPUTTING FUNCTION

This application is a continuation of application Ser. No. 08/263,959, filed Jun. 16, 1994, which is a continuation of application Ser. No. 07/889,116, filed May 27, 1992 both now abandoned.

BACKGROUND OF THE INVENTION

1. Field of the Invention

The present invention relates to a camera system, a camera body and an interchangeable lens where data communication can be performed between a camera body and an interchangeable lens.

2. Description of the Related Art

Conventionally, an interchangeable lens has been proposed which includes a ROM (read only memory) storing a data showing a characteristic of the lens and which can output the data to a camera body. Further, an interchangeable lens system has been proposed where the lens is provided with a microcomputer therein which performs data communication with a microcomputer provided in a camera body, where the microcomputer provided in the camera body controls an operation of the camera body based on a plurality of kinds of data supplied from the lens and where the microcomputer provided in the lens controls a predetermined operation of the interchangeable lens based on a plurality of kinds of data supplied from the camera body.

For the camera body of the interchangeable lens, assume that there are two types: a type which can perform communication with respect to all of the plurality of kinds of data (this type will hereinafter be referred to as a first type) and a type where communication functions with respect to a part of the above data are omitted for the purpose of reducing the cost (this type will hereinafter be referred to as a second type). The interchangeable lens is attachable to either type. When the interchangeable lens is attached to the second type camera body and the microcomputer provided in the lens tries to perform communication of the data that the second-type camera cannot communicate, the time required for the communication is completely wasted. Moreover, unnecessary data may be inputted into the second type camera body which may cause a misoperation.

SUMMARY OF THE INVENTION

An object of the present invention is to provide a camera system, a camera body and an interchangeable lens where the above-described problem does not occur.

The present invention is characterized in that a signal representing a type of the camera body is transmitted from the camera body to the interchangeable lens and that the interchangeable lens chooses communication data based on the signal. According to the present invention, no unnecessary communication is performed. Moreover, no unnecessary data is inputted into the camera body.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIGS. 6A and 6B show room drive sequences.

FIG. 7 shows an arrangement of an absolute zoom encoder.

FIG. 66 is a view for explaining a varifocal compensation calculation.

DESCRIPTION OF THE PREFERRED EMBODIMENT

Figure 1:
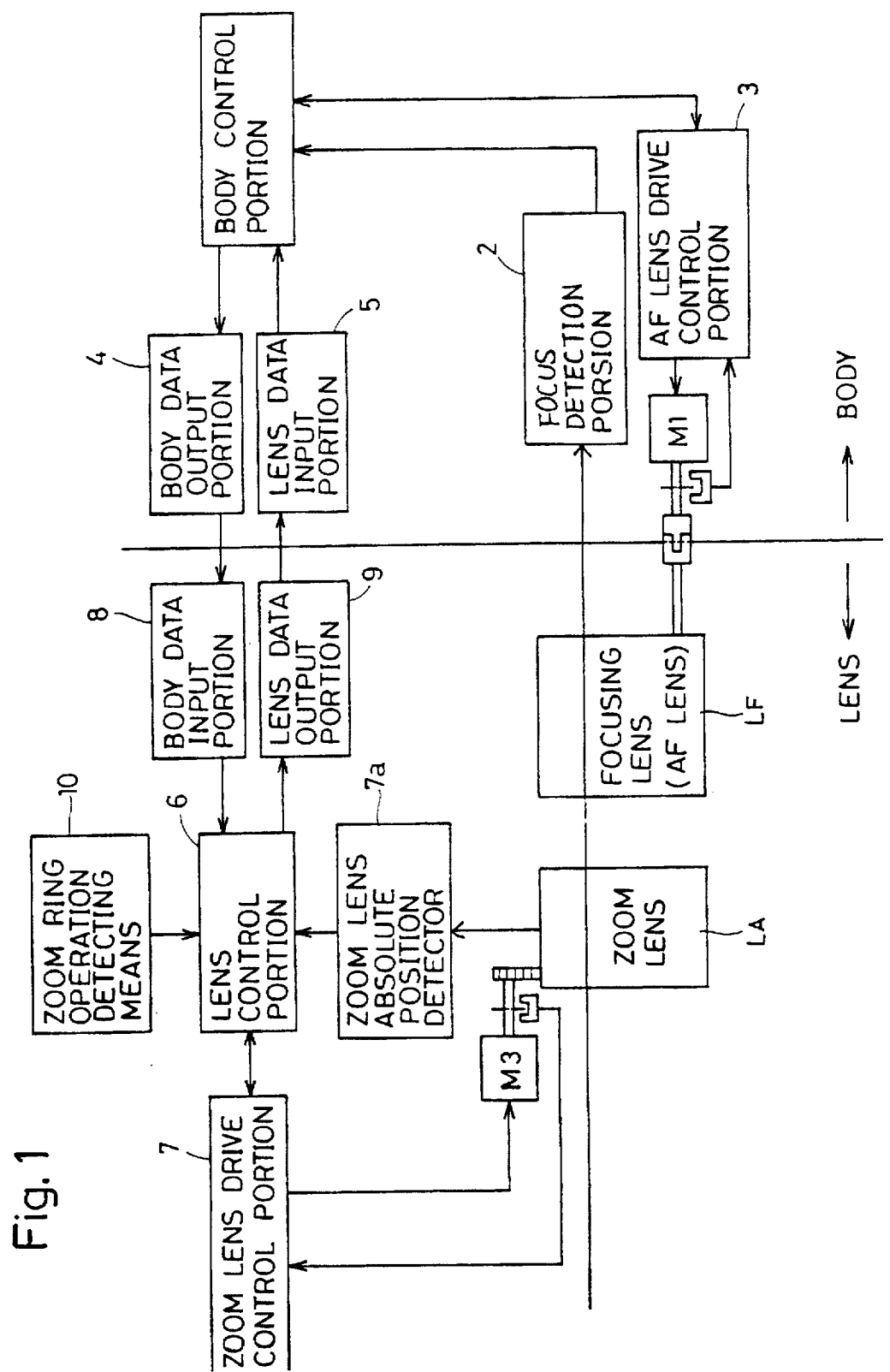
FIG. 1 is a block diagram of a camera system which is an embodiment of the present invention.

A single-lens reflex camera system provided with an interchangeable lens where a focal length can be changed by a motor will hereinafter be described as an embodiment of the present invention. FIG. 1 is a block diagram of the camera system. A camera body is provided with a function of calculating a focusing lens drive amount based on a data inputted to a control portion 1 by a focus detection portion 2 to automatically perform focusing by moving a focusing lens system (hereinafter referred to as AF lens) by activating a motor M1 through an AF lens drive control portion 3 and a function of causing a lens to operate under control of the camera body through communication between a body data output portion 4 and a lens data input portion 5.

The lens is provided with a function of moving a zoom lens LA to perform zooming by activating a motor M3 through a zoom lens drive control portion 7 when an operation of a zoom ring is detected by zoom ring operation detecting means 10 and the direction thereby is detected by a lens control portion 6 (this function will hereinafter be referred to as power zoom), a function of outputting a lens data through communication between a body data output portion 8 and a lens data input portion 9 and a function of operating according to a data transmitted from the camera body. During zooming, a detection signal from a zoom lens absolute position detector 7a is inputted to the lens control portion 6.

Figure 2A:
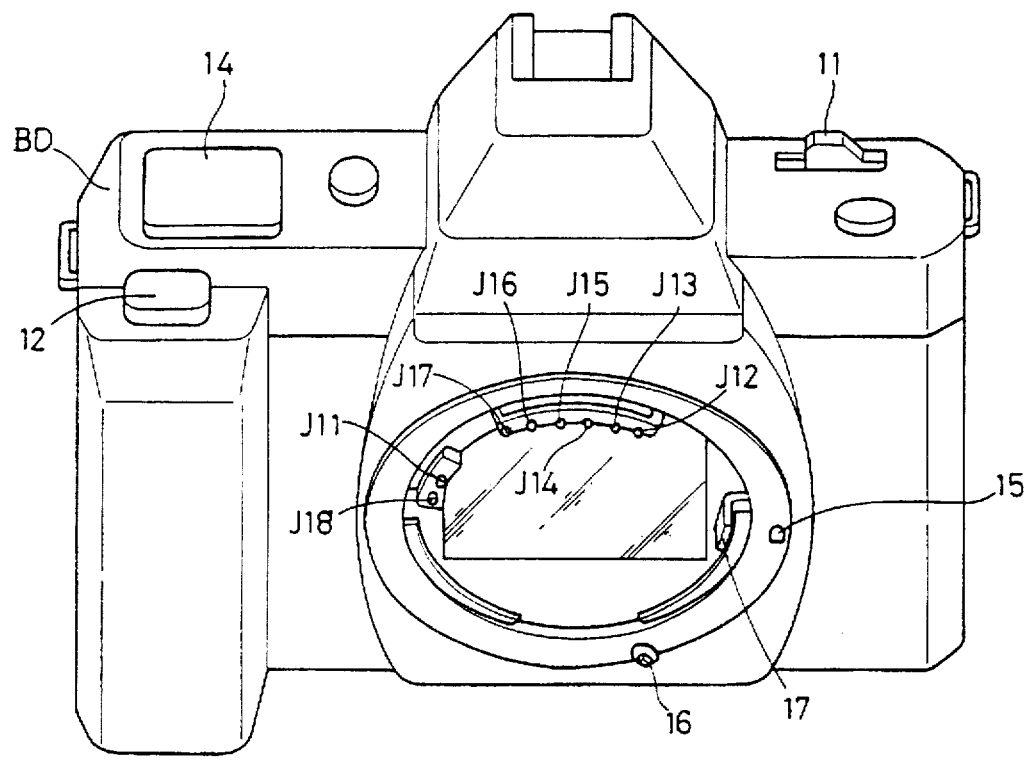
FIG. 2A shows an appearance of a camera body of the camera system of FIG. 1.
Figure 2B:
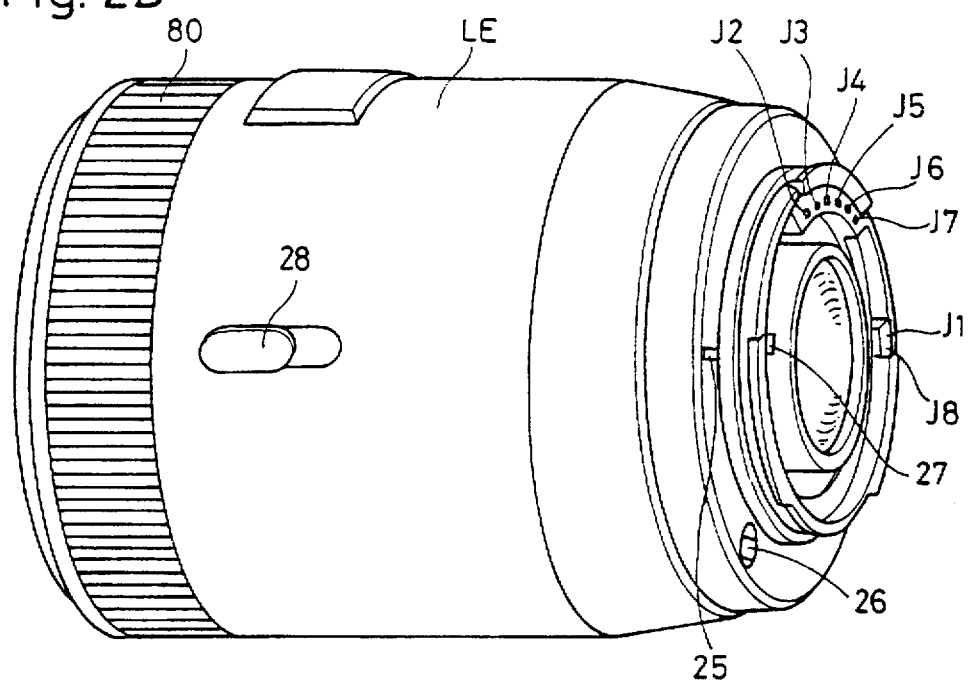
FIG. 2B shows an appearance of a lens of the camera system of FIG. 1.

Subsequently, appearances of the camera body and the lens will be described. FIG. 2A shows an appearance of a camera body BD embodying the present invention. FIG. 2B shows an appearance of an interchangeable lens LE which is interchangeably attached to the camera body BD. A designation and function of each portion will hereinafter be described. The numeral 11 is a slider for turning on and off a main switch SM and an auto program zoom switch APZSW. When the slider 11 is placed at its OFF position, the camera body BD is under inoperable condition. When the slider 11 is placed at its ON position, the camera body BD is under operable condition and a condition where auto program is inhibited. When the slider 11 is placed at its APZON position, the camera body is under a condition where auto program zoom is possible. Auto program zoom is an operation where zooming is automatically performed so that the camera automatically obtains a suitable magnification according to a subject distance.

The numeral 12 is a release button. By depressing it halfway, a subsequently-described photographing preparation switch S1 is turned ON to start a photometry, an exposure calculation and an AF (automatic focusing) operations. By depressing the release button 12 all the way down, a subsequently-described release switch S2 is turned on to start an exposure control operation. The numeral 14 is a body display portion for displaying a shutter speed, an aperture value, information on switches and battery condition. A finder display portion (not shown) displays a shutter speed and a photographing frame. The numeral 15 is a mount lock pin for locking the interchangeable lens LE mounted on the camera body BD. When the interchangeable lens LE attached to the camera body BD is set to a mount lock condition, a subsequently-described lens attachment switch SLE is turned off. Otherwise, the lens attachment switch SLE is ON. The numeral 16 is an AF coupler which is rotated based on a rotation of an AF motor provided in the camera body BD. The numeral 17 is a stop-down lever for closing the aperture of the interchangeable lens LE by stop-down steps obtained by the camera body BD.

Subsequently, a designation and function of each portion of the interchangeable lens LE will be described.

The numeral 25 is a mount lock groove. The numeral 26 is an AF coupler. The numeral 27 is a stop-down lever. When the interchangeable lens LE is attached to the camera body BD, the mount lock pin 15 of the camera body BD engages with the mount lock groove 25, and a convex portion of the AF coupler 16 of the camera body BD engages with a concave portion of the AF coupler 26 of the lens LE, so that a rotation of the AF motor of the camera body BD is transmitted to the lens LE through the AF couplers 16 and 26 to move the AF lens to perform focusing. Further, terminals J1 to J8 of the lens LE are connected to terminals J11 to J18 of the camera body BD. Moreover, the stop-down lever 17 of the camera body BD engages with the stop-down lever 27 of the lens LE, so that the stop-down lever 27 of the lens LE moves by a movement amount of the stop-down lever 17 of the camera body BD in synchronization with the movement of the stop-down lever 17 to control an aperture so as to be a value corresponding to the movement amount of the stop-down levers 17 and 27.

The numeral 28 is a slider for turning on and off a power zoom/manual zoom selection switch SPZ and for coupling and uncoupling a zoom drive system clutch provided in the lens LE. When it is slid toward a power zoom side, a clutch is coupled to enable a motor-operated power zoom. When it is slid toward a manual zoom side, the clutch is uncoupled to enable manual zoom. At this time, power zoom is disabled.

The numeral 80 is a zoom ring (operation member). By operating it along the optical axis, power zoom or power focus is specified. By operating it about the optical axis, a direction and amount of power zoom or power focus are specified.

Subsequently, a circuit arrangement of the camera system will be described.

Figure 3:
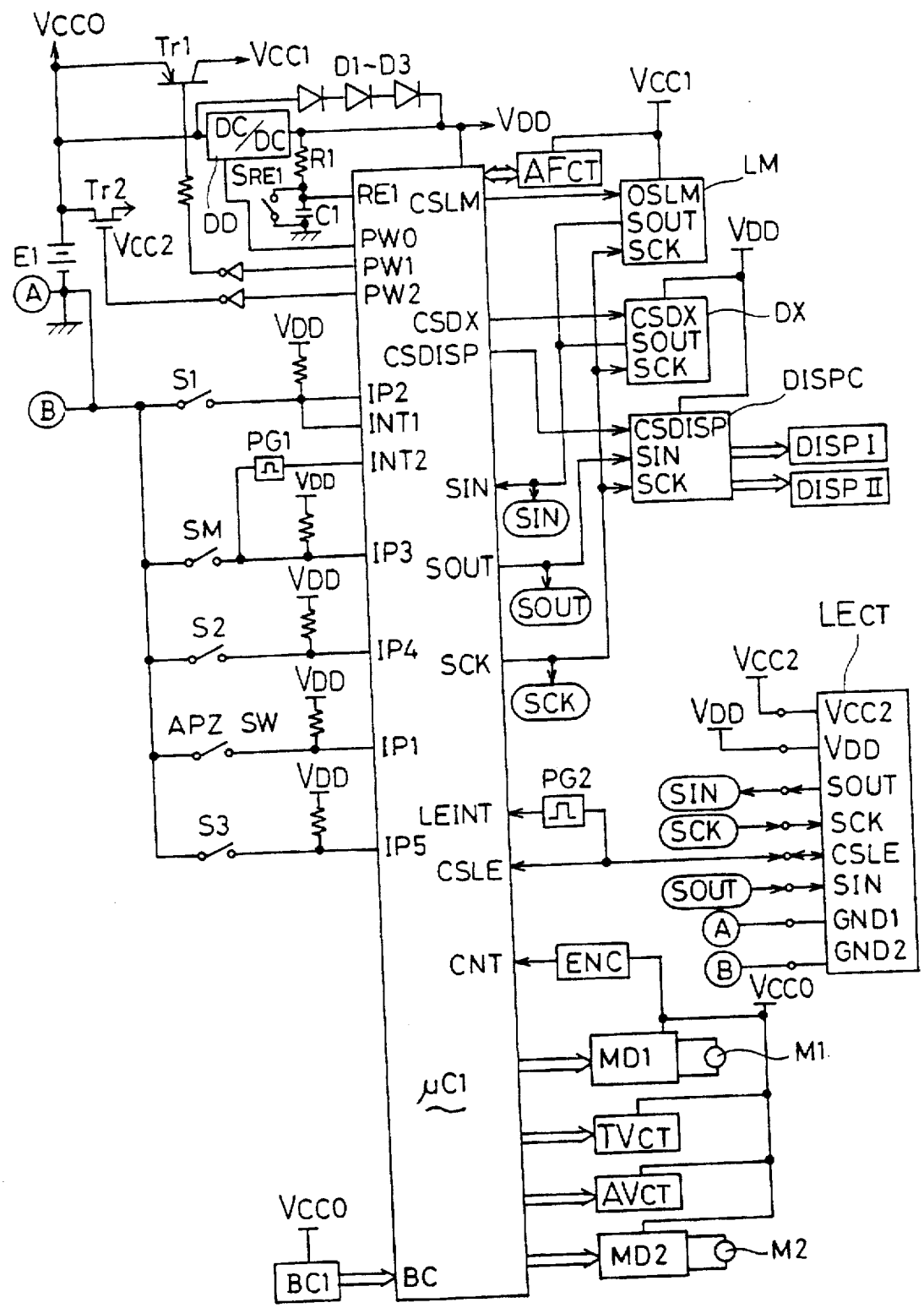
FIG. 3 is a circuit diagram of the camera body of the camera system of FIG. 1.

FIG. 3 is a circuit diagram of an intra-body circuit provided in the camera body BD. µC1 is an intra-body microcomputer which controls the entire camera system and performs various calculations. AFCT is a focus detection light receiving circuit, which is connected to the intra-body microcomputer µC1 through a data bus, provided with a CCD (charge coupled device) which serves as an integration-type focus detection optical sensor for accumulating an optical charge for a predetermined period of time, a CCD drive circuit and a circuit for processing and A/D (analog to digital)-converting an output of the CCD to supply it to the intra-body microcomputer µC1 (this process will hereinafter be referred to as data dump or dump). Through the focus detection light receiving circuit AFCT, information on a focus deviation amount (defocus amount) of a subject located in a focus detection area is obtained. LM is a photometry circuit, which is provided on a finder optical path, for A/D converting a photometry value thereof to provided it to the intra-body microcomputer µC1 as luminance information of a subject.

DX is a film sensitivity reading circuit for reading a data which is provided on a film holder on film sensitivity to serially output it to the intra-body microcomputer µC1. DISPC is a display circuit for receiving a display data and a display control signal from the intra-body microcomputer µC1 to cause a camera body display portion DISP1 (the display portion 14 of FIG. 2) and a finder display portion DISP11 (not shown) to provide a predetermined display. LECT is an intra-lens circuit, which is provided in the interchangeable lens (hereinafter referred to as lens) LE, for supplying to the intra-body microcomputer µC1 information particular to the lens LE. The intra-lens circuit LECT will be described in detail later. M1 is an AF motor for driving through the AF couplers 16 and 26 the AF lens provided in the lens LE. MD1 is a motor drive circuit for driving the AF motor M1 based on focus detection information. A rotation direction and stopping of the motor MD1 are controlled by an instruction from the intra-body microcomputer µC1.

ENC is an encoder for monitoring a rotation of the AF motor M1. It outputs a pulse to a counter input terminal CNT of the intra-body microcomputer µC1 every predetermined rotation angle. The intra-body microcomputer µC1 counts the pulse to control the moving speed of the AF lens. TVCT is a shutter control circuit for controlling the shutter based on a control signal from the intra-body microcomputer µC1. AVCT is an aperture control circuit for controlling an aperture based on a control signal from the intra-body microcomputer µC1. M2 is a motor for winding up and rewinding film and charging an exposure control mechanism. MD2 is a motor drive circuit for driving the motor M2 based on an instruction from the intra-body microcomputer µC1.

Subsequently, members relating to power source will be described.

E1 is a battery which is the power source of the camera body BD. Tr1 is a first power supply transistor for supplying power to a part of the above-described circuit. Tr2 is a second power supply transistor, which is of MOS (metal oxide semiconductor) structure, for supplying power for driving a zoom motor of the lens LE. DD is a DC/DC (direct current to direct current) converter for stabilizing a voltage VDD supplied to the intra-body microcomputer µC1. It operates when the level of a power control terminal PW0 is high. VDD is an operation power voltage for the intra-body microcomputer µC1, the intra-lens circuit LECT, the film sensitivity reading circuit DX and the display control circuit DISPC. It is supplied through the power supply transistor Tr1 from the battery E1 under control of a signal outputted from a power control terminal PW1. VCC2 is an operation power voltage for the zoom motor of the lens LE. It is supplied through the power supply transistor Tr2 from the battery E1 under control of a signal outputted from a power control terminal PW2. VCC0 is an operation power voltage for the motor drive circuit MD1, the shutter control circuit TVCT, the aperture control circuit AVCT and the motor drive circuit MD2. It is supplied directly from the battery E1.

D1 to D3 are diodes for, in order to reduce power consumption, supplying a voltage lower than the voltage VDD to the intra-body microcomputer µC1 when the DC/DC converter halts its operation. The lower voltage is set to a minimum voltage at which the intra-body microcomputer µC1 can operate. When the DC/DC converter DD halts its operation, only the intra-body microcomputer µC1 can be operated. BC1 is a battery check circuit for detecting the voltage VCC0 of the battery E1 to transmit a result of the detection to the intra-body microcomputer µC1. GND1 of the intra-lens circuit LECT is a ground line for a low power consumption portion. It connects the lens LE and the camera body BD through the terminals J17 and J7. Although it is necessary to provide different grounds line in the camera body BD and the lens LE, the ground lines are indicated by a single line in the figure for convenience. GND2 is a ground line for a large power consumption portion. It connects the lens LE and the camera body BD through the terminals J18 and J8.

Subsequently, switches will be described. S1 is a photographing preparation switch which is turned on by the halfway depression of the release button 12. When the switch S1 is turned on, an interrupt signal is inputted to an interrupt terminal INT1 of the intra-body microcomputer μC1 to start preparation operations, required for photographing, such as photometry, focus detection and driving of the AF lens. SM is a main switch which is ON when the slider for enabling the operation of the camera is placed at its ON position and which is OFF when the slider 11 is placed at its OFF position. PG1 is a pulse generator for outputting a pulse of low level every time the switch SM is turned from on to off or from off to on. An output of the pulse generator PG1 is inputted to an interrupt terminal INT2 of the intra-body microcomputer μC1 as an interrupt signal. APZSW is a switch for enabling auto program zoom. When the slider 11 placed is at its APZON position, auto program zoom is ON. When the slider is placed at its ON or OFF position, auto program zoom is OFF.

S2 is a release switch which is turned ON by the all-the-way-down depression of the release button 12. When the switch S2 is turned on, photographing is performed. S3 is a mirror up switch which is turned on when mirror up is completed and which is turned off when a shutter mechanism is charged to perform mirror down. SRE1 is a battery attachment detection switch which is turned off when the battery E1 is attached to the camera body BD. When the battery E1 is attached to turn off the battery attachment detection switch, a capacitor C1 is charged through a resistor R1 to change the level of a reset terminal RE1 of the intra-body microcomputer μC1 from low to high. Then, the intra-body microcomputer μC1 executes a subsequently-described reset routine.

Subsequently, an arrangement for serial data communication will be described. The photometry circuit LM, the film sensitivity reading circuit DX and the display control circuit DISPC serially perform data communication with the intra-body microcomputer μC1 through signal lines of a serial input SIN, a serial output SOUT and a serial clock SCK. A communication partner of the intra-body microcomputer μC1 is selected based on the level of chip select terminals CSLM, CSDX and CSDISP. When the level of the terminal CSLM is low, the photometry circuit LM is selected. When the level of the terminal CSDX is low, the film sensitivity reading circuit DX is selected. When the level of the terminal CSDISP is low, the display control circuit DISPC is selected. Further, the three serial communication signal lines SIN, SOUT and SCK are connected to the intra-lens circuit LECT through the terminals J11 and J5, J14 and J4, and J16 and J6, respectively. When the intra-lens circuit LECT is selected as the communication partner, the level of the terminal CSLE is required to be changed to low. A signal representative of this level down of the CSLE is transmitted to the intra-lens circuit LECT through the terminals J3 and J13.

Figure 4:
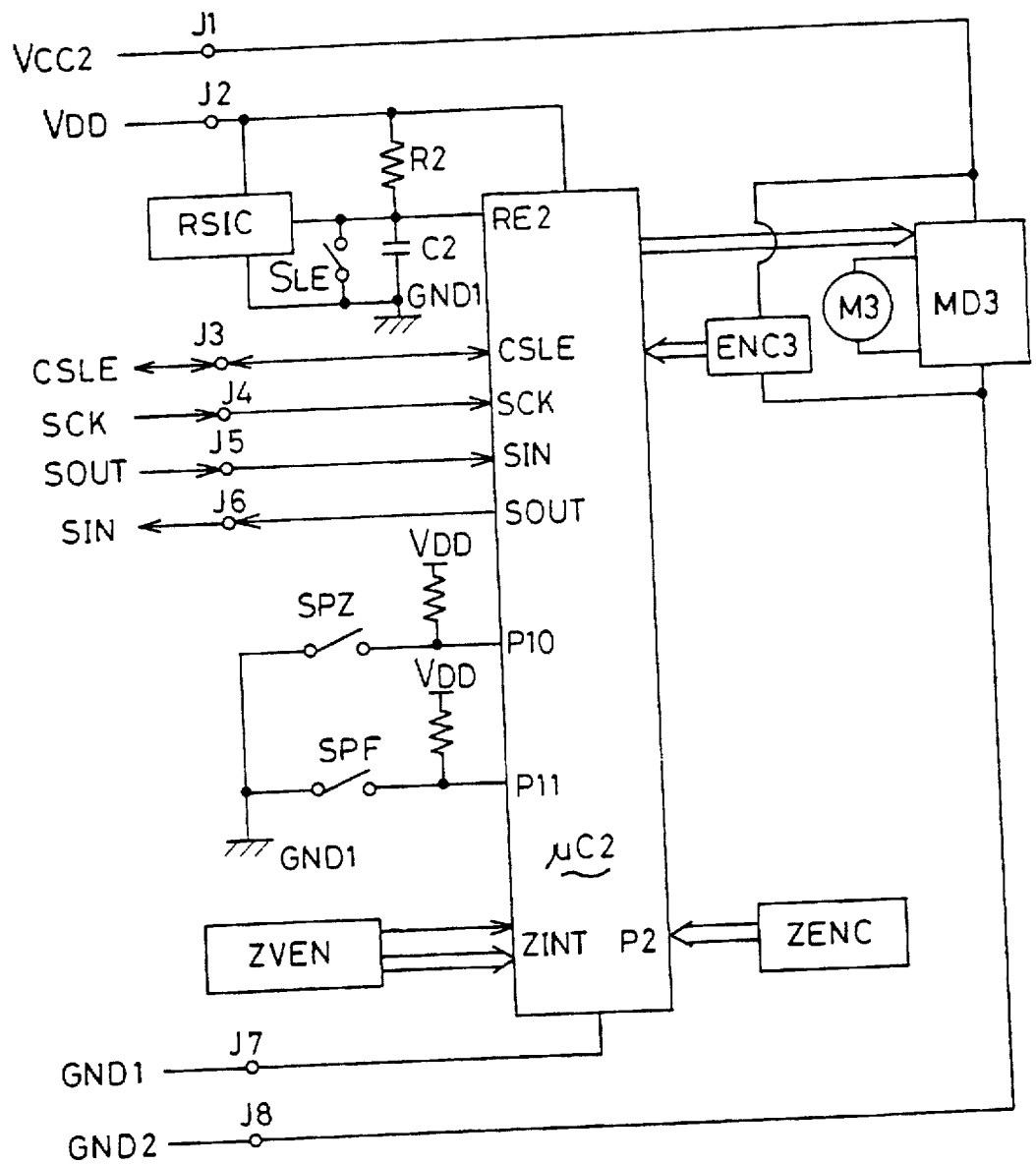
FIG. 4 is a circuit diagram of the lens of the camera system of FIG. 1.

Subsequently, the intra-lens circuit LECT provided in the interchangeable lens LE will be described with reference to FIG. 4. μC2 is an intra-lens microcomputer, which is provided in the lens LE, for controlling the zoom motor, data communication with the camera body BD and mode setting. Now, the terminals J1 to J8 through which the lens LE is coupled to the camera body BD will be described. J1 is a power terminal for supplying the power voltage VCC2, for driving the zoom motor, from the camera body up to the lens LE. J2 is a power terminal for supplying the voltage VDD, used for purposes other than the driving of the zoom motor, from the camera body BD is the lens LE. J3 is a terminal where a signal representative of a data communication request is inputted and outputted. J4 is a clock terminal where a clock for data communication is inputted from the camera body BD. J5 is a serial input terminal where a data is inputted from the camera body BD. J6 is a serial terminal where a data is outputted to the camera body BD. J7 is a ground terminal for circuits other than the motor drive circuit. J8 is a ground terminal for the motor drive circuit.

A signal line, relating to the terminal CSLE, which runs through terminals J3 and J13 provided between the lens LE and the camera body BD is bidirectional. When a signal is transmitted through this line from the intra-body microcomputer μC1 to the intra-lens microcomputer μC2, an interrupt is applied to the intra-lens microcomputer μC2. Thereby, the intra-lens microcomputer μC2 is activated and the interchangeable lens LE is selected as the communication partner of the camera body BD. On the other hand, when a signal is transmitted through this line from the intra-lens microcomputer μC2 to the intra-body microcomputer μC1, an interrupt signal is inputted to a lens interrupt terminal LEINT of the intra-body microcomputer μC1 from the pulse generator PG2 (FIG. 3) to activate the intra-body microcomputer μC1. When a data is transmitted form the intra-body microcomputer μC1 to the intra-lens microcomputer μC2, the intra-body microcomputer μC1 does not accept the interrupt LEINT. RSIC is a reset IC (integrated circuit) for resetting the intra-lens microcomputer μC2 when the voltage VDD supplied from the camera body BD becomes lower than a normal operation voltage of the intra-lens microcomputer. μC2. R2 and C2 are a reset resistor and a reset capacitor, respectively, for resetting the intra-lines microcomputer μC2.

RE2 is a reset terminal of the intra-lens microcomputer μC2. When the voltage VDD for activating the intra-lens circuit is supplied from the camera body BD and the level of a terminal RE2 is changed from low to high by the resistor R2 and the capacitor C2, the intra-lens microcomputer, μC2 performs a reset operation.

SPZ is a switch which synchronizes with the slider 2S for selecting between power zoom and manual zoom. It is ON when power zoom is selected. Moreover, since the zoom clutch (not shown) is coupled at this time, the zoom lens can be moved by driving the zoom motor M3.

SPF is a switch, which is turned on and off in synchronization with the previously-mentioned along-the-optical-axis movement of the zoom ring 80, for specifying power zoom or power focus. When the zoom ring 80 is operated toward the rear along the optical axis, the switch SPF is turned on to inform the intra-lens microcomputer μC2 that power focus is selected. When the operation ring 80 is operated toward the front along the optical axis (automatically returns in actuality), the switch SPF is turned off to inform that power zoom is selected. ZVEN is an encoder, which synchronizes with the about-the-optical-axis a rotation operation of the zoom ring, for setting a speed and a direction of power zoom or power focus.

M3 is a zoom motor for driving the zoom lens. A focal length can continuously be varied by driving the zoom lens through the zoom motor. MD3 is a motor drive circuit for driving the zoom motor M3. It controls a rotation of the zoom motor M3 in response to a control signal, representative of a motor drive direction and a motor drive speed, provided by the intra-lens microcomputer μC2. Moreover, it shorts both terminals of the zoom motor M3 and stop voltage application in response to a motor stop signal and a motor halt signal which are provided by the intra-lens microcomputer μC2, respectively. ENC3 is a pulse encoder for detecting a rotation amount of the zoom motor M3. It is used for detecting a zoom lens position and a zoom speed.

ZENC is an absolute encoder (FIG. 7) for detecting an absolute position of the zoom lens. It makes a zone detection of an entire zoom range which is divided late a plurality of zones. SLE is a lens attachment detection switch which is turned off when the lens LE is attached to the camera body BD and mount-locked. That is, when the lens LE is detached from the camera body BD, the switch SLE is turned on, so that both terminals of the capacitor C2 is shorted. Thereby, a charge accumulated in the capacitor C2 is discharged to change the level of the terminal RE2 of the intra-lens microcomputer μC2 to low. When the lens LE is attached to the camera body BD thereafter, the switch SLE is turned off, so that the capacitor C2 is charged through the power line VDD. After a predetermined period of time which is determined based on the resistor R2 and the capacitor C2, the level of the terminal RE2 is changed to high to cause the intra-lens microcomputer μC2 to perform the reset operation as previously described.

Figure 5:
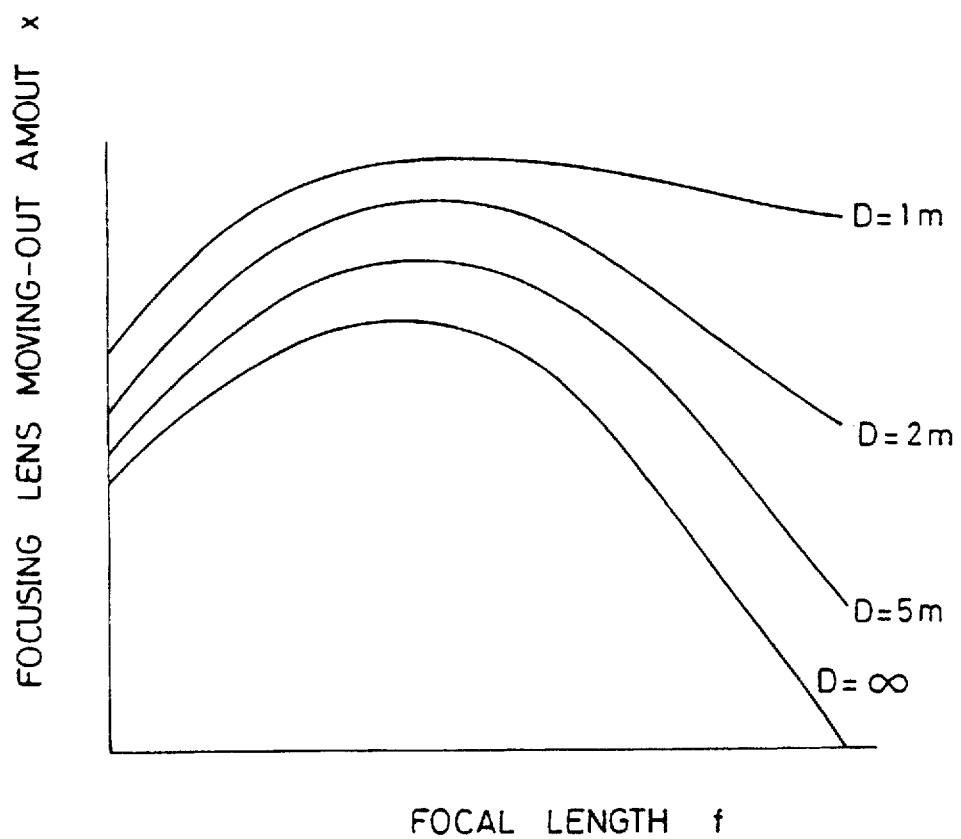
FIG. 5 shows focal length—lens moving-out amount characteristics of a varifocal lens.

Finishing the description of hardware of this embodiment, software will subsequently be described. First, an outline of a zoom drive sequence, for a varifocal zoom lens, of this embodiment will be described. The varifocal lens is a lens where a focal plane moves when a local length is varied (this varying of focal length will hereinafter be referred to as zooming). It is necessary to compensate for the movement of the focal plane by moving a focusing lens simultaneously with zooming. FIG. 5 shows focusing lens moving-out amounts with respect to respective subject distances at respective focal lengths. The following equations (1) and (2) are obtained with respect to a relationship between a focal length at an object distance D and a moving-out amount required to obtain in-focus condition:

$$D = F(f, dx) \quad (1)$$

$$dx = F^{-1}(f, D) \quad (2)$$

where F( ) is a function, particular to an optical system, which fulfills the relationship between the focal length and the moving-out amount of an optical system, and $F^{-1}()$ is an inverse function of F( ). Considering an arbitrary combination of (f1, dx1) and (f2, dx2) at an object distance D with respect to the equations (1) and (2), the following equation (3) is obtained:

$$dx2 = F^{-1}(f2, D) = F^{-1}\{f2, F(f1, dx1)\} \quad (3)$$

In order to compensate for the focal plane movement during zooming of the varifocal lens (this compensation will hereinafter be referred to as varifocal compensation driving), the focusing lens is moved according to the above equation (3).

FIGS. 6A and 6B show, along time passage, execution relationships between a sequence of the intra-body microcomputer μC1 and that of the intra-lens microcomputer μC2 and communication between the body BD and the lens LE (this communication will hereinafter be referred to as BL communication) of this embodiment. FIG. 6A shows a relationship obtained when AF lock (sequence for a stationary subject) is ON, while FIG. 6B shows a relationship obtained when continuous AF (sequence for a moving subject) is ON. First, a zoom drive sequence, executed when AF lock is ON, of FIG. 6A will be described (the details of BL communication in the sequence will be described later).

The intra-body microcomputer μC1 performs focus detection prior to the start of zooming. This is for obtaining the moving-out amount dx1 shown in a varifocal compensation calculation equation (the above-described equation (3)). At the beginning of the focus detection sequence, a BL communication #a (communication for transmitting a focus detection timing) is performed. The BL communication #a is performed in order to cause the intra-lens microcomputer μC2 to calculate an optical data, particular to the lens, required for a subsequently-described focus detection calculation (AF focus detection data calculation (AFD)) and to provide to the intra-lens microcomputer μC2 a focal length f1 used for the above-mentioned varifocal compensation calculation. After the BL communication #a is completed, the intra-body microcomputer μC1 performs the optical charge accumulation (hereinafter referred to as CCD integration (I)) and taking-in of a CCD integration result (dump (D)). Thereafter, a focus detection data calculated by the intra-lens microcomputer μC2 is taken in by the intra-body microcomputer μC1 through a BL communication #b to perform an AF focus detection calculation (algorithm) based on the focus detection data and the data taken in by the intra-body microcomputer μC1 through the dump (D).

Thereafter, in a BL communication #c, a zoom drive command (zoom command where a focal length is specified and/or a permission of manual power zoom) and the focusing lens moving-out amount obtained through the AF focus detection calculation are transferred from the intra-body microcomputer μC1 to the intra-lens microcomputer μC2. Thereafter, the intra-lens microcomputer μC2 moves the zoom lens according to the command provided through the BL communication #c and performs varifocal compensation calculation (VFC). The above-mentioned zoom command where a focal length is specified is for moving the zoom lens until a focal length specified by the intra-body microcomputer μC1 is reached. It is used for an automatic photographing mode, of a camera, where photographing of a moving subject is performed at a fixed magnification. Moreover, the above-mentioned permission of manual power zoom is a command used when a zooming is performed in accordance with an operation of the zoom ring 80 of the lens LE by a user. After providing the BL communication #c, the intra-body microcomputer μC1 periodically repeats a BL communication #d to control, while monitoring a zooming operation of the lens LE, the driving of the AF motor M1 based on a varifocal compensation drive amount taken in from the intra-lens microcomputer μC2 through the BL communication #c to drive the focusing lens (varifocal compensation driving (VF driving) in order to obtain in-focus condition. This is repeated until the zoom lens is stopped. After the zoom lens is stopped, the process proceeds to another sequence (e.g. release).

Next, power zoom, performed when continuous AF is ON, of FIG. 6B will be described. Continuous AF is an AF method which is suitable for a moving subject and a mode where focus detection is repeated to move the focusing lens so that in-focus condition is always obtained with respect to the subject. Different from the above-described case of AF lock, focus detection is repeated even during zooming when continuous AF is ON. Power zoom will hereinafter be described with reference to the sequence of FIG. 6B.

A sequence, from the first BL communication #a (communication for transmitting a focus detection timing) to the BL communication #d (communication for transmitting a zoom relating data from the intra-lens microcomputer μC2 to the intra-body microcomputer μC1), where a varifocal compensation drive amount is obtained and the focusing lens is moved for the compensation is the same as that of the above-described case of AF lock. After the varifocal compensation driving is started, the sequence from the BL communication #a (communication #d (communication for transmitting a zoom relating data) is repeated. In the sequence of FIG. 6B, the repeated communications are represented by #a to #d, #a' to #d', #a" to #d" so that they are distinguished from each other. Moreover, the operations of the intra-body microcomputer μC1 and the intra-lens microcomputer μC2 performed in the repeated communication are also marked with ' or " or '" for distinguishment. After completing the repeated communications, the intra-body microcomputer μC1 again performs the varifocal compensation driving (V driving ') based on a new varifocal compensation drive amount obtained in the BL communication #d'. In-focus condition with respect to a moving subject is obtained by repeating the sequence.

Figure 8:
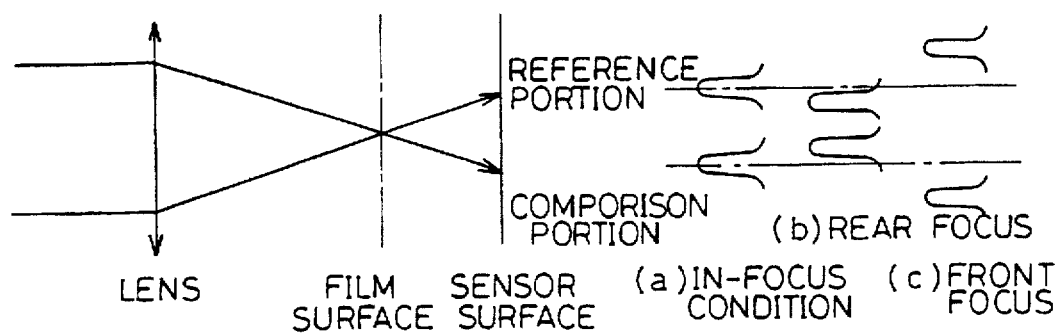
FIG. 8 shows a principle of focus detection.
Figure 9:
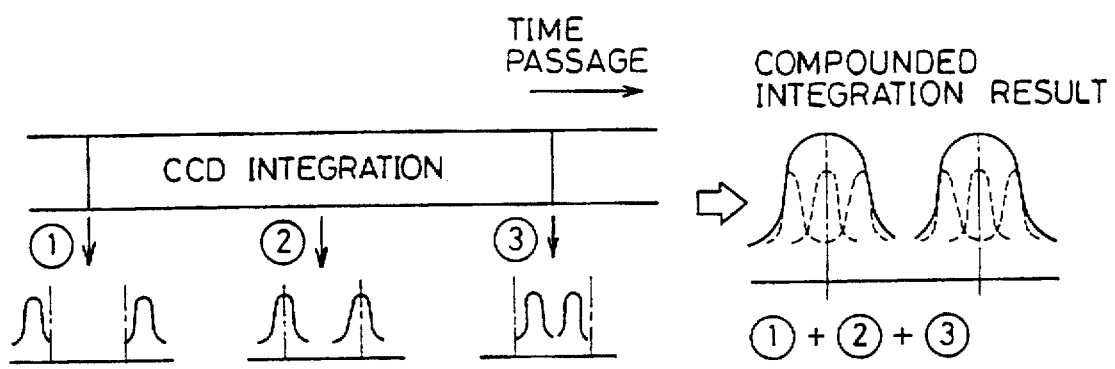
FIG. 9 shows a principle of focus detection.

Now, focus detection performed during zooming will be described with reference to FIGS. 8 and 9. The focus detection method employed for this embodiment is a method called a phase difference method. In this method, determination of focus condition (front focus, rear focus or in-focus) is made by measuring the distance between images formed on a reference and a comparison portions provided on the CCD sensor. In a case where an-optical-charge-accumulation-type device such as a CCD is employed and an image plane moves as shown in FIG. 9, a total amount of instantaneous optical charge accumulation amounts obtained as time passes is obtained as a final focus detection value. Generally, an image plane movement speed is considered to be constant during the CCD integration, and the image distance obtained at the midpoint of the CCD integration nearly coincides with the image distance obtained as a compound integration result. The above-mentioned image plane movement occurs while an AF operation is being performed with respect to a moving subject and while a zooming operation of the varifocal lens of this embodiment is being performed. For this reason, if various optical data used for distance calculation and data used for the above-mentioned varifocal compensation calculation (equation (3)) do not coincide with the data obtained in the midpoint of the CCD integration, the difference causes an error in focus detection and varifocal compensation calculation results, so that accuracy deteriorates. In this embodiment, the decrease in accuracy is prevented by specifying a timing of sampling of optical data used for focus detection and varifocal compensation calculation in the BL communication #a (communication for transmitting a focus detection timing from the intra-body microcomputer μC1 to the intra-lens microcomputer μC2) described with reference to the sequence of FIG. 6A.

Subsequently, a BL communication method, and various types of BL communication and roles thereof will be described. Communication is performed by electrically coupling the intra-body microcomputer μC1 and the intra-lens microcomputer μC2 through the terminals J13 to J16 and J3 to J6 shown in FIG. 2. Communication sequences will hereinafter be described with reference to FIGS. 10A and 10B. Communication is started when the intra-body microcomputer μC1 changes the level of a CSLE signal to low. Receiving a signal representative of the level down of the CSLE signal, the intra-lens microcomputer μC2 changes the modes of the SIN and SOUT which are normally under high-impedance (hereinafter referred to as HIZ) port condition to a serial communication mode (hereinafter referred to as S-I/O mode). The reason why the SIN and SOUT are normally under the HIZ condition is that they are common signal lines of the intra-body microcomputer μC1 and the circuits LM, DX and DISPC and prevent the intra-lens microcomputer μC2, SIN and SOUT from influencing the communication between the intra-body microcomputer μC1 and the circuits LM, DX and DISPC. Moreover, the S-I/O mode is a condition where the intra-lens microcomputer μC2 is enabled to perform serial communication with the intra-body microcomputer μC1 by use of S-I/O hardware (not shown) provided in the intra-lens microcomputer μC2.

Figure 10A:
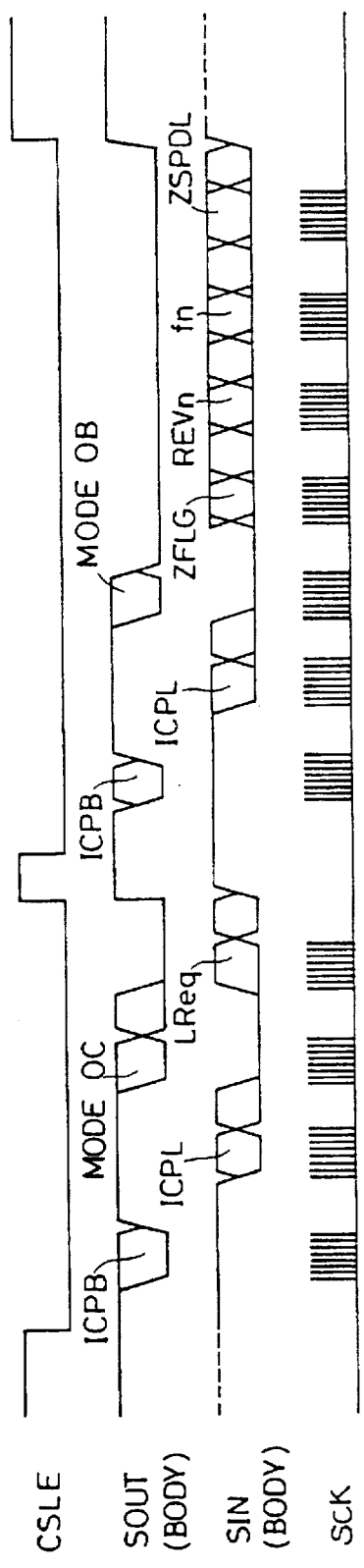
FIGS. 10A and 10B are time charts of data communication.

When the intra-body microcomputer μC1 repeats level up/down of an SCK signal eight times under the low condition of the CSLE signal, a one-byte data transfer is performed between the microcomputers through the SIN/SOUT by use of the S-I/O hardware provided in the microcomputer. After a predetermined-byte data transfer is completed, the intra-body microcomputer μC1 changes the level of the CSLE signal to high. Thereafter, the intra-lens microcomputer μC2 detects the high condition of the CSLE signal, and changes the mode of the SIN and SOUT to the HIZ port mode to finish the BL communication. In FIG. 10A, subsequently-described communication mode 0CH (H represents hexadecimal and in the figure, H is omitted) and 0BH are successively performed. For a first-byte data transferred immediately after the level of the CSLE signal is changed to low, an identification data ICPB representative of the kind of the body is transmitted from the intra-body microcomputer μC1 to the intra-lens microcomputer μC2. When this happens, the intra-lens microcomputer μC2 transmits a meaningless data FFH. For a second-byte data, an identification data ICPL representative of the kind of the lens is transmitted from intra-lens microcomputer μC2 to the intra-body microcomputer μC1. When this happens, the intra-body microcomputer μC1 transmits the meaningless data FFH to the intra-lens microcomputer μC2. For a third-byte data, the intra-body microcomputer μC1 outputs a data representative of a command from the intra-body microcomputer μC1 to the intra-lens microcomputer μC2 or a data representative of the kind of a succeeding communication (this data will hereinafter be referred to as BL communication mode data or mode data). In the 0CH mode, subsequently to the mode data, lens switch information is outputted from the intra-lens microcomputer μC2. Then, communication is continued according to the mode data value. Thereafter, the level of the CSLE signal is changed to high to finish communication. When the BL communication is performed again, the process from the level down of the CSLE signal is executed in a similar manner.

Figure 10B:
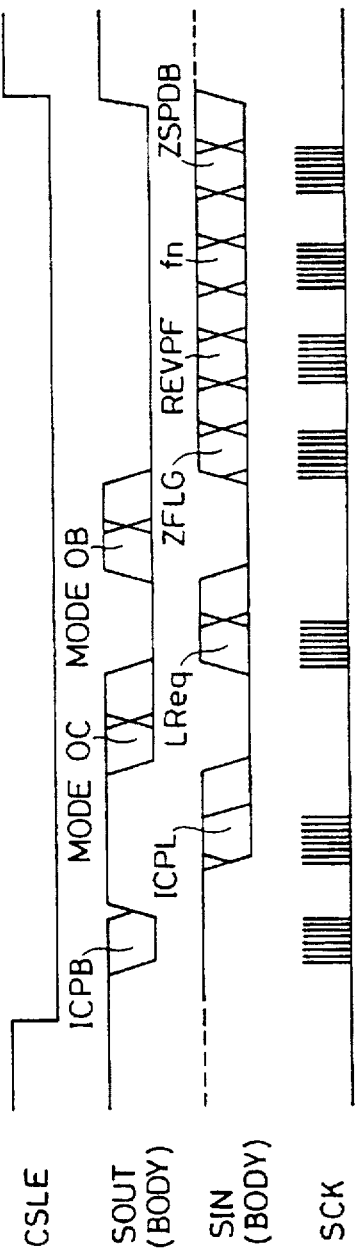

Instead of the above-described embodiment, it is possible to, after communication of one mode is completed, subsequently perform communication of another communication mode without finishing the preceding communication. That is, as shown in FIG. 10B, the process to the transmission of a fourth-byte data is the same as that of FIG. 10A, and when a fifth-byte data is subsequently transmitted, a mode data 0BN representative of a subsequent communication mode is outputted. After transmission of data ZFLG to ZSPDL which are defined in the 0BH mode is completed, the level of the CSLE signal is changed to high to finish this communication. While, in this embodiment, two communication modes are serially transferred, it may be possible to perform serial communication by combining other modes or combining three or more communication modes. In an embodiment where data transfer of a plurality of communication modes as subsequently performed at one time as FIG. 10B, less time is required compared to a case where communication is serially performed a plurality of times as FIG. 10A, since it is possible to omit the two bytes (ICPB, ICPL) which are transmitted immediately after the level of the CSLE signal is changed to low and it is unnecessary to change the level of the CSLE signal to high or low between each communication.

Figure 11:
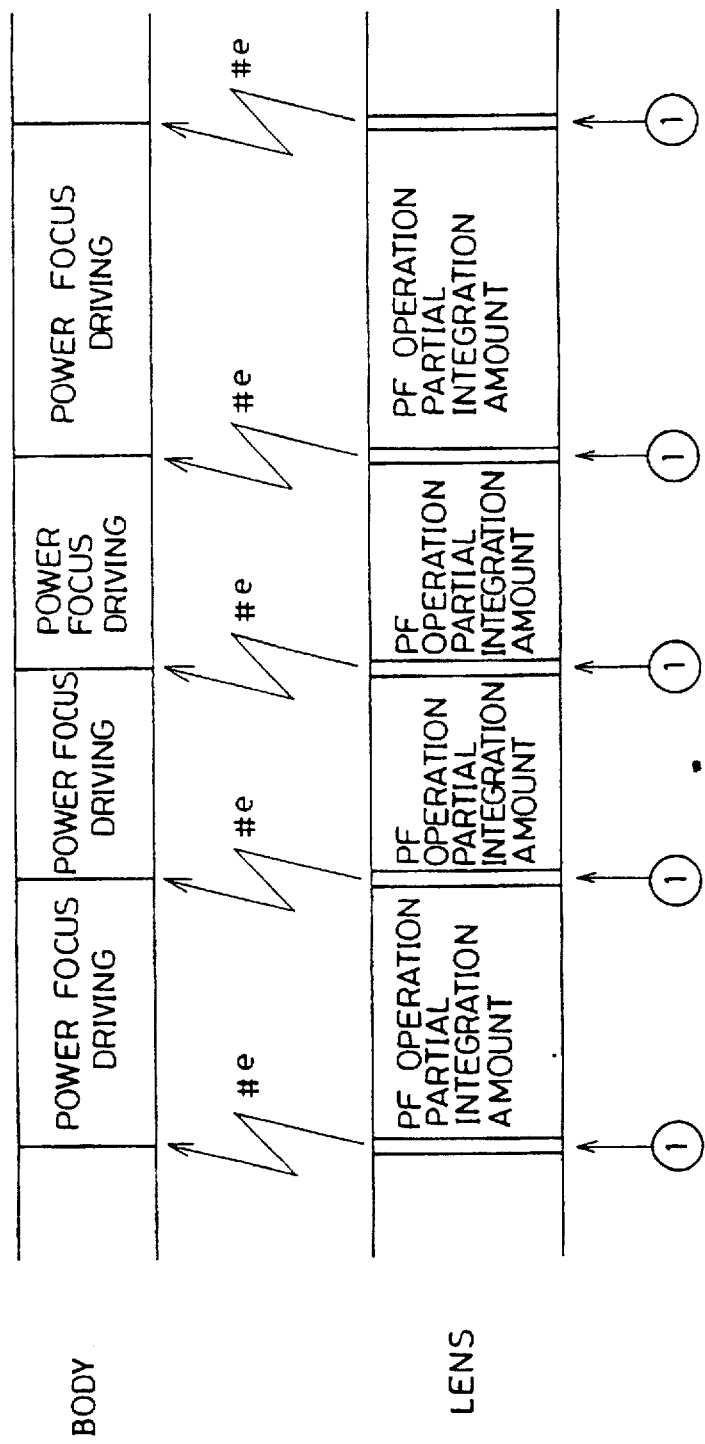
FIG. 11 shows a sequence of focus driving.

Moreover, the intra-body microcomputer μC1 periodically takes in a power focus drive amount (driving operation amount). FIG. 11 shows a communication manner thereof, which will be described later.

Hereinafter, operations performed by the intra-lens microcomputer μC2 will be described with reference to flow charts.

Figure 12:
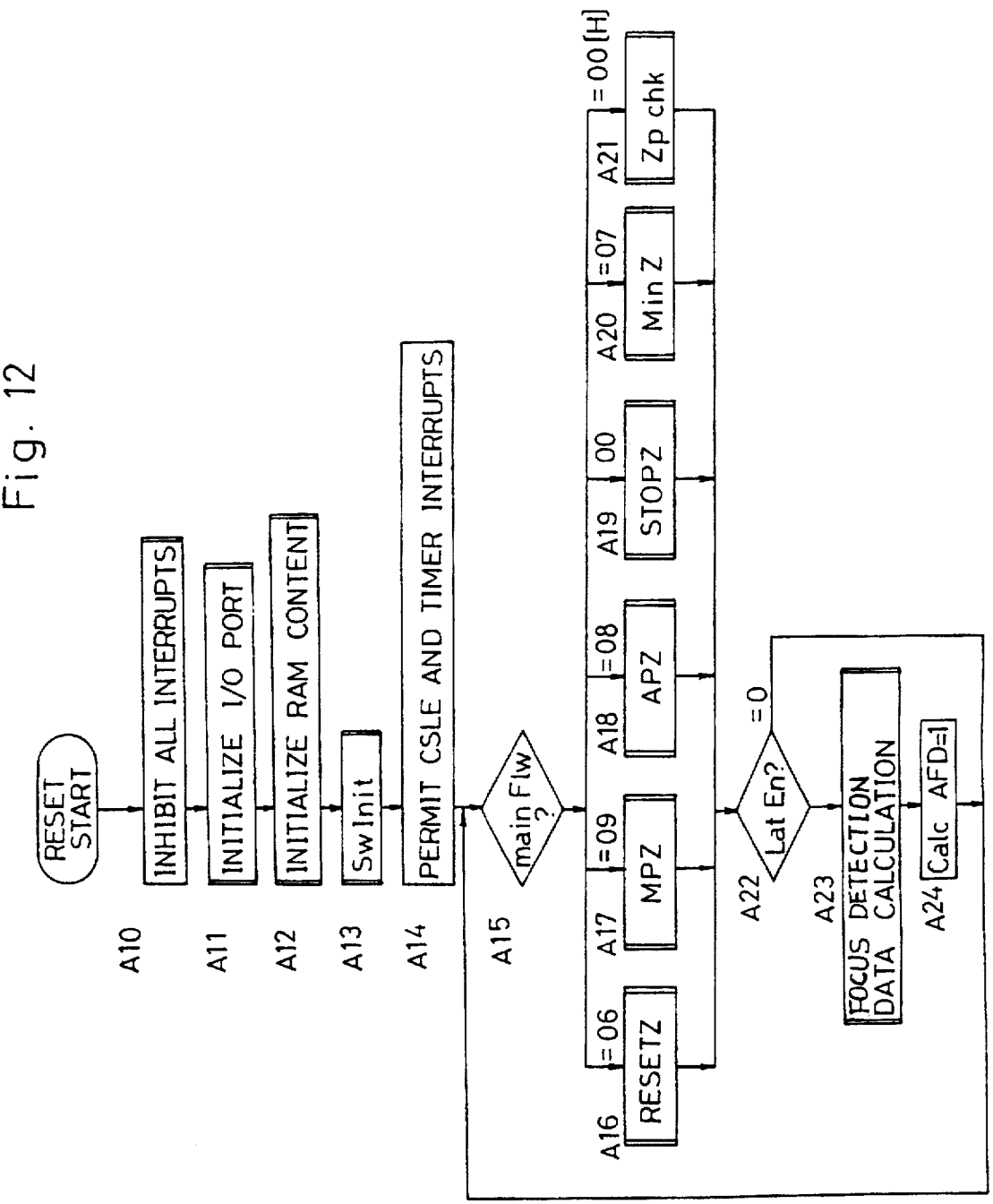
FIG. 12 is a flow chart of a reset operation of an intra-lens microcomputer.

FIG. 12 shows a reset start routine. In the routine, first, all the interrupts are inhibited (step A10). Then, after an I/O port and a memory content are initialized (steps A11 and A12), conditions of the switches of the lens LE are read (subroutine Swinit) (step A13). Then, after a CSLE signal interrupt and a timer interrupt for periodical reading of lens switch conditions are permitted so that the intra-lens microcomputer μC2 can be ready for responding to a communication requirement from the intra-body microcomputer μC1 (step A14), the process enters a main loop of normal condition (steps A15 to A24). At step A15 (main flow), a lens control command transmitted from the intra-body microcomputer μC1 is analyzed to execute each control command. After the execution of each control command transmitted from the intra-body microcomputer μC1 is completed, data required for a focus detection process executed by the intra-body microcomputer μC1 calculated at steps A22 to A24.

The following are the contents of the above-mentioned control commands:

RESETZ (step A16): initialize a zoom control portion;

MPZ (step A17): manual power zoom, i.e. perform zooming according to an operation of a zoom operation member (zoom ring 80) of the lens LE and perform varifocal compensation calculation during the zooming;

APZ (step A18): auto power zoom, i.e. perform zooming until a focal length specified by the intra-body microcomputer μC1 is obtained and perform varifocal compensation calculation so that in-focus condition is obtained with respect to the focal length;

STOPZ (step A19): stop zooming;

MinZ (step A20): move the lens to a position where the lens length is minimum; and Zpchk (step A21): monitor the zoom encoder ZENC, i.e. monitor whether the zoom lens is moved by external force or not.

Moreover, the following are the BL communication mode values (hexadecimal) and communication contents thereof:

00: start initialization of the intra-lens microcomputer μC2 (Zpchk);

01: no operation;

02: check communication compatibility;

03: transmit all the lens data from the intra-lens microcomputer μC2 to the intra-body microcomputer μC1;

04: transmit a focus detection timing from the intra-body microcomputer μC1 to the intra-lens microcomputer μC2;

05: transmit a data for focus detection from the intra-lens microcomputer μC2 to the intra-body microcomputer μC1;

06: initialize the zoom lens (RESETZ);

07: start to move the lens to a position where the lens length is minimum (MinZ);

08: perform zooming until a specified focal length is obtained (APZ);

09: permit manual power zoom (MPZ);

0A: limit manual power zoom range;

0B: transmit data relating to zooming from intra-lens microcomputer μC2 to the intra-body microcomputer μC1;

0C: transmit lens switch information from the intra-lens microcomputer μC2 to the intra-body microcomputer μC1;

0D: stop zooming (STOPZ); and

0E: transmit a power focus drive amount from the intra-lens microcomputer μC2 to the intra-body microcomputer μC1.

Each control command will hereinafter be described.

Figure 18:
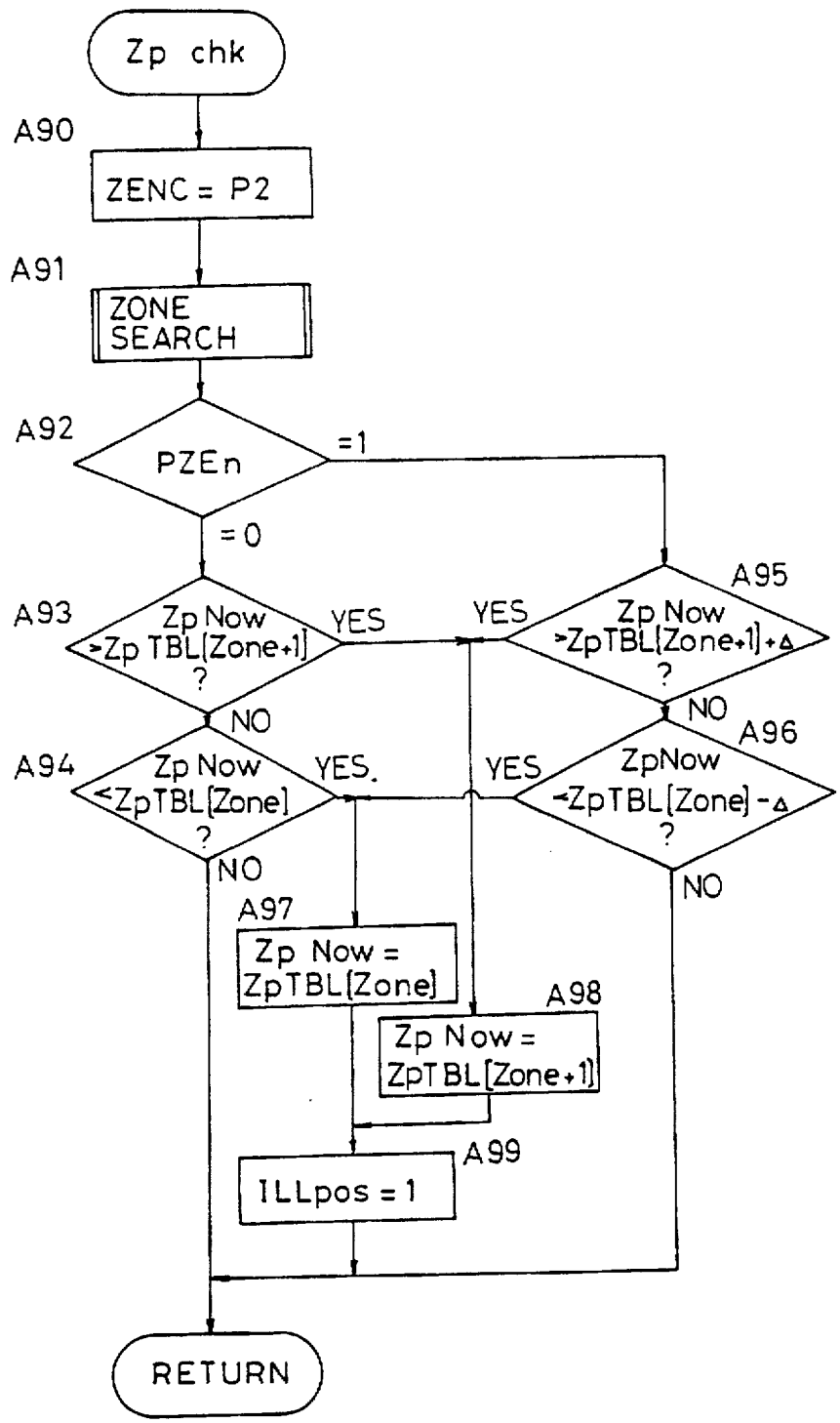
FIG. 18 is a flow chart of a Zpchk operation of the intra-lens microcomputer.

First, a Zpchk routine (shown in FIG. 18) will be described. This routine is normally executed when the intra-lens microcomputer μC2 receives no command from the intra-body microcomputer μC1. This routine is for monitoring the zoom encoder ZENC in order to confirm whether or not a pulse position counter ZpNow which is based on a pulse from a zoom pulse encoder ENC3 holds a correct value. A flow of this routine will be described with reference to FIG. 18. First, a value of the absolute encoder ZENC is read (step A90). The absolute zoom encoder zone-divides the zoom range every 100 pulses as shown in FIG. 7. Based on the encoder value which is read in the above step, a zone search subroutine is executed to confirm the current position of the zoom lens (step A91). Then, whether the zoom clutch is coupled or not is determined (step A92). When the zoom clutch is not coupled (PZEn=0, details thereof will be described later), comparisons are made at steps A93 and A94. When it is determined based on the zoom encoder value that the zoom lens is currently located in a zone Z (Z=1, II, ... VIII), zooming pulse values are normally within a range between Zp1 and Zp1-1 (Zp1=0, 100, ... 800), respectively. However, in a case where the zoom lens is forcibly moved by external force, correspondence breaks between the pulse value ZpNow held by the intra-lens microcomputer μC2 and a zoom encoder value. Therefore, when it is determined that a zoom pulse is outside the above-mentioned detection zones at the comparison of steps A93 or A94, the process branches to step A97 or A98 to set a value which is close to a correct pulse value as the ZpNow. Then, a flag ILLpos showing that the zoom lens does not recognize a correct pulse position is set to 1, and the process returns.

Moreover, when the zoom lens is not moved by external force, since an output of the zoom encoder ZENC and the zoom pulse counter ZpNow correspond to each other, the process directly returns without branching at the comparison of steps A93 or A94. When the zoom clutch is coupled (PZEn=1), the conformation of the zoom encoder ZENC and the zoom pulse counter is also monitored. In this case, however, the zone is set to be between Zp1-Δ and Zp1-1-β, which is wider by Δ pulse in both a telephoto (longer focal length) and a wide (shorter focal length) directions than the zone between Zp1 to Zp1-1 which is set when the zoom clutch is not coupled. When the zoom clutch is not coupled, since the zoom lens is moved only by external force, a pulse value obtained when the zoom encoder is changed is employed for the above zone in order to improve accuracy as much as possible. On the other hand, when the zoom clutch is coupled, the intra-lens microcomputer μC2 activates the motor M3 to start zooming. In this case, the content of the pulse counter is re-set if the inconformity of the zoom encoder ZENC and the pulse counter is detected. If the pulse counter value becomes discontinuous due to the resetting, zoom hunting may occur and values of various calculations (to be described later) performed based on the pulse may become discontinuous, which are not desirable. Moreover, the above-mentioned phenomena may arise not only in a case where the zoom lens is moved by external force but also in a case where a deviation from a design value is caused due to a manufacturing error and backlash of gears. To prevent the above-mentioned phenomena, when the intra-lens microcomputer μC2 is enabled to move the zoom lens, the zone is increased by Δ pulse at the determinations of steps A95 and A96 as described above in order to provide a hysteresis characteristic.

Subsequently, a RESETZ routine (shown in FIG. 13) will be described. This routine is activated in a case where the intra-body microcomputer μC1 outputs a zoom initialization operation command. When it is activated, first, the coupling condition of the zoom clutch is determined (step A40). When the zoom clutch is not coupled, the zoom lens is not moved. Then, after a mainFLW (variable) is set so that the process branches to Zpchk in the next main flow branching, the process returns. When the zoom clutch is coupled, whether a zoom reset operation has already been performed or not is determined. Since resetting has not yet been started immediately after the intra-body microcomputer μC1 transmits the command, the process proceeds to step A42, where zoom reset driving is activated. When zoom reset driving is activated, the zoom motor M3 is activated to start zooming. The zoom optical system, which is coupled to the motor M3, moves in synchronization with the movement of the motor M3. A pulse which is generated by the pulse encoder ENC3 synchronizing with the motor M3 is inputted to the intra-lens microcomputer μC2 to apply a pulse interrupt. Moreover, in synchronization with the activation of zooming, a timer operation of a zoom speed monitoring timer (not shown) is started to control the speed simultaneously with the above-mentioned pulse interrupt. The pulse interrupt applied is monitored by the intra-lens microcomputer μC2 and influences the zoom pulse position counter ZpNow. The zoom lens is moved until it is sensed that the zoom lens has reached the end limit or until a target value is reached. The zoom motor M3 is deactivated at the time when any of the above conditions is fulfilled. Simultaneously, the pulse interrupt and the operation of the zoom speed controlling timer are inhibited. Moreover, according to conditions obtained at the time of stopping, flags, a telephoto and a wide end position flags and a flag showing that zooming is being performed are set or reset.

Figure 13:
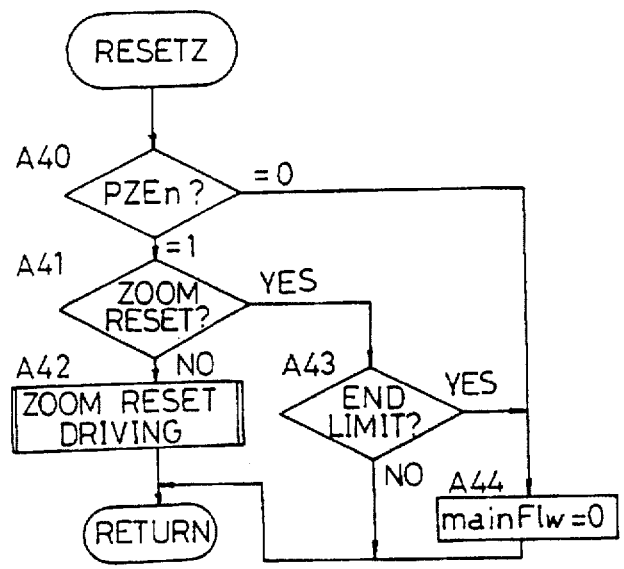
FIG. 13 is a flow chart of a reset subroutine of the intra-lens microcomputer.

Returning to the RESETZ routine of FIG. 13, after zoom reset driving is activated at step A42, the process temporarily returns to the loop of the main flow (FIG. 12) from this routine. However, this routine is again called at the next branching of step A15. Since zooming has already been started at that time, after step A41 is finished, whether the zoom lens has reached the end limit or not is determined (step A43). When the zoom lens has not reached the end limit, the process directly returns to the main flow and waits until the RESETZ routine is called again. When the zoom lens has reached the end limit, the mainFLW is set to 0 (step A44) so that Zpchk (step A21) is called at the next branching of step A15. As described above, steps A15, A16 and A22 are repeated until the zoom lens reaches the end limit. When the zoom lens reaches the end limit, the process enters the previously-described Zpchk routine (FIG. 18) for checking the conformity of the zoom pulse counter and the encoder.

Figure 14:
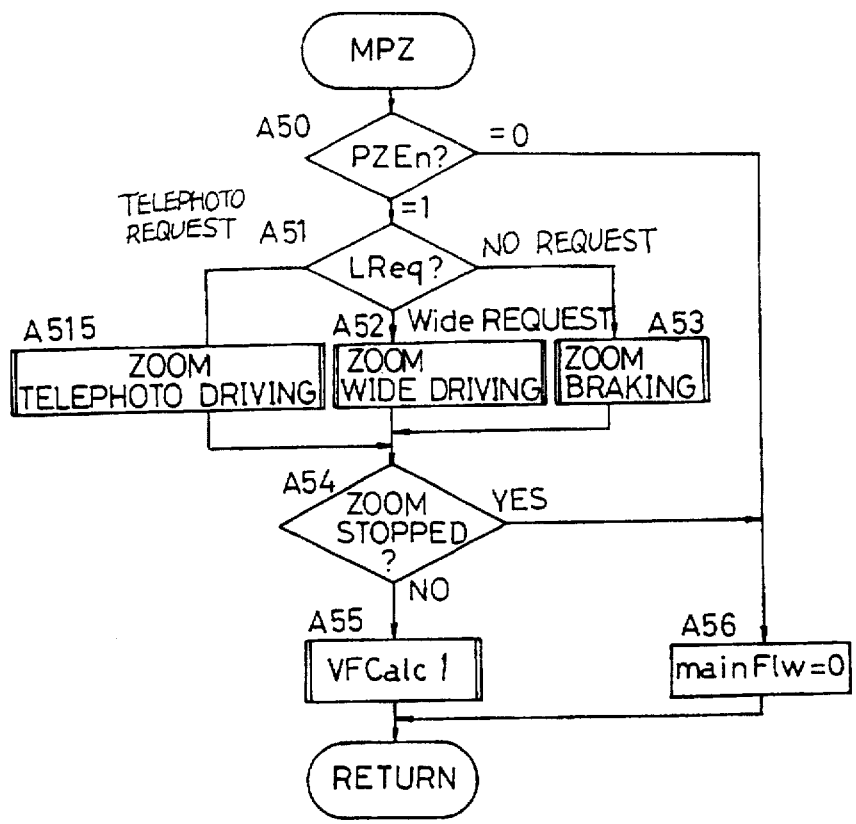
FIG. 14 is a flow chart of an MPZ operation of the intra-lens microcomputer.
Figure 17:
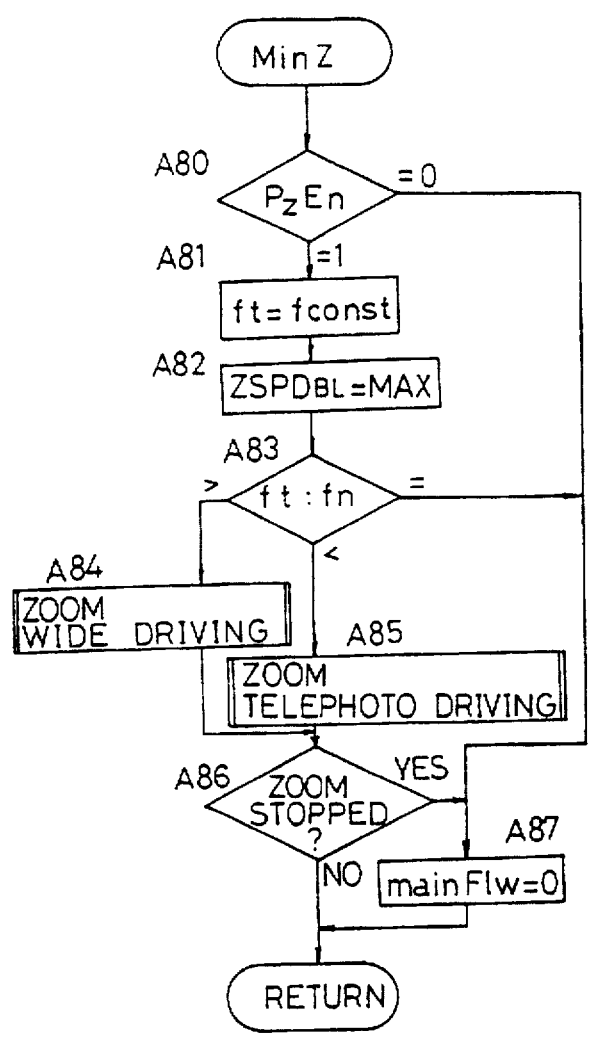
FIG. 17 is a flow chart of a MinZ operation of the intra-lens microcomputer.

Subsequently, an MPZ routine of FIG. 14 will be described. When the intra-body microcomputer μC1 detects through the BL communication mode 0C that the zoom switch of the lens is operated, an MPZ permission is provided through the communication mode 09. After receiving a command through communication, the intra-lens microcomputer μC2 branches to the MPZ routine (FIG. 14) according to the determination of step A15 of the main flow. In the MPZ routine, first, the coupling conditions of the zoom clutch is confirmed. When the zoom clutch is not coupled, a process similar to that of the routine RESETZ (FIG. 13) is executed. In subsequently-described APZ (FIG. 15) and MinZ (FIG. 17) routine, a similar clutch coupling confirming process is executed. The intra-lens microcomputer μC2 which has received an MPZ activation command starts zooming according to LEeq (to be described later in a description of a timer interrupt routine) representative of an operation condition of the zoom operation member. That is, when the zoom operation member has not been operated, zoom braking is started (step A53); when the telephoto direction is requested, zoom telephoto driving (step A515) is started; and when the wide direction is requested, zoom wide driving is started (step A52). In the driving routines (steps A515 and A52) of the zoom drivings, the zoom control interrupt, the pulse interrupt and the zoom timer interrupt routines which have been outlined in the description of the RESETZ routine are activated and zooming is performed according to the operation of the zoom operation member. Moreover, in the zoom braking routine (step A53), a flag for inhibiting zoom driving is set to deactivate the zoom motor. After the process returns from the zoom driving/braking, whether the zoom lens is moving or not is determined (step A54). When the zoom lens is moving, varifocal compensation calculation is performed (step A55). Otherwise, mainFLW is set to 0 (step A56) in order to stop the execution of the MPZ routine so that the zoom lens moves without a permission of the intra-body microcomputer μC1.

Figure 15:
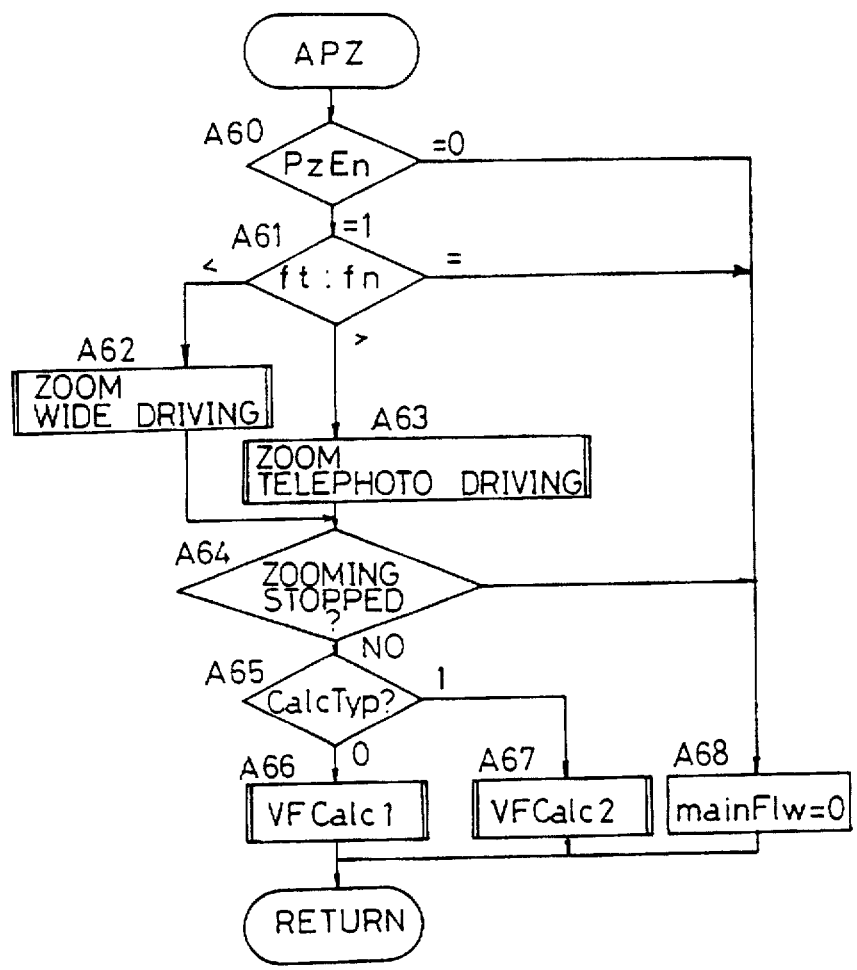
FIG. 15 is a flow chart of an APZ operation of the intra-lens microcomputer.

Subsequently, an APZ routine of FIG. 15 will be described. When an APZ command is transferred from the intra-body microcomputer μC1, the APZ routine is called at the main flow branching of step A15. In the APZ routine, a current focal length fn and a target focal length ft which is transferred from the intra-body microcomputer μC1 are compared. When they are the same, the zoom lens is not moved. Then, the mainFLW is set to 0 so that the process branches to Zpchk at the next and succeeding main flow branching. The process returns immediately thereafter. When the target focal length ft is larger than the current focal length fn, the zoom lens is moved in the telephoto direction (step A63). When it is shorter, the zoom lens is moved n the wide direction (step A62). Since driving of the zoom lens is performed through the pulse interrupt routine and the zoom timer interrupt routine which have been outlined in the description of the RESETZ routine, only the activation of the interrupt routines is performed in this routine. After zooming is activated, whether zooming is really activated or not is determined (step A64). When zooming is stopped, the mainFLW is set to 0, and the process returns. This is for a case where the zoom lens cannot be moved any more because it has reached the end limit.

While the zoom lens is moving, varifocal compensation calculation is performed (steps A66 and A67). Two types of varifocal compensation calculations are provided. One is VFCcalc1 (continuous calculation) for repeatedly calculating, according to a variation of focal length during zooming, a compensation value obtained at each point of time and the other is VFCcalc2 (one-shot calculation) for calculating a compensation value for a specified target focal length. The selection of types of the calculations is controlled from the intra-body microcomputer μC1 by use of CalcTyp (calculation type specifying) which is one of the data transferred through the LE communication mode (zoom command). Generally, the continuous calculation is selected when zooming is performed with respect to a moving subject and the one-shot calculation is selected when zooming is quickly performed with respect to a stationary subject.

Figure 16:
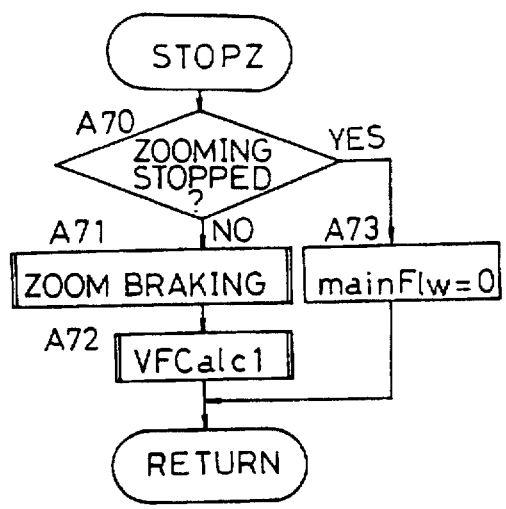
FIG. 16 is a flow chart of a STOPZ-operation of the intra-lens microcomputer.

Subsequently, a STOPZ routine (shown in FIG. 16) will be described. When the BL communication mode 0D is outputted, this routine is activated until the zoom lens is stopped. In this routine, first, whether the zoom lens has been stopped or not is determined (step A70). When it has been stopped, the mainFLW is set to 0 (step A73), and the process returns. When the zoom lens is moving, the zoom braking routine is called (step A71), and after zooming is inhibited, varifocal compensation calculation is performed. In this case, since a target focal length is not determined like in the APZ routine, the continuous varifocal calculation is performed (step A72). Thereafter, the process returns to the main routine. The STOPZ routine is called once every time the main loop process is executed once until it is determined that the zoom lens has been stopped at step A70. Consequently, varifocal compensation calculation is repeated just before the zoom lens is stopped.

Returning to the main routine of FIG. 12, after the process returns from each control routine, determination of a flag LatEn is made (step A22). This flag is reset to 0 when the intra-body microcomputer μC1 requests calculation of data for focus detection through the BL communication mode 04. Hereinafter, a flow from communication to focus detection data calculation will be described. In starting communication, the intra-body microcomputer μC1 charges the level of the CSLE signal from high to low. The signal CSLE is coupled to the intra-lens microcomputer μC2 through the body/lens mount portion terminal J3. The intra-lens microcomputer μC2, where a CSLE interrupt is permitted by the initialization process executed after the reset start (step A14 of FIG. 12), receives a signal representative of the level down of the CSLE, so that an interrupt is applied thereto.

Figure 23:
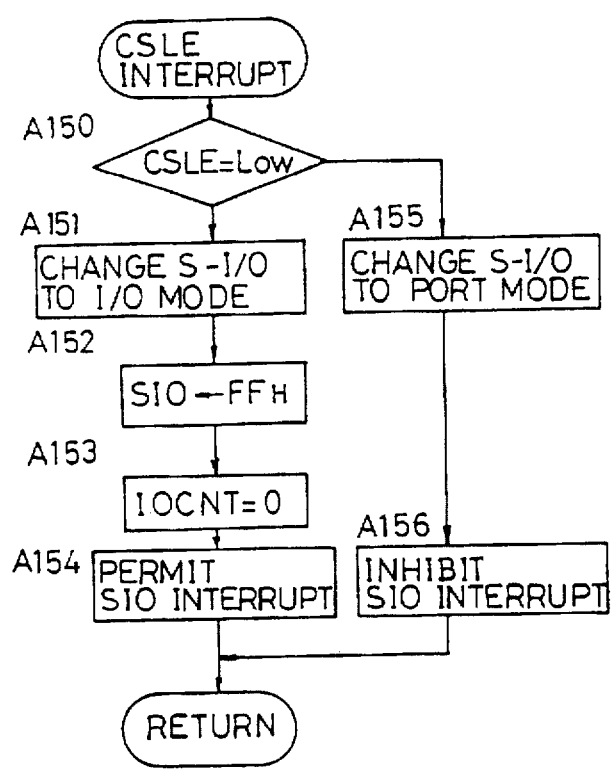
FIG. 23 is a flow chart of a CSLE interrupt operation of the intra-lens microcomputer.

When the CSLE interrupt is applied, a routine of FIG. 23 is activated. When communication is started, since the level of the CSLE is changed from high to low, after determination of the CSLE (A150), the process from step A151 is executed. In the process from step A151, the mode of the S-I/O portion is changed from the port mode HIZ to the S-I/O mode, FFH is written in an S-I/O input/output register SIO, an inside S-I/O transfer number counter IOCNT is set to 0, an S-I/O interrupt is permitted, and the process returns. Concerning data transfer, a value outputted to the SIO is transferred to the intra-body microcomputer μC1 in synchronization with the clock SCK which succeeds the transfer of the signal representative of the level down of the CSLE. Simultaneously, as input value from the intra-body microcomputer μC1 is inputted to the SIO. When the intra-body microcomputer μC1 repeats level up/down of the SCK eight times, transfer of one-byte data is completed, so that an SIO interrupt is applied to the intra-lens microcomputer μC2. Thereafter, an interrupt is applied in synchronization with the eight-time level up/down of the SCK, and at each time, one-byte communication is performed in synchronization with the SCK. This is performed until the level of the CSLE is increased an a high edge interrupt of the CSLE is applied. When the interrupt is applied, the mode of the S-I/O portion is changed to the port mode (HIZ condition) (step A165) and the S-I/O interrupt is inhibited (step A156).

Figure 24:
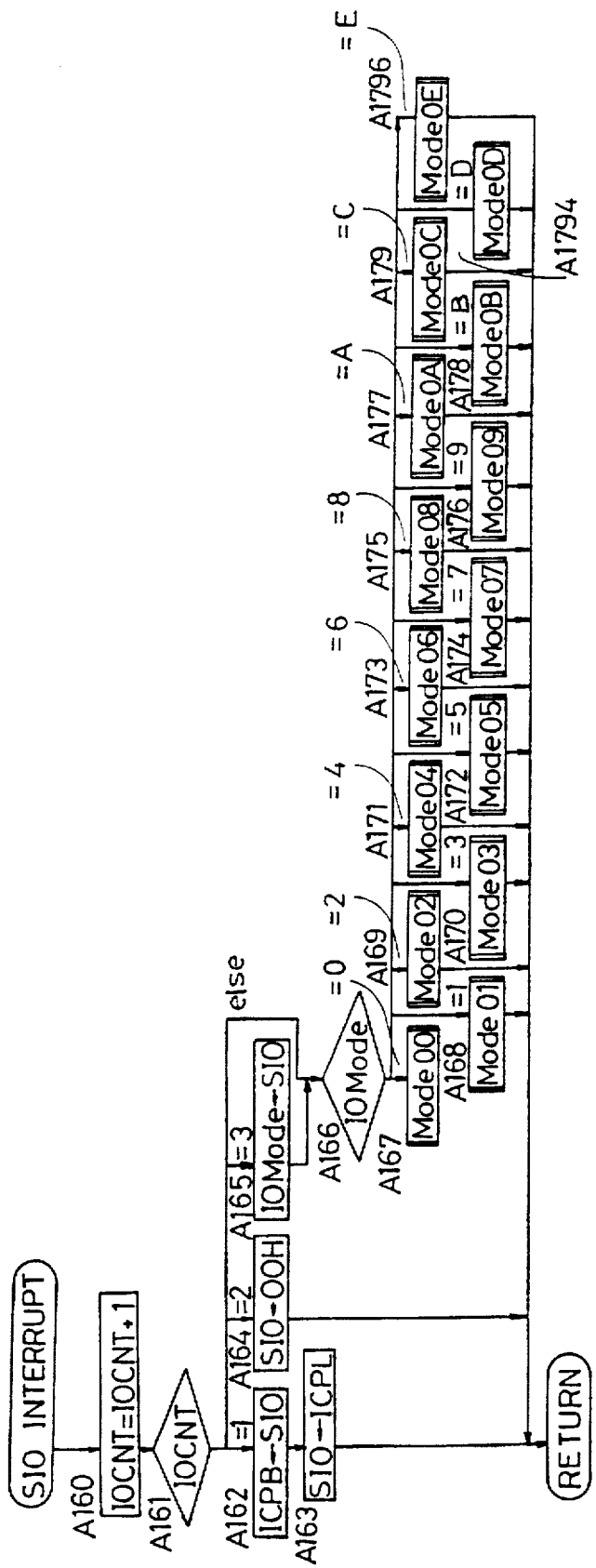
FIG. 24 is a flow chart of an SIO interrupt operation of the intra-lens microcomputer.
Figure 25:
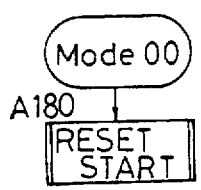
FIG. 25 is a flow chart of a communication mode 00 operation of the intra-lens microcomputer.
Figure 26:
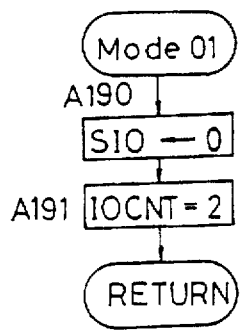
FIG. 26 is a flow chart of a communication mode 01 operation of the intra-lens microcomputer.
Figure 27:
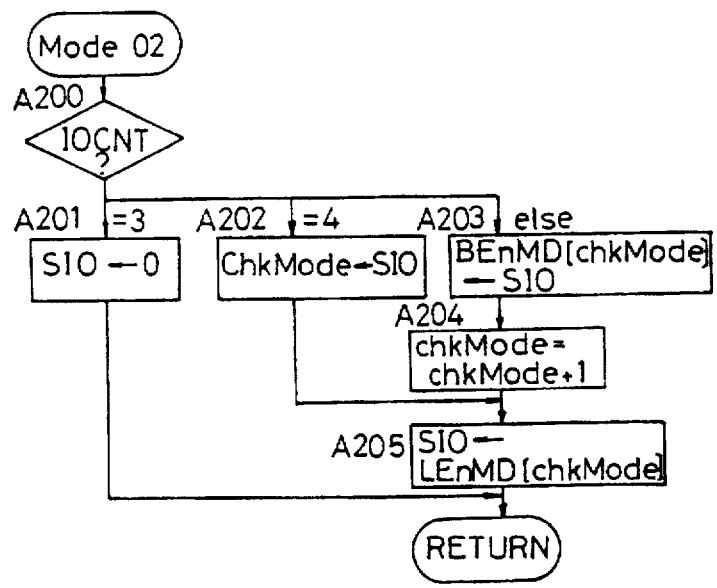
FIG. 27 is a flow chart of a communication mode 02 operation of the intra-lens microcomputer.
Figure 28:
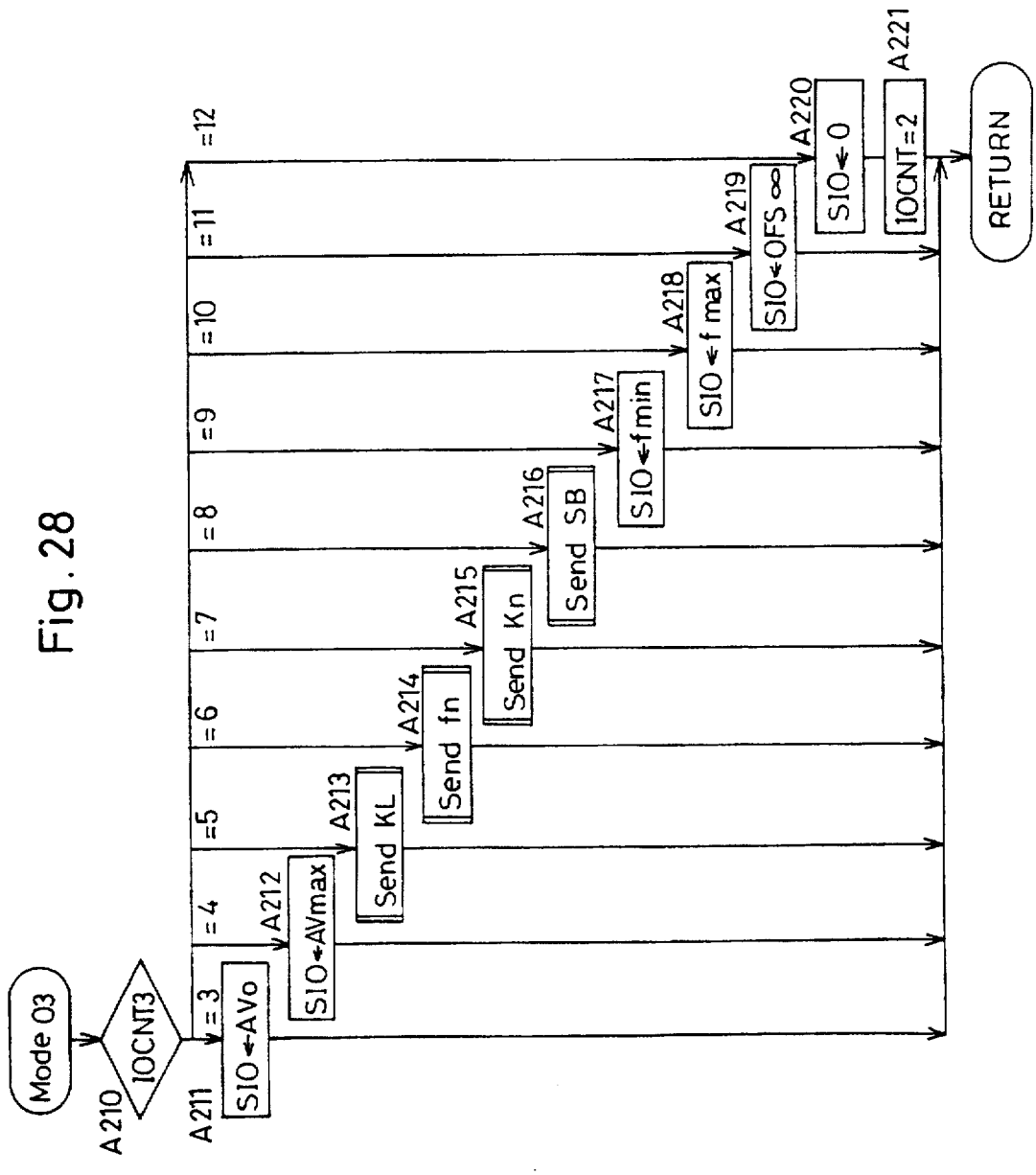
FIG. 28 is a flow chart of a communication mode 03 operation of the intra-lens microcomputer.
Figure 29:
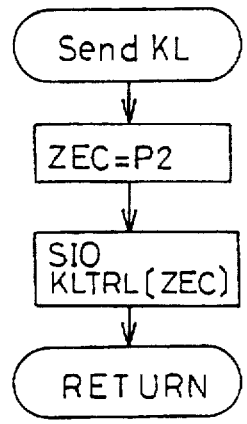
FIG. 29 is a flow chart of a SendKL operation of the intra-lens microcomputer.
Figure 30:
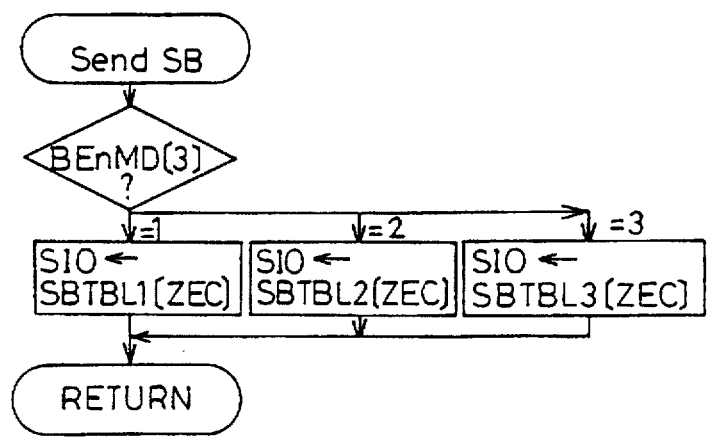
FIG. 30 is a flow chart of a SendSB operation of the intra-lens microcomputer.

Subsequently, a manner will be described where the BL communication mode 04 is executed through the SIO interrupt applied by completion of data transfer of each byte. When a first-byte data is transferred, an SIO interrupt routine (shown in FIG. 24) is activated. At the beginning of the interrupt process, the S-I/O transfer number counter IOCNT is incremented by one. The counter IOCNT, which is a counter (variable) for showing the byte number of communication, is incremented every one byte of the SOUT (FIG. 10) from the intra-body microcomputer μC1. Since the value of the counter IOCNT is initialized to 0 by a low interrupt of the CSLE when transfer of a first-byte data is completed and becomes 1 by the increment, the process from step A162 is executed. At the next and succeeding times, the process proceeds successively to steps A164, A165 and A166 according to a value of the counter IOCNT. For a third-byte data, a data representative of the kind of a succeeding communication is transferred. For the third-byte data, the intra-body microcomputer μC1 transfers 0411 as a data representative of the communication kind in order to set the communication mode 04 for teaching a timing of focus detection integration. The intra-lens microcomputer μC2 receives the data, temporarily stores 11 in a variable IOMode on a RAM (random access memory) (step A165), branches according to a value of the IOMode at step A166, and executes each routine. In this case, a subroutine Mode 04 is executed (step A171).

Figure 31:
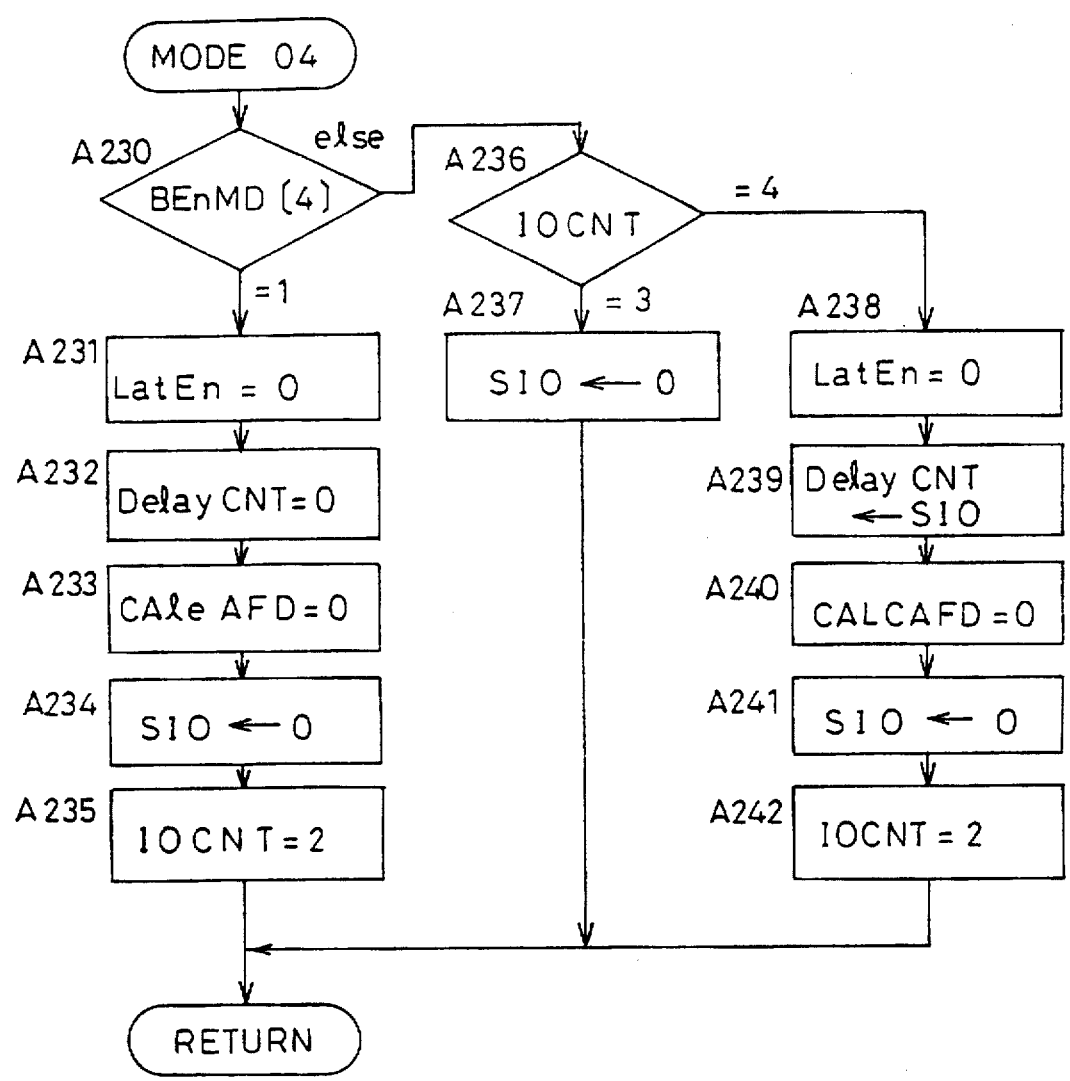
FIG. 31 is a flow chart of a communication mode 04 operation of the intra-lens microcomputer.
Figure 32:
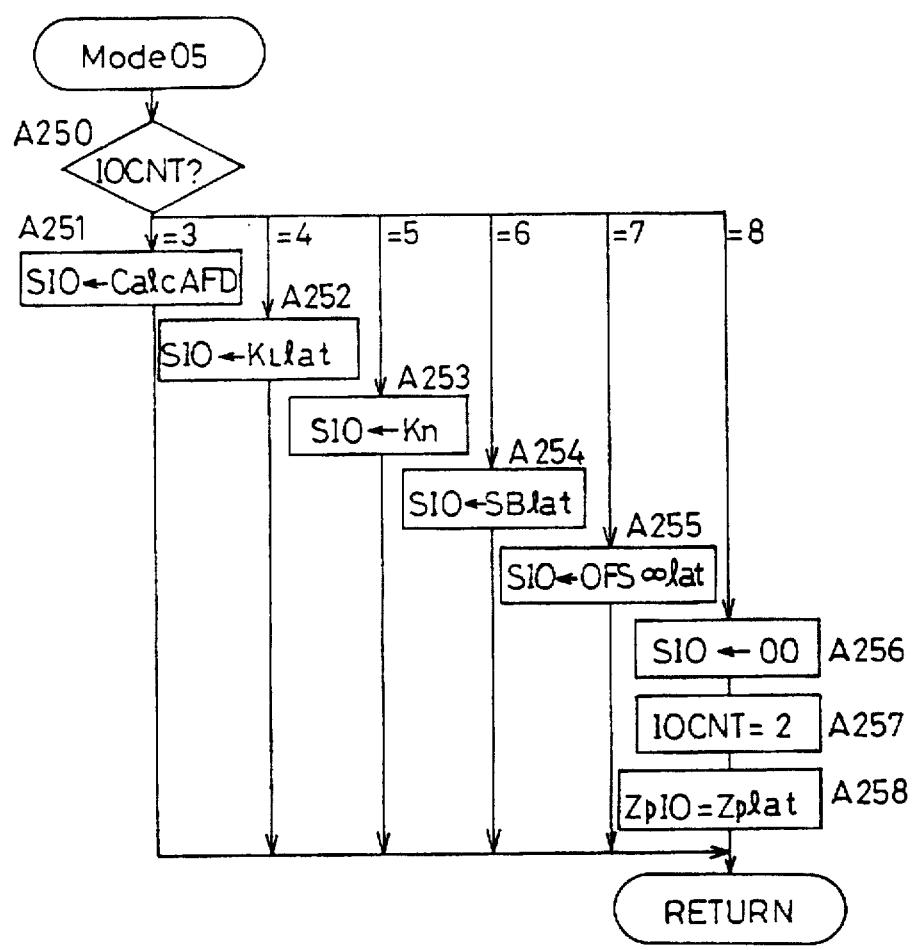
FIG. 32 is a flow chart of a communication mode 05 operation of the intra-lens microcomputer.
Figure 33:
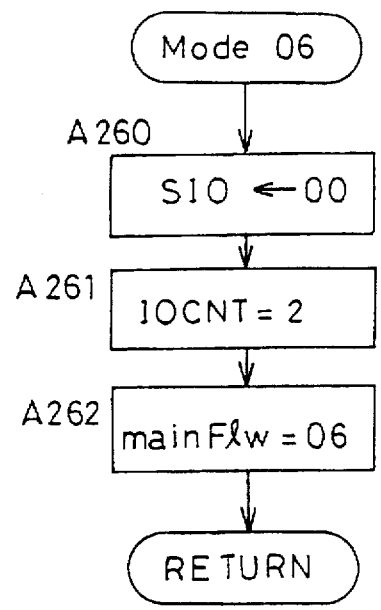
FIG. 33 is a flow chart of a communication mode 06 operation of the intra-lens microcomputer.
Figure 34:
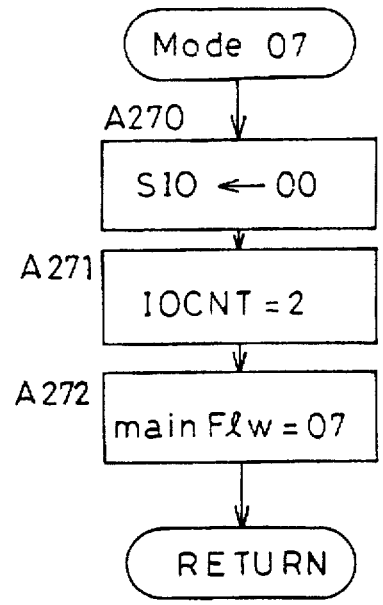
FIG. 34 is a flow chart of a communication mode 07 operation of the intra-lens microcomputer.
Figure 35:
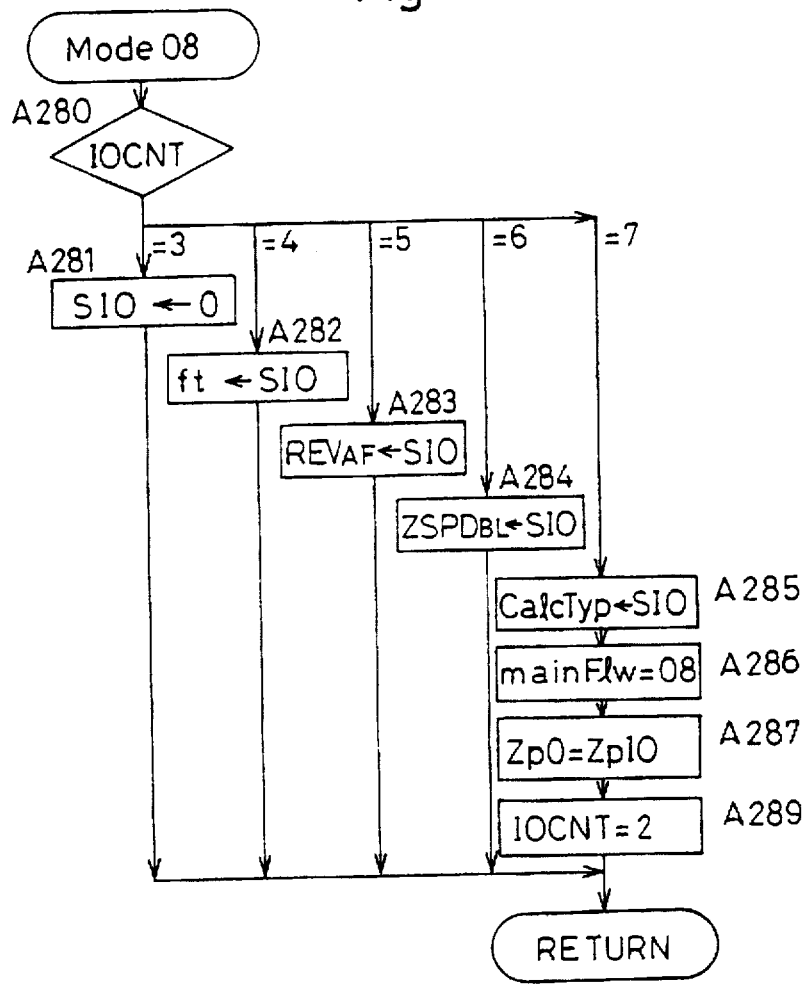
FIG. 35 is a flow chart of a communication mode 08 operation of the intra-lens microcomputer.
Figure 36:
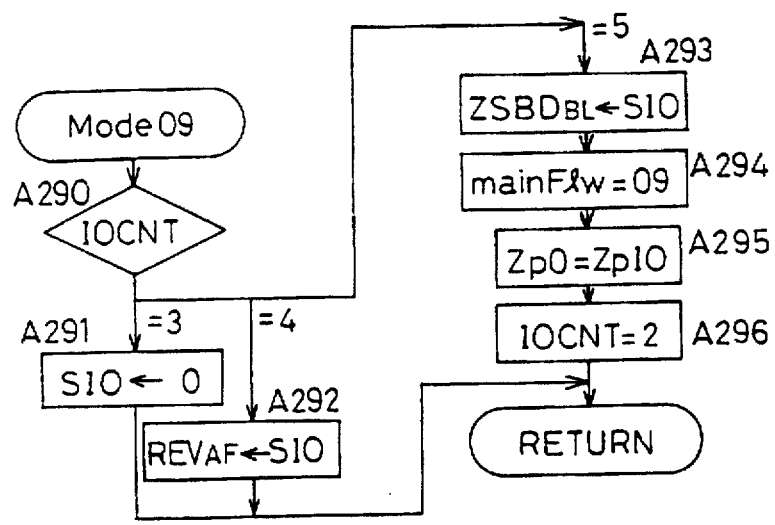
FIG. 36 is a flow chart of a communication mode 09 operation of the intra-lens microcomputer.
Figure 37:
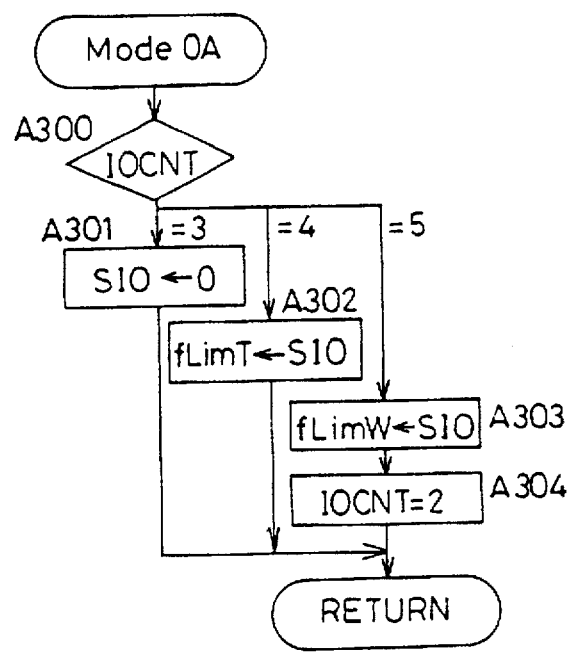
FIG. 37 is a flow chart of a communication mode 0A operation of the intra-lens microcomputer.
Figure 38:
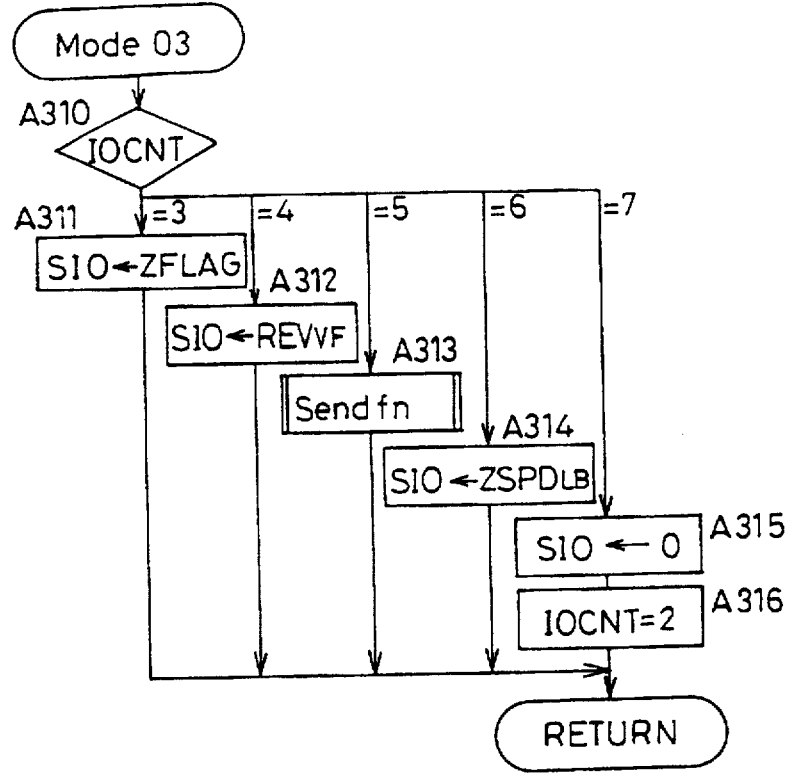
FIG. 38 is a flow chart of a communication mode 0B operation of the intra-lens microcomputer.
Figure 39:
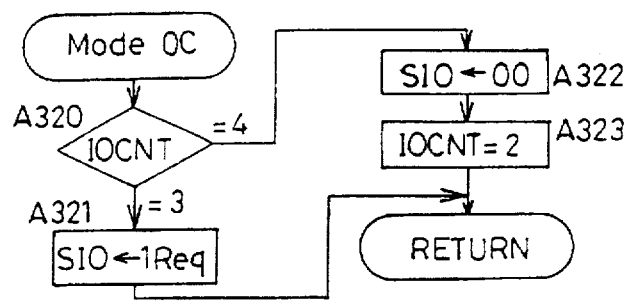
FIG. 39 is a flow chart of a communication mode 0C operation of the intra-lens microcomputer.
Figure 40:
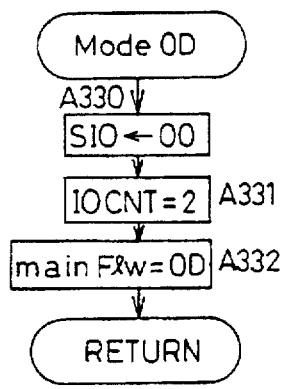
FIG. 40 is a flow chart of a communication mode 0D operation of the intra-lens microcomputer.
Figure 41:
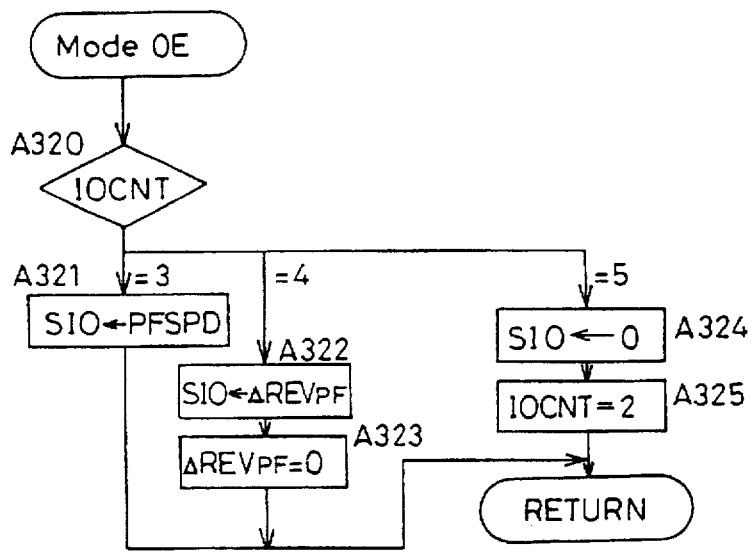
FIG. 41 is a flow chart of a communication mode 0E operation of the intra-lens microcomputer.

Hereinafter, the subroutine Mode 04 will be described with reference to FIG. 31. In this subroutine, first, whether the communication style is old or new is determined at step A230. A variable BEnMD[4] is a data obtained through the communication mode 02 (to be described later). When the BEnMD[4] is 1, the communication style is old and no more data are transferred in this communication. Accordingly, a DelayCNT is set to 0, the IOCNT is set to 2, and the process returns. When the IOCNT is set to 2, in the next SIO interrupt the process proceeds to steps A161 and A165 of FIG. 24 to move to another communication mode determination. When the BEnMD[4] is other than 4, the communication style is new and another communication data succeeds. Accordingly, after 0 is outputted to the SIO as a dummy, the process returns. After transfer of a fourth-byte data is completed, the process proceeds to the flow from step A238 to A242. That is, in the transfer process of the fourth-byte data, first, the flat LatEn is reset to 0, the variable DelayCNT is set to the value of the transferred data, a focus detection data calculation completion flag CALCAFD is reset to 0, 0 is outputted to SIO as a dummy, the IOCNT is set to 2, and the process returns. The IOCNT is set to 2 for the same reason as the above.

Figure 19:
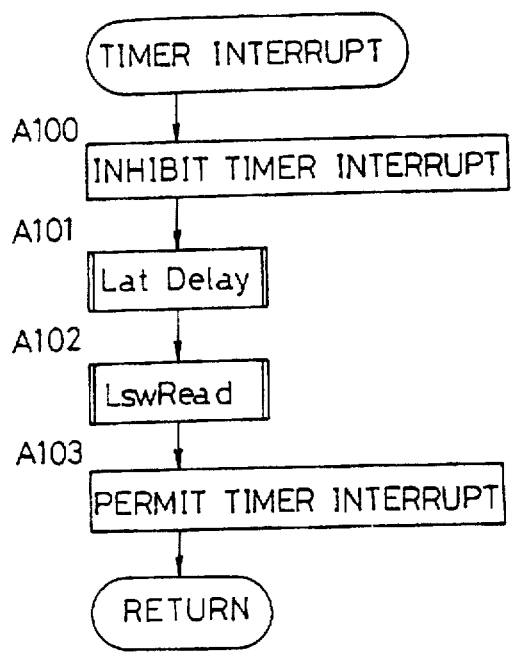
FIG. 19 is a flow chart of a timer interrupt of the intra-lens microcomputer.
Figure 20:
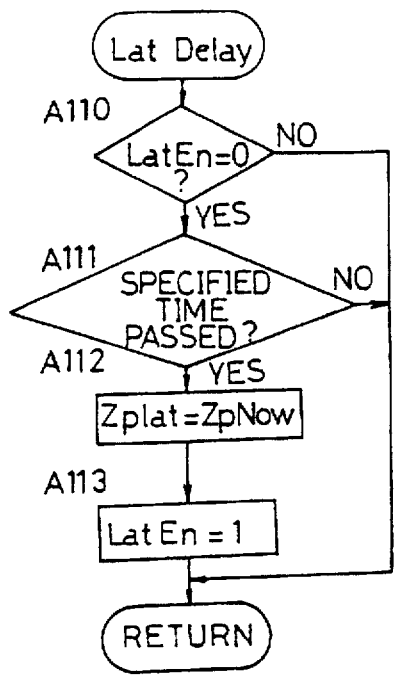
FIG. 20 is a flow chart of a LatDelay operation of the intra-lens microcomputer.

Hereinafter, the execution of a timer interrupt routine, shown in FIG. 19, for data taking-in which is performed is synchronization with a Delay (time lag of CCD integration start) specified by the intra-body microcomputer μC1 will be described. The timer interrupt routine is initialized at step A14 of the reset start routine of FIG. 12 and thereafter, as interrupt is applied every 1 msec. Every time the timer interrupt routine is executed, a subroutine LatDelay shown in FIG. 20 is executed. The flag LatEn is 0 immediately after the communication mode 04 is completed, and accordingly, the process proceeds directly to the next step A111 at determination of step A110 when this subroutine is called for the first time. Then, with reference to the data DelayCNT specified at a subsequently-described step A230 of FIG. 31 and obtained through communication, whether a specified time has passed or not is determined. When the specified time has not passed, the process directly returns. When the LatDelay is called through the timer interrupt after the specified time has passed, the process proceeds to step A113. After a current zoom position ZpNow is copied to a variable ZpLat (step A112), the flat LatEn is set to 1.

Now, various communication modes will be described.

BL communication mode 00 is a communication for resetting (initializing) the intra-lens microcomputer μC2 in a software manner. It is used for resetting the operations of hardware where an error is caused due to noises.

BL communication mode 01 is actually a communication where no data is transferred. It is provided as a dummy for earning time required for determining a communication content by use of the value of a data received through serial communication.

BL communication mode 02 is a communication for confirming compatibility of a camera body and a lens which are combined. After a BL communication mode data is outputted, the camera body and the lens output compatibility data showing whether or not communication is possible with respect to each of the communication modes 00, 01, 02, . . . . . Receiving the data, the camera body and the lens determine compatibility. Each BL communication mode corresponds to each function (e.g. power zoom, power focus). When a communication is determined to be impossible, a function thereof can also be determined to be inoperable.

BL communication mode 03 is a communication for transmitting all the lens characteristics data to the intra-body microcomputer μC1. The following data are transmitted through this communication: AVo; AVmax; KL; fn; Kn; ΔSB; fmin; fmax; and OFS∞. Avo is an open aperture value. AVmax is a maximum aperture value. KL is a conversion coefficient (drive amount conversion coefficient) for converting a defocus amount to an AF coupler drive amount. fn is a current focal length. Kn is a conversion coefficient (distance conversion coefficient) for converting a moving-out amount to a distance. ΔSB is a difference, between a file surface and an AF sensor surface, which is used for correction of a focus detection output. fmin and fmax are minimum and maximum focal lengths, respectively, which are used to determine a zoom range for APZ (auto program zoom). OFS∞ is a moving-out amount, with respect to an infinity subject distance, used as a correction data for distance calculation.

BL communication mode 04 is a communication for transmitting a timing of the CCD integration to the intra-lens microcomputer μC2. The data transmitted as a one-byte data through this communication is Delay which represents time from the completion of the communication to the midpoint of the CCD integration. Based on this data, the intra-lens microcomputer μC2 calculates various data, such as a coefficient for converting the defocus amount to a lens drive amount, which data are obtained at the middle of the CCD integration. In an old-type camera body, the Delay time cannot be specified, so that the intra-lens microcomputer μC2 starts optical data calculation on completion of communication. In this embodiment, in order to enable employment of an old-type camera body (lens), whether the Delay is to be used or not is determined after compatibility is confirmed through the BL communication mode 02.

BL communication mode 05 transfers an output result of the BL communication mode 04. Through this communication, data used for focus detection calculation and distance calculation are transferred. The following are the data transferred: CalcAFD; KL; Kn; ΔSB; and ΔFS∞. The data KL, Kn, ΔSB and OFS∞ are of the same kind as those transferred through the BL communication mode 03. However, the data transferred through this communication are data corresponding to the time specified through the BL communication mode 04. That is, data which are obtained at the middle of the CCD integration. CalcAFD is a focus detection data calculation completion flag (1: completed, 0: not completed) for showing whether the above four-byte data has been calculated by the intra-lens microcomputer μC2 or not.

BL communication mode 06 is a communication for causing the intra-lens microcomputer μC2 to initialize the zoom lens. The initialization of the zoom lens is to reset various data provided in the intra-lens microcomputer μC2 and to move the zoom lens to a specified waiting position. In this embodiment, after the zoom lens is moved to the wide limit, zoom lens position information (ZpNow) is initialized.

BL communication mode 07 is a communication for moving the zoom lens to a position where the zoom lens length is minimum. This communication, which is performed in response to the turning off of the main switch SW of the camera body, is used to moving the zoom lens to a position where it is compactest so that storage of the camera is facilitated.

BL communication mode 08 is an auto power zoom (APZ) communication for moving the zoom lens until a specified focal length is obtained. Receiving this communication, the intra-lens microcomputer μC2 moves the zoom lens until a specified focal length is obtained and starts varifocal compensation calculation. The following data are transferred through this communication: ft; REVAF; ZSPDBL; and CalcTyp. ft is a target focal length. REVAF is a moving-out amount required for obtaining in-focus condition. It corresponds to dx of the above-mentioned varifocal compensation equation (3). ZSPDBL is a zoom drive speed (upper limit). In APZ where a magnification of a moving subject is maintained, it is used for performing zooming according to a speed of a moving subject to realize a smooth zooming. CalcTyp is a specification of calculation type (0: continuous VF calculation, 1: one-shot VF calculation). The continuous VF calculation is a calculation method where a compensation calculation value is calculated with respect to a focal length obtained at each point of time during zooming. An image plane is always located at an in-focus position. In performing continuous AF for a moving subject, the moving subject can always be maintained at an in-focus position if the continuous VF calculation is used together therewith, which produces an excellent result. The one-shot VF calculation is a calculation method where a compensation calculation value is obtained with respect to a specified focal length. Since it is unnecessary to perform calculation with respect to a focal length obtained in the middle of zooming, a varifocal compensation calculation value with respect to a final zoom position can be calculated at a high speed. For this reason, this calculation is used when time lag reduction is required, for example, when zooming is performed in a motion at a high speed.

BL communication mode 09 is a communication for permitting manual power zoom (MPZ). Receiving a manual power zoom permission, the intra-lens microcomputer μC2 starts to move the zoom lens according to the user's operation of the zoom ring and starts varifocal compensation calculation. As vari-focal compensation calculation in this communication, the above-described continuous VF calculation is performed since a final focal length is unknown (because zooming is carried out by the user's operation of the zoom ring in this case) and it is necessary to obtain in-focus condition in the finder. The following data are transferred: REVAF; and ZSPDBL. REVAF is a moving-out amount required for obtaining in-focus condition. It is the same as that of the BL communication mode 08. ZSPDBL is a zoom drive speed (upper limit). It is the same as that of the BL communication mode 08.

BL communication mode 0A is a communication for limiting a zooming possible range for manual power zoom. The following data are transferred: fLimT; and fLimW. fLimT is a telephoto side limit for manual power zoom. fLimW is a wide side limit for manual power zoom. This communication is used when a zoom range is limited for a specific photographing scene (for example, the zoom lens is prevented from unnecessarily being moved toward the wide side when only a far subject is taken).

BL communication mode 0B is a mode where data showing various zoom lens conditions are transferred. The following data are transferred: MovingT; MovingW, EndZT; EndZW; ILLops; CalcREV; ZFLGEn; REVVF; fn; and ZSPDLB. MovingT and MovingW are flags which are set to 1 according to a driving direction thereof, respectively. EndZT and End2W are 1 when the zoom lens is at the telephoto and the wide limits, respectively. ILLops is 1 when the intra-lens microcomputer μC2 determines that the current zoom position ZpNow is incorrect. This occurs when the zoom lens is forcibly moved by external force. Referring to this flag, the intra-body microcomputer μC1 returns the zoom lens condition to a normal one by the initialization of the zoom lens (BL mode 06). CalcREV is a flag showing whether a subsequently-described varifocal compensation calculation has been completed or not (1: completed, 0: not completed). ZFLGEn is a flag showing whether or not the intra-lens microcomputer μC2 has completed an operation which is to be performed in response to a zoom drive command transmitted by the intra-body microcomputer μC1 (1: completed, 0: not completed). REVVF is a varifocal compensation drive amount for the previously-transmitted zoom drive command (BL mode 09). fn is a current focal length used by the intra-body microcomputer μC1 for monitoring a zoom lens position during zooming. ZSPDLB is a current moving speed of the zoom lens. It is used as a feedback control data for realizing a smooth zooming when AFZ is performed for a moving subject.

BL communication mode 0C is a communication for informing the intra-body microcomputer μC1 of lens switch information (relating to the user's operation). The following data are transferred: PZEn; ReqZT; ReqZW; Req2W; ReqPFN; and ReqPFl. PZEn is a data showing whether power zoom is possible or not (1: possible, 0: impossible). It is 0 when the zoom clutch (not shown) is uncoupled in response to a manual operation. ReqZt and ReqZW are data for informing that manual power zoom has been performed. ReqPFN and ReqPFI are data for informing that manual power focus has been performed.

BL communication mode 0D is a zoom stop command for a power zoom lens.

BL communication mode 0E is a communication for transmitting from the intra-lens microcomputer μC2 to the intra-body microcomputer μC1 an AF coupler drive amount obtained during power focus. The following data are transmitted: PFSPD; and ΔREVPF. PFSPD is a data for specifying an upper limit of an AF coupler drive speed obtained during power focus. ΔREVPF is a partial integration value of the AF coupler drive amount obtained during power focus. The intra-body microcomputer μC1 realizes power focus by motor-driving the AF coupler by receiving the above-mentioned two data.

Returning to the main routine of FIG. 12, at step A22, whether a focus detection data is to be calculated or not is determined with reference the LatEn. As described previously, the LatEn is 0 when the time specified by the intra-body microcomputer μC1 has not yet passed. At this time, the process proceeds from step A22 to step A15 to continue the loop. When the specified time has passed, since the LatEn is 1, the process proceeds from step A22 to a focus detection data calculation subroutine to start calculation of data required by the intra-body microcomputer μC1 (step A23). After the calculation is completed, the focus detection data calculation completion flag CalcAFD which is reset to 0 through the communication mode 04 is set to 1 (step A24), and thereafter, the main loop is continued.

Figure 21:
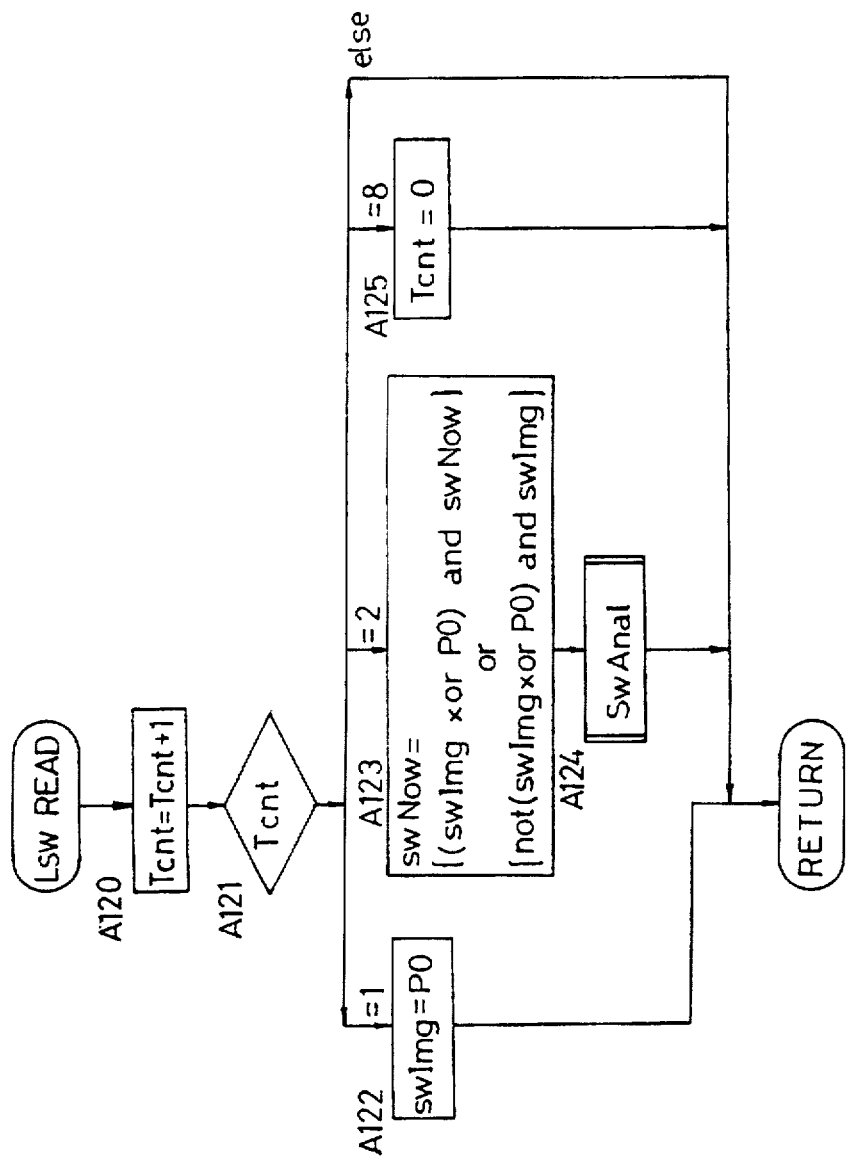
FIG. 21 is a flow chart of a LawRead operation of the intra-lens microcomputer.

Subsequently, the timer interrupt routine of FIG. 19 will be described. As described above, after the reset start process and the initialization process are completed, an interrupt is applied every 1 msec. The subroutine LatDelay has already been described with reference to FIG. 20. A subroutine LawRead which is called every time an interrupt is applied every 1 msec will be described with reference to FIG. 21. A variable Ten: is increased by one every time an interrupt is applied, and cleared to 0 when it becomes 8. Its initial value is 0.

Accordingly, (1) at first interrupt (1 msec), values of the switches are read and stored in a variable swing (step A122).

(2) At a second interrupt (2 msec), values of the switches are read. A result thereof is compared with the content of the swing and a result swNow of the previous value reading, and only a portion, of the current switch condition, which coincides with swimg is renewed in swNow (step A123). Thereafter, a switch information analyzing routine SwAna1 (step A124) is called, and the process returns.

(3) At a third, a fourth, a fifth, a sixth and a seventh interrupts (3, 4, 5, 6, and 7 msec), the process directly returns.

(4) At an eighth interrupt (8 msec), Tcnt is set to 0 as described above (step A125).

At the above steps (1) to (4), switch information is read twice every 8 msec with an interval of 1 msec. Thereafter, the switch information is analyzed. In order to prevent chattering, the information is read twice with an interval of 1 msec to confirm the coincidence thereof. When the results of the two information readings do not coincide with each other, the difference portion is not renewed and an old value is maintained in the swNow.

Figure 22:
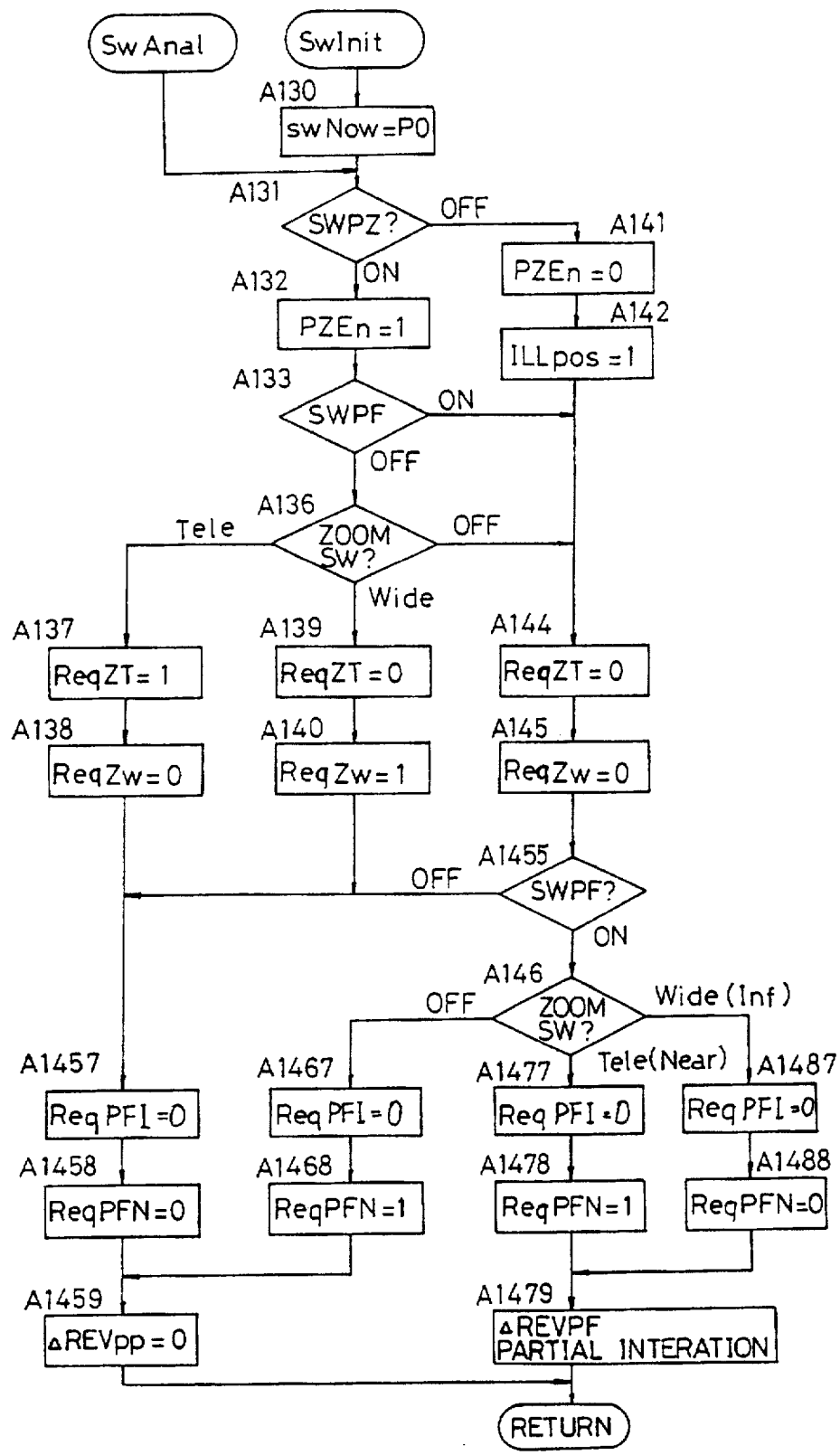
FIG. 22 is a flow chart of a SwAnal operation of the intra-lens microcomputer.

In the switch condition analyzing routine SwAna1 shown in FIG. 22, first, the condition of the zoom clutch is confirmed by determining whether a clutch switch SWPZ is ON or not (step A131). When the zoom clutch is coupled (SWPZ is ON), the flag PZEn showing that power zoom is possible is set to 1 (step A132), and each flag is set or reset according to a condition of the zoom switch (steps from A133). When the zoom clutch is not coupled, the flag PZEn is set to 0 (setp A141), and the flag ILLpos is set to 1 (step A142). Moreover, flags relating to the zoom requests are all reset to 0 without any request (steps A144 and A145). When SWPF (switch SPF of FIG. 4) for sensing that the power focus operation member is being operated is OFF at step A133, the condition of the zoom switch (switch SPF of FIG. 4) is read. When it is determined from a result thereof that the power zoom operation member is being operated, the power zoom requests ReqZT and ReqZW are set to 1 or reset to 0 according to a direction (telephoto or wide direction)

specified by the operation (steps A137 to A140). Thereafter, since the power zoom is ON, the power focus request flags ReqPF1 and ReqPFN are both reset to 0 in order to set no power focus request condition (steps A1457 and A1458), and the power focus partial integration amount is set to 0 (step A1459). Then, the process returns.

When it is determined that the zoom clutch switch is OFF at step A131, the flag PZEn is set to 0 in order to show that power zoom is impossible (A141). Then, the flag ILLpos showing that zooming is under an uninitialized condition is set to 1 (step A142). Thereafter, or when it is determined that a power focus operation has been selected at the above-mentioned step A133 and when it is determined that a zooming operation is not being performed at step A136, the power zoom request flags ReqZT and ReqZW are reset to 0 in order to withdraw the power zoom request transmitted to the intra-body microcomputer μC1 (steps A144 and A145). At a succeeding step A1456, whether the power focus operation member is being operated or not is determined. When it is determined that the power focus operation member is not being operated, the above-described steps A1457 to A1459 are executed in order to withdraw the power focus request transmitted to the intra-body microcomputer μC1. When it is determined that the power focus operation member is being operated, the condition of the zoom switch is determined. When it is at OFF position, determining that focus hold is requested, the power focus request flags ReqPF1 and ReqPFN are both set to 1 (steps A1467 and A146), and the power focus partial integration amount ΔREVPF is set to 0 (A1459). Then, the process returns. When it is determined at the zoom switch condition determination of step A146 that the zoom ring is operated toward an infinity or a near direction, the flag ReqPF1 is set to 1 (or reset to 0) and the flag ReqPFN is reset to 0 (or set to 1) in order to make a request of zooming toward infinity or near side (steps A1477 to A1478, A1487 to A1488). Thereafter, a power focus operation (drive) amount during an activation period (8 msec) of this routine SwAna1 is integrated (added) as the power focus partial integration amount ΔREVPF (step A1479). Then, the process returns.

Subsequently, a power focus sequence executed in this embodiment will be described. This embodiment employs a power focus system suitable for a method, which is one of conventional AF drive methods, where a focusing lens provided in the lens is moved by a motor provided in the camera body through an AF coupler of a mount portion (this method will hereinafter be referred to as intra-body micro-computer method). In this embodiment, power focus is performed by transmitting from the intra-lens microcomputer μC2 to the intra-body microcomputer μC1 a power focus drive amount obtained based on an operation of a power focus operation member provided to the lens and by driving a focus lens provided in the lens through an AF motor provided in the camera body. Hereinafter, an outline of the power focus sequence will be described with reference to FIG. 11. In FIG. 11, sc is a communication for transmitting a power focus drive amount from the intra-lens microcomputer μC2 to the intra-body microcomputer μC1. The transmission is periodically performed once every several tens of msec. If this communication is performed with a longer period, since an interval between data taking-in of the body increases, operation responsibility deteriorates. As a result, smooth operation cannot be realized. On the contrary, when the period is too short, since time where the intra-body microcomputer μC1 and the intra-lens microcomputer μC2 are engaged in sequences other than the power focus sequence (e.g. focus detection, automatic exposure) decreases, performance of functions other than power focus deteriorates.

In the above communication, the intra-lens microcomputer μC2 integrates the amount of the power focus operation made between communications (the integration amount will hereinafter be referred to as power focus operation partial integration amount). The integration amount is transmitted to the intra-body microcomputer μC1 through communication. Regarding the transmitted operation amount as a drive amount, the intra-body microcomputer μC1 drives the AF coupler. Power focus is performed by repeating the above process. In this embodiment, a power focus speed is also transferred from the intra-lens microcomputer μC2 to the intra-body microcomputer μC1 in the communication where the power focus operation partial integration amount is transmitted. The reason why both the power focus operation partial integration amount and the power focus speed are transmitted is: if only the drive amount (power focus operation partial integration amount) is transmitted, since the focusing lens is controlled so as to move only by a specified drive amount while communication is halted, it is stopped after moved by the specific drive amount, while if only the speed is transmitted, the driving of the focusing lens continues forever unless it is determined, while communication is halted, that only the speed is transmitted and unless a special process is provided. The employment of the special process makes the system more complicated. For example, a problem arises that the capacity of a ROM is increased.

Moreover, a timing for performing communication is determined with respect to each intra-body microcomputer μC1. At this time, if only the speed is transmitted, it is very difficult to control an absolute position of the focusing lens through the intra-lens microcomputer μC2 since it is impossible to control a communication interval. On the contrary, if only the drive amount is transmitted, the absolute position control can be realized with no special process. Moreover, the speed is also transmitted for the following reason. If the focusing lens is driven only with the drive amount, the driving is completed in a short period of time if the driving amount if small, that is, the focusing lens driving becomes intermittent like driving, stopping, driving, stopping, . . . . Thereby, operation smoothness deteriorates. In order to prevent this, it is necessary to drive the focusing lens at a low speed when the drive amount is small. When only the drive amount is transmitted from the intra-lens microcomputer μC2 to the intra-body microcomputer μC1, it is possible for the intra-body microcomputer μC1 to calculate the speed based on the transmitted drive amount and a communication interval controlled by the intra-body microcomputer μC1. In this system, however, operations are allotted to the intra-body microcomputer μC1 and the intra-lens microcomputer μC2, and the speed calculation is performed by the intra-lens microcomputer μC2 to increase the operation speed of the entire system.

Subsequently, the process executed by the intra-body microcomputer μC1 will be described. When the battery E1 is attached to the camera body BD shown in FIG. 3, in the intra-body circuit, the battery attachment detection switch SRE1 is turned off, the reset capacitor C1 is charged through the resistor R1, and a reset signal whose level is changed from low to high is inputted to the reset terminal RE1 of the intra-body microcomputer μC1. By the input of the reset signal, the intra-body microcomputer μC1 starts to generate a clock by use of hardware provided therein, activates the DC/DC converter DD and is supplied with the voltage VDD at which it can operate to execute a reset routine shown in FIG. 42. Under a subsequently-described sleep condition, the intra-body microcomputer μC1 halts to generate a clock and the DC/DC converter DD halts its operation. In an operation which is started by an interrupt applied under sleep condition, the clock generation and the operation of the DC/DC converter DD are started by the hardware which is provided in the intra-body microcomputer µC1 similarly to the above-described battery attachment case.

Figure 42:
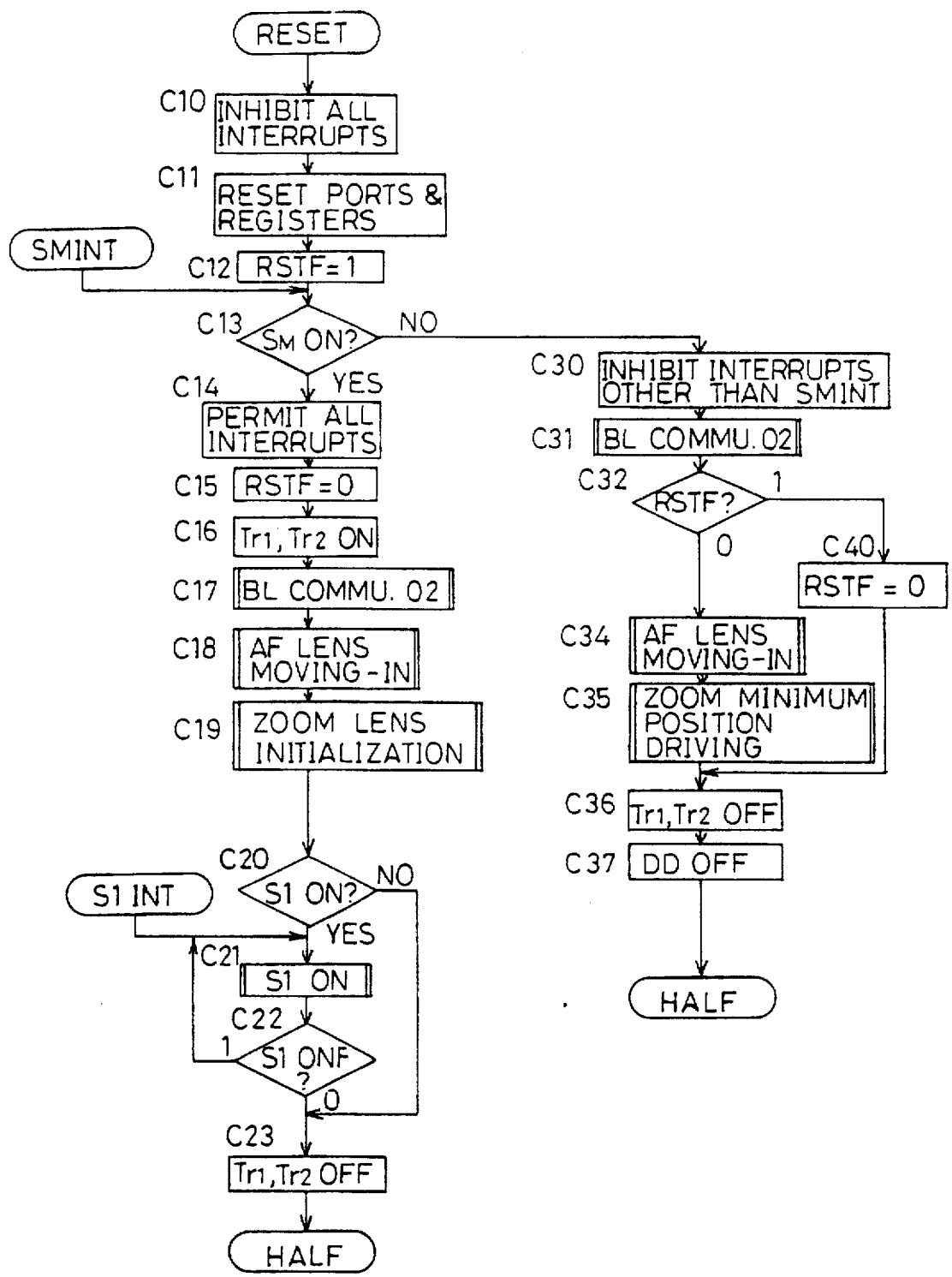
FIG. 42 is a flow chart of a reset operation of an intra-body microcomputer.

In the reset routine of FIG. 42, first, all the interrupts are inhibited, various ports and registers are reset, and a flag RSTF showing that the process has passed the reset routine is set (steps C10 to C12). Then, at step C13, whether the main switch SM is ON or not is determined. Moreover, when the main switch SM is turned from on to off or from off to on, an interrupt SMINT is applied through the operation of the main switch SM so that the process from step C13 is executed. When the main switch SM is ON at step C13, all the interrupts are permitted, the flag RSTF showing that the process has passed the reset routine is reset, and the levels of the output ports PW1 and PW2 which are power control terminals are changed to high, respectively, in order to enable the transistors Tr1 and Tr2 (steps C14 to C16).

Figure 52:
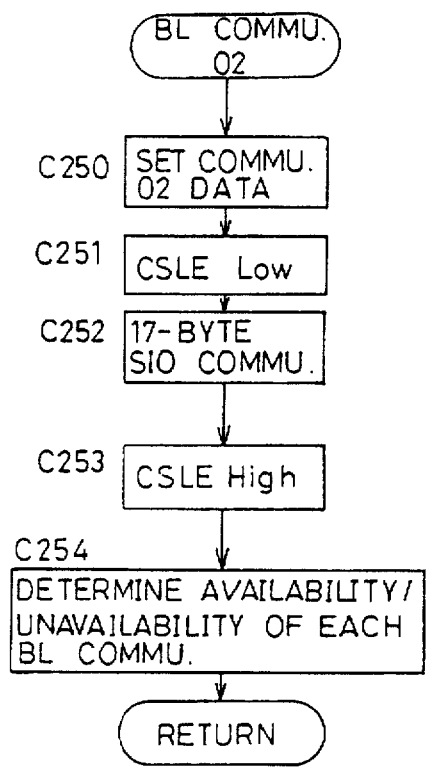
FIG. 52 is a flow chart of a BL communication 02 operation of the intra-body microcomputer.
Figure 53:
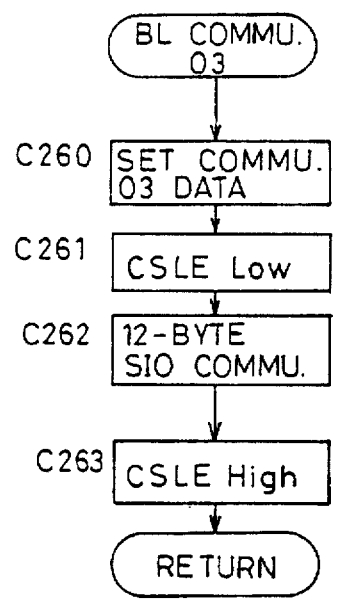
FIG. 53 is a flow chart of a BL communication 03 operation of the intra-body microcomputer.
Figure 54:
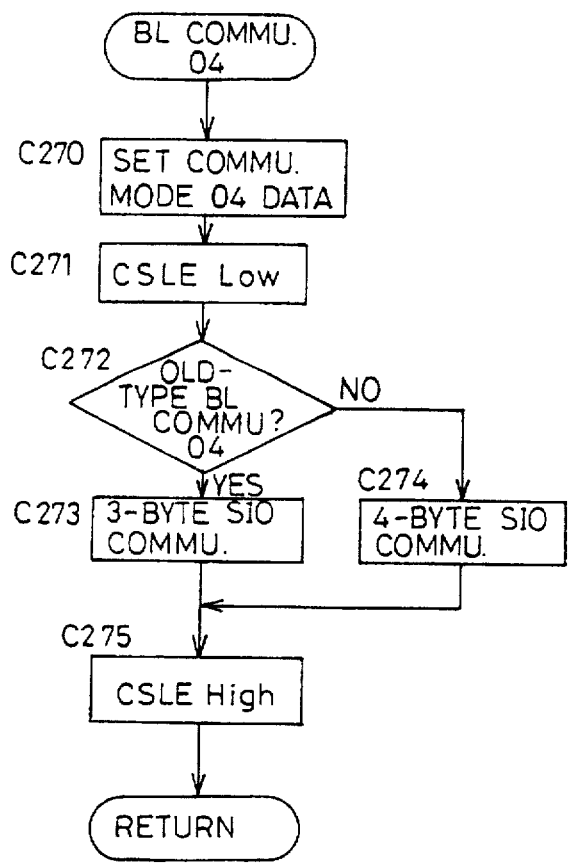
FIG. 54 is a flow chart of a BL communication 04 operation of the intra-body microcomputer.

Then, at setp C17, a BL communication 02 subroutine (FIG. 52) is executed. In the BL communication 02 subroutine, the previously-mentioned compatibility confirmation data for the communication of each mode is set at step C250, the level of the CSLE is changed to low, 17-byte data transfer is completed, the level of the CSLE is changed to high, and the communication is completed (steps C251 to 253). Thereafter, availability/unavailability of each BL communication is determined by use of a data received from the intra-lens microcomputer µC2 (step C254). As described above, since each BL communication mode represents a function particular to each BL communication, a function provided to the lens can be determined through this communication. In this embodiment, whether power zoom is possible or impossible is determined with reference to the BL communication modes 06 to 0D.

Figure 43:
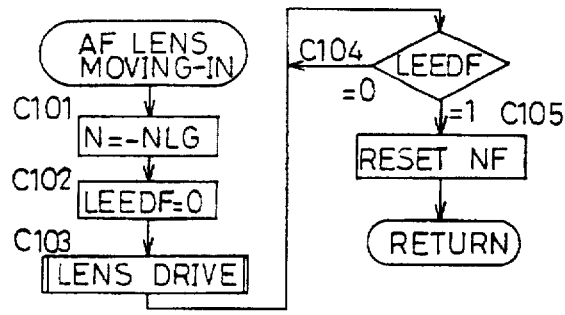
FIG. 43 is a flow chart of an AP lens moving-in operation of the intra-body microcomputer.

Returning to FIG. 42, at step C18, the AF lens is moved in. In an AF lens moving-in subroutine (shown in FIG. 43), NLG (negative value with a high absolute value) is set as a counter N indicating a drive amount of the AF lens, and after a flag LEEDF showing that the AF lens has reached to an end limit is reset to 0, a lens drive subroutine (not shown) is called (steps C101 to C103). The lens drive subroutine is a subroutine for driving the AF lens by a drive amount indication by the counter N. When it is detected that the AF lens has reached an end limit before the AF lens has been moved by the indicated drive amount, power supply to the AF motor is stopped and the end limit detection flag LEEDF is set to 1. After the lens driving is started, the process walls until the AF lens reaches an end limit (that is, until the flag LEEDF is set to 1) at step C104. When the AF lens reaches an end limit, an AF lens moving-in amount which is used thereafter is reset to a reference value (setp C105) to finish this routine.

Figure 61:
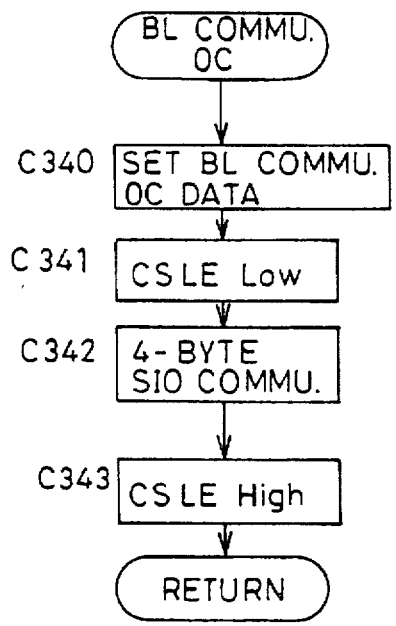
FIG. 61 is a flow chart of a BL communication 0C operation of the intra-body microcomputer.

Thereafter, initialization of the zoom lens is performed (FIG. 42, step C19). In a zoom lens initialization routine (shown in FIG. 44), first, whether the zoom lens is a power zoom lens or not is determined based on a data supplied from the intra-lens microcomputer µC2 in the previously-performed BL communication mode 02 (step C110). When it is not a power zoom lens, since the initialization of the zoom lens is unnecessary, the process directly returns. When it is a power zoom lens, the BL communication 0C is executed (step C111). In a BL communication 0C routine (shown in FIG. 61), after a data to be transmitted from the intra-body microcomputer µC1 to the intra-lens microcomputer µC2 through this communication is set (step C340), the level of the CSLE is changed to low (step C341), a four-byte communication is performed (step C342), and after the level of the CSLE is changed to high (step C343), the process returns.

Figure 56:
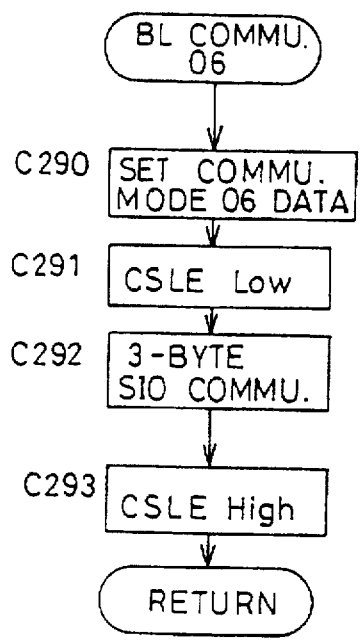
FIG. 56 is a flow chart of a BL communication 06 operation of the intra-body microcomputer.
Figure 57:
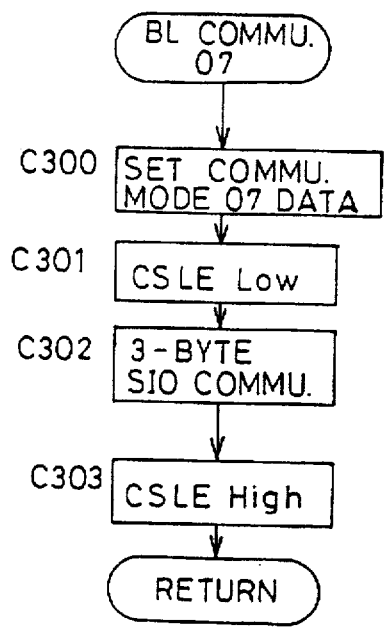
FIG. 57 is a flow chart of a BL communication 07 operation of the intra-body microcomputer.
Figure 58:
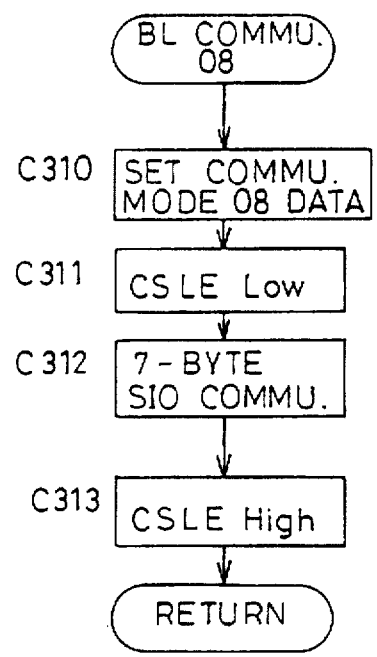
FIG. 58 is a flow chart of a BL communication 08 operation of the intra-body microcomputer.
Figure 59:
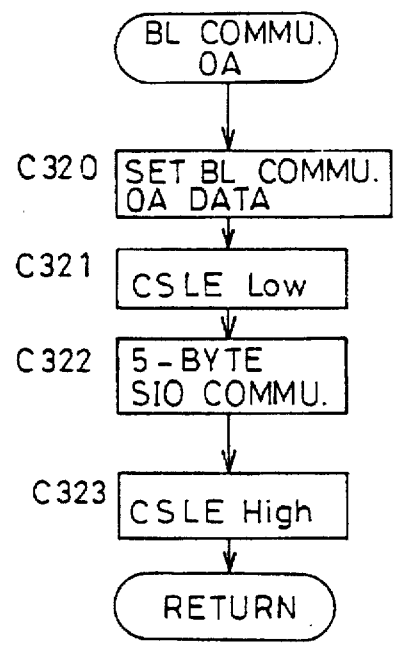
FIG. 59 is a flow chart of a BL communication 0A operation of the intra-body microcomputer.
Figure 60:
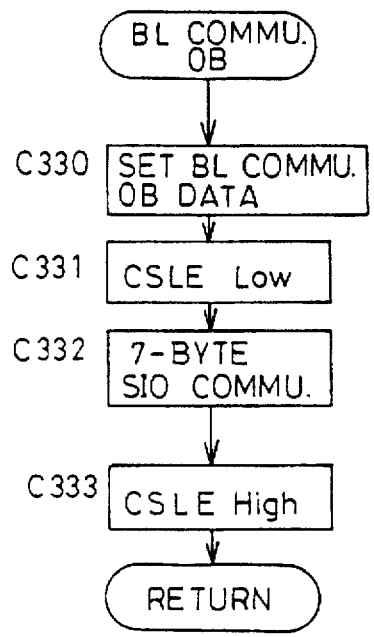
FIG. 60 is a flow chart of a BL communication 0B operation of the intra-body microcomputer.
Figure 62:
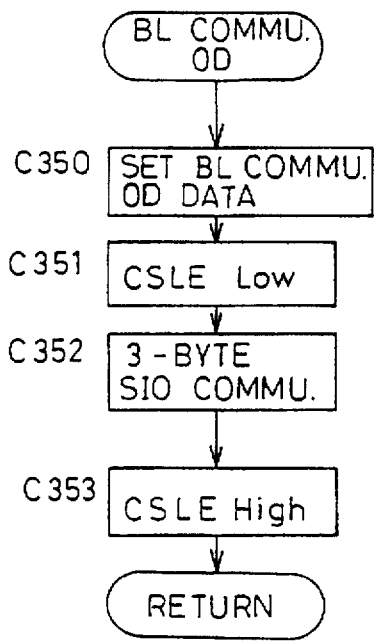
FIG. 62 is a flow chart of a BL communication 0D operation of the intra-body microcomputer.
Figure 63:
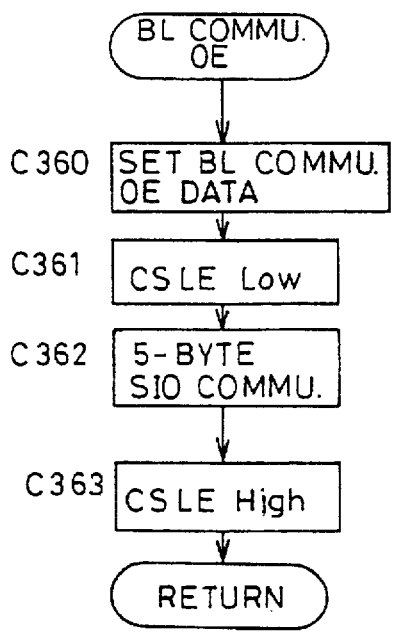
FIG. 63 is a flow chart of a BL communication 0E operation of the intra-body microcomputer.

Returning to FIG. 44, determination of the data PZEn (zoom possible/impossible flag) obtained through the BL communication 0C is made (step C112). When power zoom is impossible (that is, PZEn-0), since zoom driving is impossible, this routine is finished. When power zoom is possible (that is, PZEn-1), the BL communication 06 is performed (step C113). In the BL communication 06 whose flow is the same as that of the BL communication mode 0C except the content of transferred data as shown in FIG. 56, a zoom initialization command is transmitted to the intra-lens microcomputer µC2. Then, after the process waits 20 msec (step C114), a zoom condition of the lens is obtained through the BL communication 0B (FIG. 61, details thereof will be omitted) (step C115). Thereafter, when the zoom driving has been completed, determining that the initialization of the zoom lens is completed, this routine is finished. When the zoom driving has not been completed, the determination of the power zoom possible/impossible flag PZEN is made again through the BL communication 0C of FIG. 62 (step C117). When power zoom is impossible, this routine is finished. This is for promptly finishing operations of the intra-body microcomputer µC1 when the zoom clutch is uncoupled by the user's operation during zooming. When power zoom is possible, the process from step C114 is repeated to wait until zooming is completed.

After the zoom lens initialization is completed (step C19 of FIG. 42), whether the photographing preparation switch S1 if ON or not is determined (step C20). When it is OFF, the levels of the power control terminals PW1 and PW2 are changed to low, respectively, in order to disable the power supply transistors Tr1 and Tr2 (step C23). Thereafter, the intra- body microcomputer µC1 enters sleep condition. On the other hand, when it is determined that the photographing preparation switch S1 is ON at step C20, a subsequently-described subroutine SION is executed at step C21. Thereafter, whether a flag SIONF has been set or not id determined at step C22. When it has been set, the process returns to step C20. When it has not been set, the process proceeds to step C23. The SIONF is a flag which is set while the photographing preparation switch S1 is ON or when five seconds have not passed since the switch S1 is turned off.

In an interrupt SIINT which is applied when the photographing preparation switch S1 is turned off and again turned on, the process forms step C21 is executed.

A subroutine SION executed at step C21 will be described with reference to FIG. 45A. When the subroutine is called, a flag SIONF showing that this subroutine has been called is set, the interrupt SIINT is inhibited, and the levels of the power control terminals PW1 and PW2 is changed to high in order to enable the power supply transistors Tr1 and Tr2 (steps C130 to C132). Then, the BL communication 0C for obtaining request conditions of various switches of the lens is performed (step C133), and whether the photographing preparation switch S1 is ON or not is determined. When it is ON, a focus detection subroutine is executed (step C135).

Figure 55:
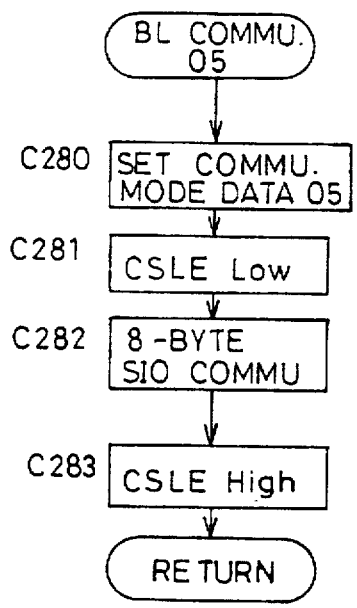
FIG. 55 is a flow chart of a BL communication 05 operation of the intra-body microcomputer.

Hereinafter, the focus detection subroutine will be described with reference to FIG. 46. First, the BL communication 04 is performed (step C160) to transmit a timing of the CCD integration to the intra-lens microcomputer µC2. In a BL communication 04 subroutine (shown in FIG. 55), first, a data used for the BL communication 04 is set, and the level of the CSLE is changed to low (steps C270 and C271). Then, whether the currently-attached lens is of old type or of new type is determined based on information obtained through the BL communication 0C (communication compatibility confirming communication) performed at step C133 of the SION routine of FIG. 45A. When it is determined to be of old type, since the CCD integration time lag Delay is unnecessary, a three-byte communication is performed (step C273). When it is determined to be of new type, since the Delay is necessary, a four-byte communication is performed (step C274). Then, after the level of the CSLE is changed to high (step C275), this routine is finished. After returning to the focus detection subroutine of FIG. 45, CCD integration is performed in the focus detection light receiving circuit AFCT (step C161). After the CCD integration is completed, optical charge accumulated in the CCD is digital-converted and inputted (data dump) (step C162). Then, information, particular to the lens, which is required for focus detection calculation is obtained through the BL communication 05 (C163), and a focus detection calculation subroutine is executed.

Figure 47:
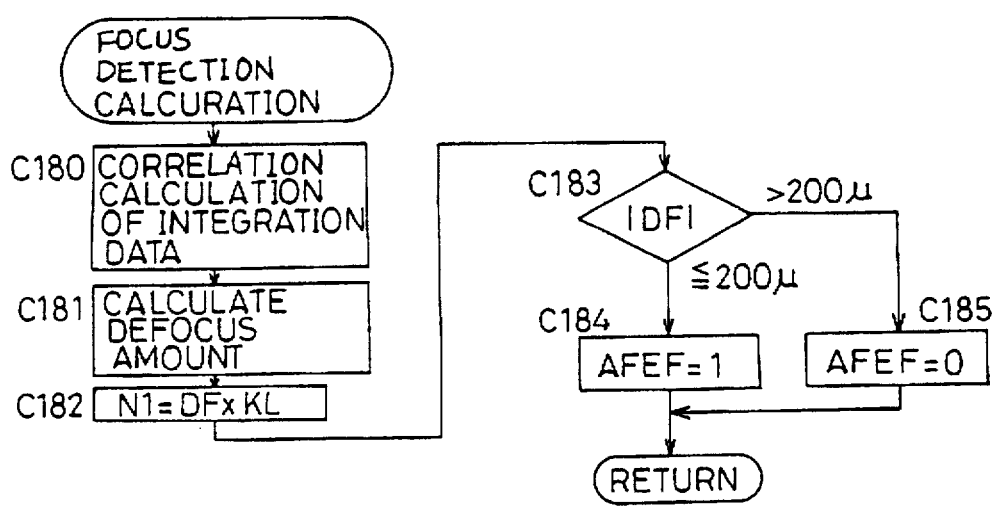
FIG. 47 is a flow chart of a distance calculation operation of the intra-body microcomputer.

The focus detection calculation subroutine is shown in FIG. 47. Correlation calculation is performed with respect to a data obtained through the CCD data dump (step C180). A description of the correlation calculation will be omitted since it is not a main point of the present invention. Then, a defocus amount is calculated based on a result of the correlation calculation (step C181), and an AF lens drive pulse count N1 is obtained by multiplying the defocus amount by the drive amount conversion coefficient KL obtained through the previously-preformed BL communication 05 (step C182). Then, whether the absolute value of the defocus amount is within as in-focus range or not is determined (step C183). In this embodiment, if the absolute value of the defocus amount is 200 μm or lower, it is determined that in-focus condition has been obtained, and a flag AEFE showing that in-focus condition has been obtained is set to 1. When the absolute value exceeds 200 μm, determining that it is outside the in-focus range, the flag AFEF is reset to 0 (step C185). Returning to FIG. 45, at step C164, determination of the flag AFEF showing that in-focus condition has been obtained is made. When it is 1, determining that in-focus condition has been obtained, an in-focus display in the finder is turned on (step C165), and this routine is finished. When the flag AFEF has been reset to 0, determining that in-focus condition has not been obtained, the in-focus display in the finder is turned off (step C166), and this routine is finished.

Figure 45A:
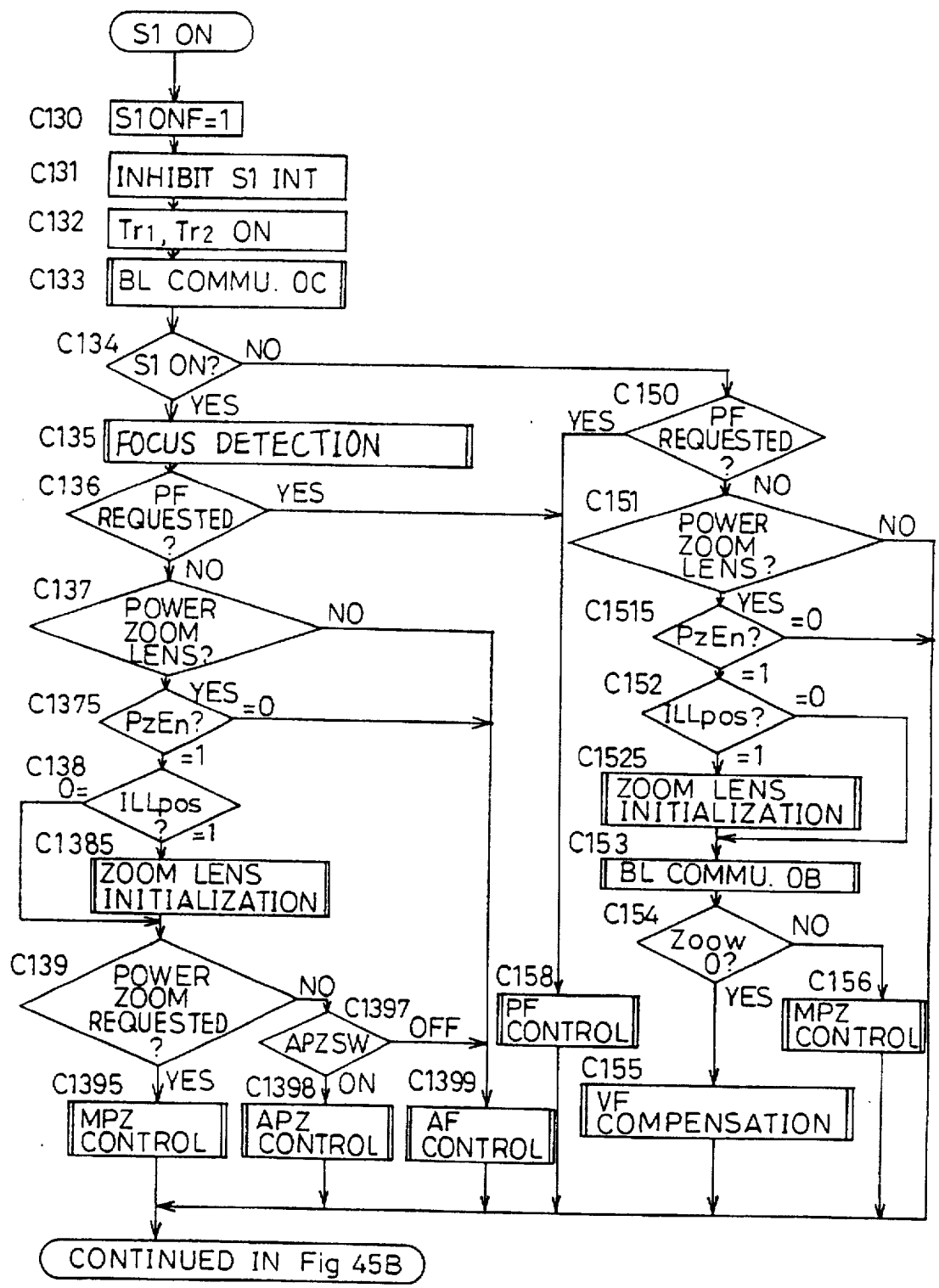
FIG. 45A is a flow chart of an SION operation of the intra-body microcomputer.
Figure 46:
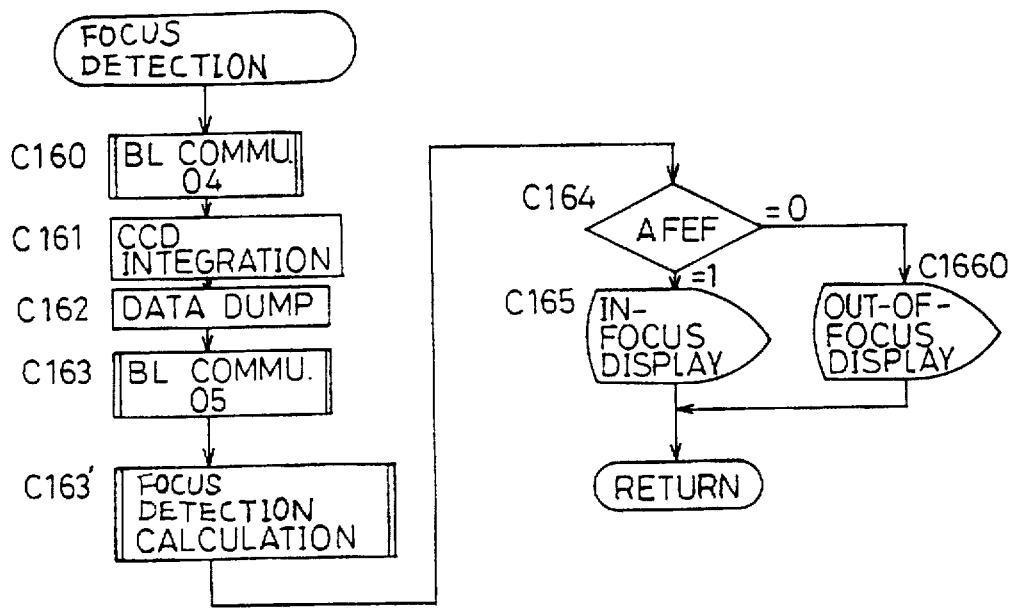
FIG. 46 is a flow chart of a focus detection operation of the intra-body microcomputer.
Figure 65:
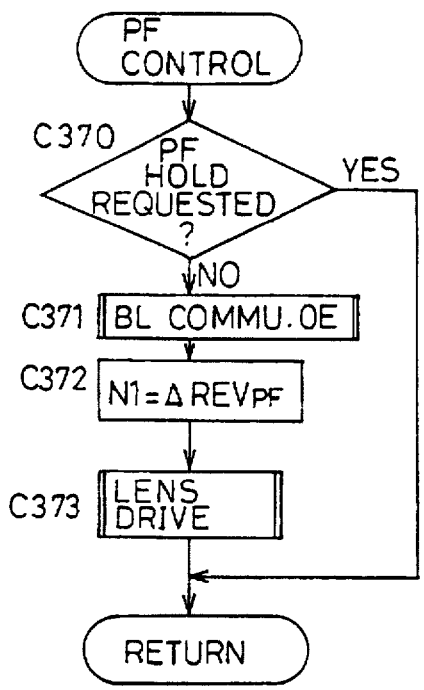
FIG. 65 is a flow chart of a PF control operation of the intra-body microcomputer.

Returning to the SION subroutine of FIG. 45A, after the process returns from the focus detection subroutine, at step C136, whether the user has operated the power focus operation member or not is determined based on the infinity and near side power focus requests ReqPFI and ReqPFN which are included in the data transmitted through the BL communication 0C previously performed at step C133. When one or both of the ReqPFI and ReqPFN are ON, a PF control routine is called to execute a power focus process (step C158). In the PF control routine (shown in FIG. 65), when the ReqPFI and ReqPFN are both 1 at step C370, determining that the focus hold operation is requested, this routine is finished without any process being executed. When only one of them is 1, determining that it is necessary to actually drive the AF coupler, the power focus drive amount ΔREVPF and the power focus drive speed PFSPD are obtained through the BL communication 0E for obtaining a power focus drive amount (step C371), the power focus drive amount ΔREVPF is set as the AF lens drive amount N1 (step C372), and the AF coupler is driven by the drive amount N1 specified by the ΔREFPF at a speed specified by the PFSPD through a lens drive routine (not shown) (step C373). Then, this routine is finished.

Figure 64:
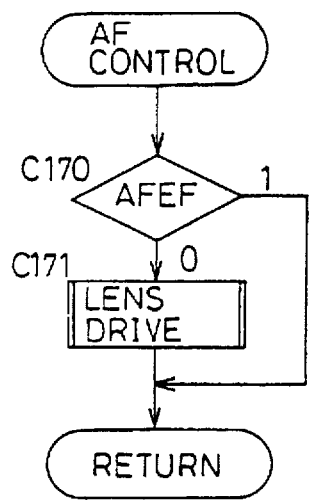
FIG. 64 is a flow chart of an AP control operation of the intra-body microcomputer.

Subsequently, a case where it is determined that power focus has not been requested at step C136 of the SION subroutine of FIG. 45A will be described. When this happens, whether a power zoom lens is attached or not is determined (step C137). When a power zoom lens is not attached, or even if a power zoom lens is attached, when the power zoom possible/impossible flag PZEN obtained at step C133 is determined to be 0 (power zoom is impossible) (step C1375), an AF control routine is executed (step C1399). In the AF control routine (shown in FIG. 64), first, determination of focusing condition is made (step C170). When the flag AFEF showing that in-focus condition has been obtained is 1, determining that in-focus condition has been obtained, the process returns since it is unnecessary to drive the AF lens. When the flag AFEF is 0, determining that in-focus condition has not been obtained, the lens drive routine (not shown) is called (step C171). Thereafter, this routine is finished.

Returning to the description of the SION routine, after power zoom is determined to be possible at step C1375, at step C138, whether zoom inside condition of the power zoom lens is uninitialized or not is determined by the flag ILLpos obtained through the previously-performed BL communication 0C (step C133). When it is uninitialized, the zoom lens is initialized (step C1385). The ILLpos is a flag which is set to 1 when the zoom lens is uninitialized (that is, when the zoom position counter ZpNow provided in the lens does not hold a correct value). It is also set to 1 when the zoom position counter ZpNow does not hold a correct value because the zoom lens has forcibly been moved by external force or when the zoom clutch is uncoupled by the user's operation. Therefore, when the zoom lens is forcibly moved by external force or when the zoom clutch which was uncoupled is coupled again, the lens inside condition of the zoom lens is returned to a correct condition through this sequence. Thereafter, when it is determined that power zoom has been requested by the power zoom request flags ReqZT and ReqZW obtained through the previously-performed BL communication 0C (step C133), an MPZ control of step C1395 is performed. When there is no power zoom request, whether the switch AFZSW is ON or not is determined (step C1397). When it is ON, an APZ control of step C1398 is performed. When it is OFF, the AF control of step C1399 is performed.

Figure 48:
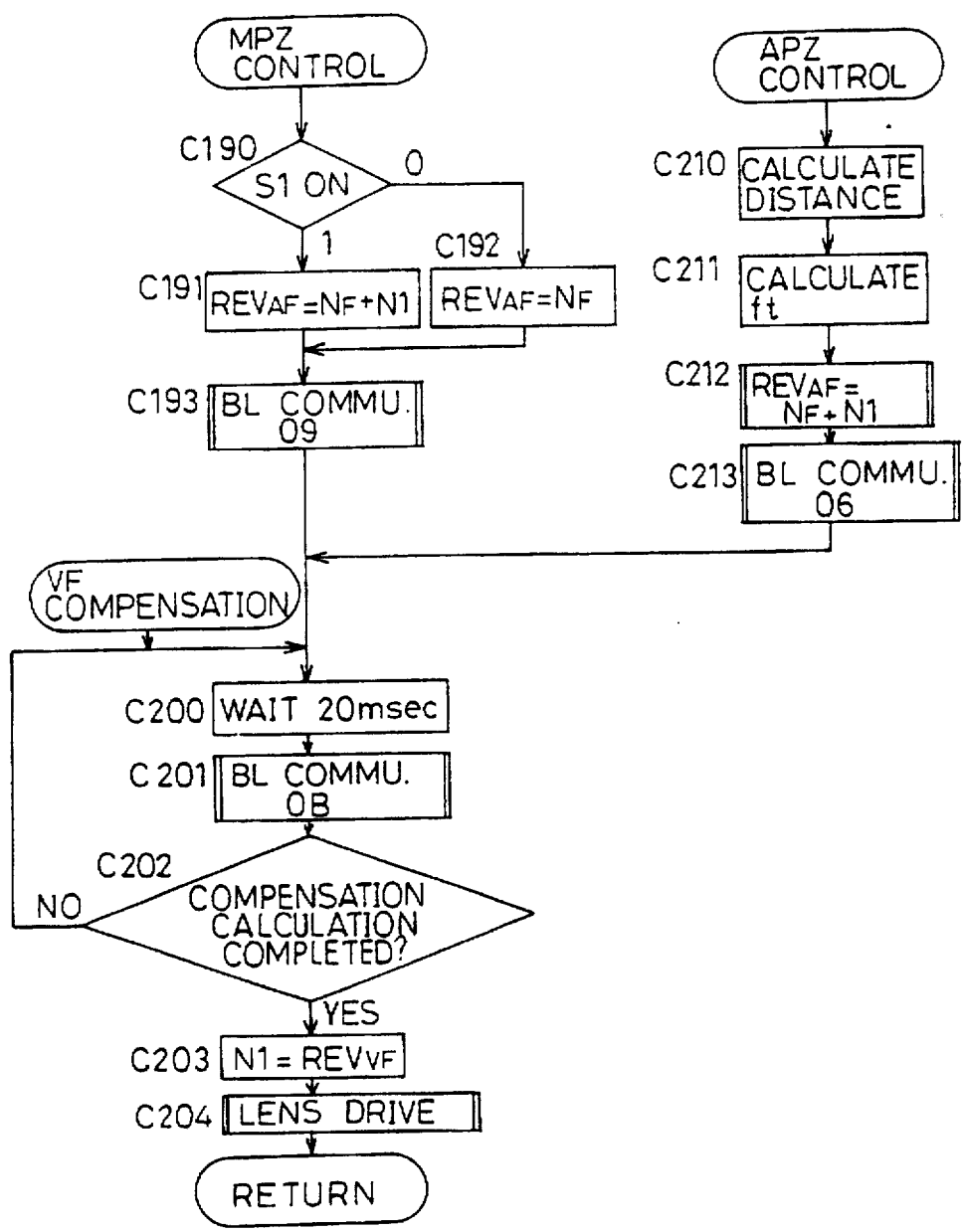
FIG. 48 is a flow chart of an WPZ control operation of the intra-body microcomputer.

An MPZ control routine and an APZ control routine will be described with reference to FIG. 48. First, in the MPZ control routine, whether the photographing preparation switch S1 is ON or not is determined at step C190. When the switch S1 is ON, the data REVAF which is used for varifocal compensation calculation is set to NF+N1 so that the focus detection result influences the REVAF (step C191). When the switch S1 is OFF, the REVAF is set to NF in order to hold a current in-focus position (step C192). NF is a current AF lens moving-out amount. N1 is an AF lens moving-out amount previously obtained through focus detection calculation. Thereafter, a manual zoom permission is provided to the intra-lens microcomputer μC2 through the BL communication 09 (step C193) so that the intra-lens microcomputer μC2 starts varifocal compensation calculation. Then, after the process waits 20 msec (step C200), a varifocal compensation calculation result is obtained through the BL communication 0B (step C201). In this case, determination of the varifocal compensation calculation flag CalcREV obtained through the BL communication 0B is made at step C202. When it is determined that the calculation has not been completed (that is, when CalcREV=0), the process returns to step C200 to perform the BL communication 0B again, and waits until the calculation is completed. When the calculation is completed, the varifocal compensation drive amount REVVF obtained through the BL communication 0B is set as the AF lens moving-out amount N1 (step C203), and the lens drive routine for driving the AF routine is called (step C204). Then, this routine is finished.

In the APZ routine, distance is calculated based on an AF lens moving-out amount obtained through focus detection and the current moving-out amount N1 (step C210). Based on the distance, an appropriate focal length f1 is calculated (step C211). Concerning a method of calculating the target focal length f1, various methods are available according to photographing scenes (such as a moving subject and a person). However, a description thereof will be omitted since it is not a subject matter of the present invention. Then, a zoom command where a target focal length is specified is transmitted to the intra-lens microcomputer μC2 through the BL communication 08 (step C213) based on the calculated target focal length f1 and the in-focus position moving-amount REVAF obtained at step C212. The sequence executed thereafter is the same as that of the MPZ control routine.

Subsequently, a case will be described where the switch S1 is determined to be OFF at step C134 of the SION subroutine of FIG. 46A. First, whether power focus has been requested or not is determined by the data ReqPFI and ReqPFN obtained through the BL communication 0C performed at step C133 (step C150). When it has been requested, the PF control routine is called (step C158). When it has not been requested, if a power zoom lens is not attached, or even if a power zoom lens is attached, when power zoom is impossible, this routine is finished (steps C151 and C1515). When power zoom is possible, determination of the ILLpos flag obtained through the BL communication 0C is made. When it is 1, the zoom lens is initialized (steps C152 and C1525). Whether the zoom lens is to be initialized or not is determined by the flag ILLpos for the same reason as that of step s C138 to C1385 executed when the switch S1 is ON.

Figure 49:
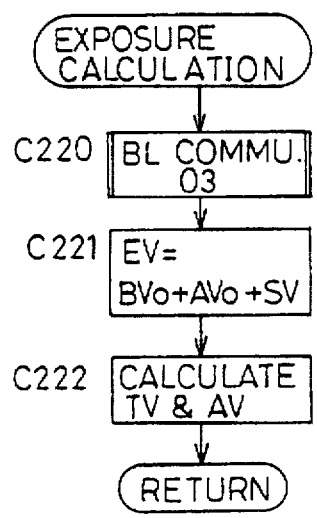
FIG. 49 is a flow chart of an exposure calculation operation of the intra-body microcomputer.

Thereafter, determination of the flags MovingT and MovingW showing that the zoom lens is moving is made through the BL communication 0B (step C153). When the zoom lens is not moving, the above-described MPZ routine is called (step C156). In this case, the BL communication 04 (communication for transmitting a focus detection timing to the intra-lens microcomputer μC2) performed by the intra-lens microcomputer μC2 is not performed. This is because AF lock has been made based on a result of focus detection performed under ON condition of the switch S1. Varifocal compensation calculation is performed based on the focus detection. When the zoom lens is moving, only varifocal compensation driving is performed (step C156). Since the VF compensation routine (shown in FIG. 49) is the same as the latter part of the above-mentioned APZ control and MPZ control routines, which has already been described, where a varifocal compensation driving amount is obtained to drive the AF lens according to the driving amount, it is not described here.

Figure 50:
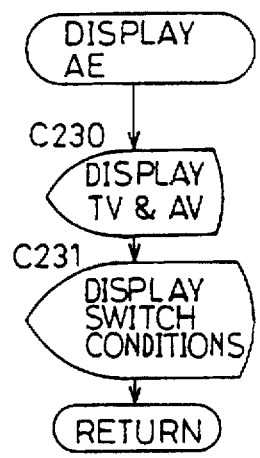
FIG. 50 is a flow chart of a display AE operation of the intra-body microcomputer.

A flow, of the SION routine, executed after the process returns from the MPZ control, APZ control, AF control and PF control routines will be described with reference to FIG. 45B. First, a film sensitivity SV and a subject luminance BV0 obtained through exposure measurement at open aperture are inputted (steps C140 and C141), and exposure calculation is performed (step C142). In an exposure calculation routine (shown in FIG. 49), all the particular data used for exposure calculation of the lens are obtained through the BL communication 03 (step C220), and an exposure value EV is calculated by EV=BV0+AV0+SV (step C221). AV0 is a minimum F number (AV value), of the lens, obtained through the BL communication 03 of step C220. Based on the exposure value EV, a shutter speed TV and an aperture value AV are calculated according to a predetermined AE program (step C222). Then, the process returns. An AE program chart thereof and a description thereof will be omitted since they are irrelevant to the present invention. After the exposure calculation is completed, the process proceeds to step C1425, where a display AE subroutine (shown in FIG. 50) is executed. In the display AE subroutine, data showing the shutter speed TV and the aperture value AV are serially outputted to the display control circuit DISPC, and the display control circuit DISPC provides a predetermined display on the body display portion 14 and the finder display portion (steps C230 and C231).

Figure 45B:
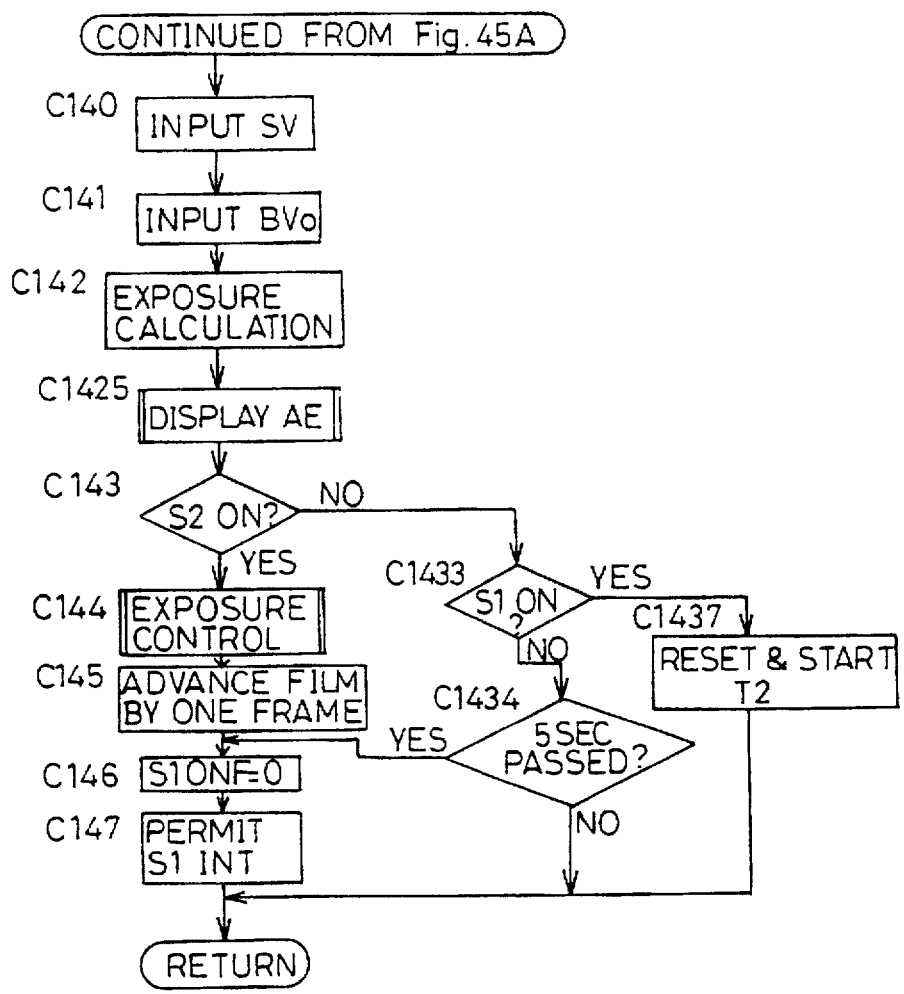
FIG. 45B is a flow chart of an SION operation of the intra-body microcomputer.
Figure 51:
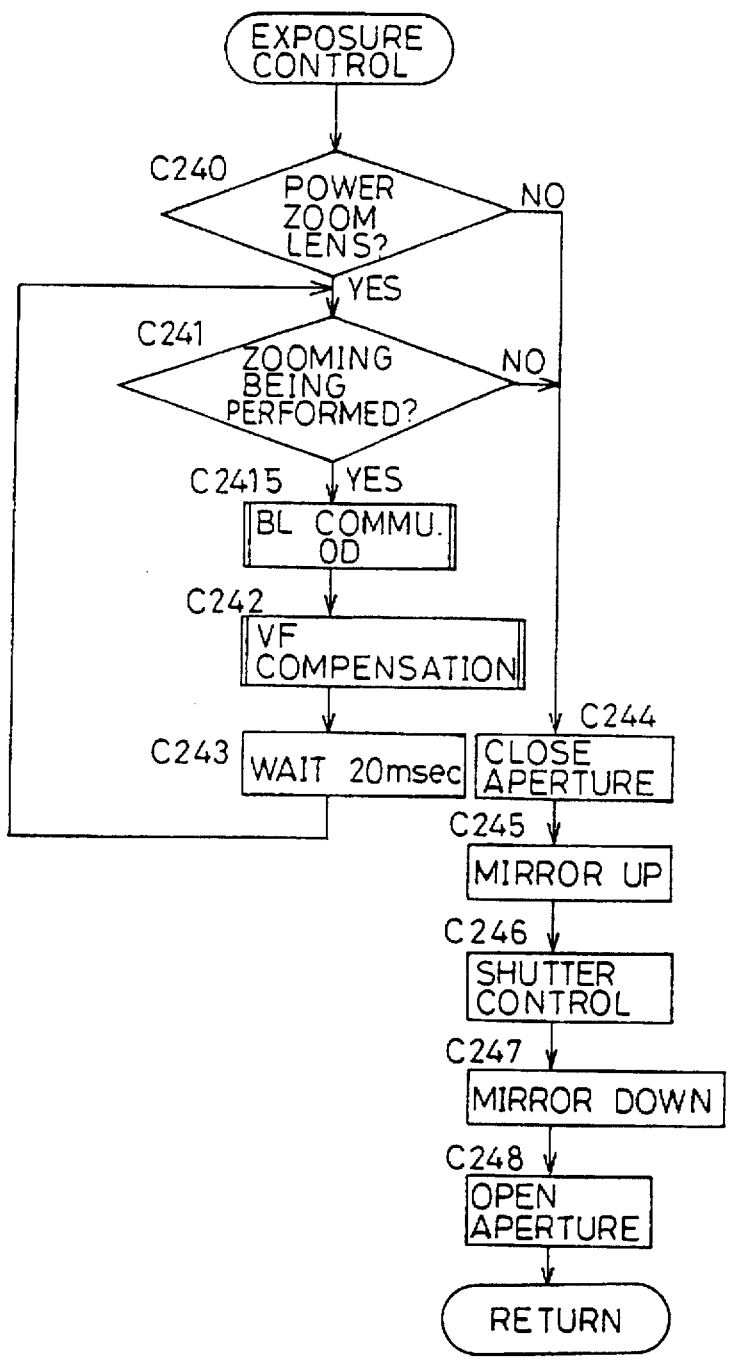
FIG. 51 is a flow chart of an exposure control operation of the intra-body microcomputer.

Returning to the SION routine of FIG. 45B, at step C143, whether the release switch S2 is ON or not is determined. When it is ON, an exposure control routine is executed (step C144). The exposure control routine is shown in FIG. 51. In this routine, first, whether the attached lens is a power zoom lens or not is determined (step C240). When it is not a power zoom lens, the process proceeds to the sequence from step C244. When it is a power zoom lens, whether zooming is being performed or not is determined (step C244). When zooming is stopped, the process proceeds to the sequence from step C244. When zooming is being performed, a stop command is transmitted to the intra-lens microcomputer μC2 through the BL communication 0D (step C2415), and thereafter, the above-mentioned VF compensation routine is called to perform varifocal compensation driving (step C242). After waiting 20 msec, the process returns to step C241. Thereafter, the process waits until zooming is stopped while repeating the above-described sequence until zooming is stopped. The process waits until zooming is stopped in order to prevent focus deviation caused by a movement of the image plane on the exposure plane due to zooming. The sequence from step C244 will be described. The aperture is closed to an aperture shown by the control aperture value AV (step C244), and mirror up, shutter control and mirror down are performed (steps C245 to C247). Then, the aperture is returned to open aperture to finish a release operation (step C248), and the process returns.

After the process returns from the exposure control routine, film is advanced by one frame (step C145), the flag SIONF is reset to 0 (step C146), an S1 interrupt is permitted (step C147), and the SION routine is finished. Subsequently, a case will be described where the switch S2 is determined to be OFF at step C143 of the SION routine. When the switch S2 is OFF, first, whether the switch S1 is ON or not is determined (step C1433). When it is ON, after a timer T2 is reset and started (step C1437), the process returns. When the switch S1 is OFF, whether or not five seconds have passed since the timer T2 was started is determined (step C1434). When five seconds have not passed yet, the process returns and the SION routine is again called through the determination of step C22 of FIG. 44. When five or more seconds have passed, determining that the user does not intend to perform photographing, the flag SIONF is reset to 0 so that the SION subroutine is not perform any more (step C146), and the interrupt SIINT for enabling the activation by the next turning on of the switch S1 is permitted (step C147). Then, the process returns.

Subsequently, the sequence, of the main routine of FIG. 42, executed when the main switch SM is OFF will be described. After interrupts other than the main switch interrupt SMINT is inhibited at step C30 so that interrupts such as the photographing preparation switch interrupt SIINT are not applied. BL communication compatibility is confirmed through the BL communication 02 (step C31). This is for determining whether a power zoom lens is attached or not also at the time of battery change which is made when the main switch is OFF. Thereafter, at step C32, determination of the flag RSTF showing that the process has passed the reset routine (that is, the hardware is reset because of the battery attachment) is made. When the flag RSTF is 1. It is reset to 0 (step C40), and the levels of the power control terminals PW1 and PW2 are changed to low in order to disable the transistors Tr1 and Tr2 for supplying power to the circuits provided in the camera and the zoom motor M3 provided in the lens (step C36). Then, the level of the terminal PW0 is changed to low in order to disable the DC/DC converter DD (step C37), and the intra-body microcomputer μC1 enters sleep condition. When the flag RSTF is 0 at step C32, the AF lens is moved-in until the lens length is minimum so that the camera body/lens are compact enough for storage (step C34), and zoom minimum position driving is performed (step C35). The process executed thereafter is the same as that executed when the flag RSTF is 1.

Figure 44:
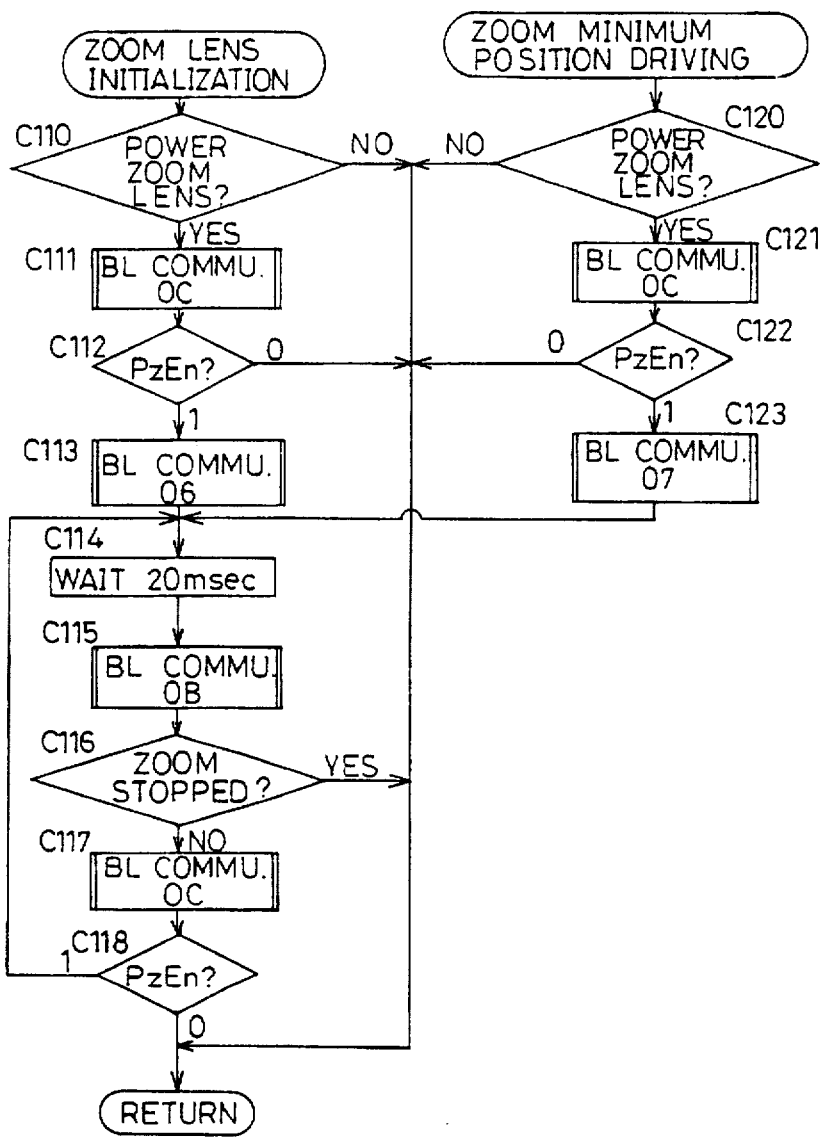
FIG. 44 is a flow chart of an AP lens moving-in operation of the intra-body microcomputer.

The zoom minimum position driving will be described with reference to FIG. 44. The sequence from steps C120 to C122, which is the same as the sequence of the zoom lens initialization command, is a determination for performing zooming only when the zoom lens is enabled to move. A description of details thereof is omitted here since it has already been described. Then, after a zoom command for moving the zoom lens to a minimum lens length position is provided, through the BL communication 07, to the intra-lens microcomputer μC2 to start zooming, the process waits until zooming is completed through the sequence, from steps C114 to C118, which is the same as that of the zoom initialization.

Subsequently, a description of the varifocal compensation calculation performed in the flows of this embodiment will be given. FIG. 66 is a view for explaining the varifocal compensation calculation.

A focusing lens moving-out amount x is generally defined by $$x = F(D) \quad (4)$$

Considering a case where the optical system is a varifocal lens system, since $F(\ )$ is a function of a focal length f in this case, $$x(f) = F(D, f)$$

$$D = F^{-1}(x(f), f) \quad (5)$$

where $F^{-1}(x(f), f)$ is an inverse function of $F(\ )$. When the object distance D=const, the following equation (6) is obtained with respect to arbitrary focal lengths $f_1$ and $f_2$ by the equation (5):

$$x(f_2) = F(D, f_2)$$

$$= F(F^{-1}(x(f_1), f_1), f_2) \quad (6)$$

The equation (6) shows that a moving-out amount $x(f_2)$ obtained when the zoom lens is moved until the arbitrary focal length $f_2$ is obtained can be calculated if a focusing lens moving-out amount $x(f_1)$ obtained at the focal length $f_1$ is found.

With respect to a varifocal lens, a focusing lens moving-out amount $x(f)$ is approximated as follows:

$$x(f) = \frac{c(f)}{D - Q(f)} + OFS(f) = F(D, f) \quad (7)$$

where C, Q, OFS are constants dependent on a focal length which is particular to the lens system. Based on the approximating equation (7), the varifocal compensation calculation is performed by $$x(f_2) = \frac{c(f_2)}{\frac{c(f_1)}{x(f_1) - OFS(f_1)} + Q(f_1) - Q(f_2)} + OFS(f_2) \quad (8)$$

where $x(f_1)$ is a focusing lens moving-out amount obtained at the focal length f, and c(f), Q(f) and OFS (f) are constants dependent on the focal length which is particular to the lens system.

Figure 67A:
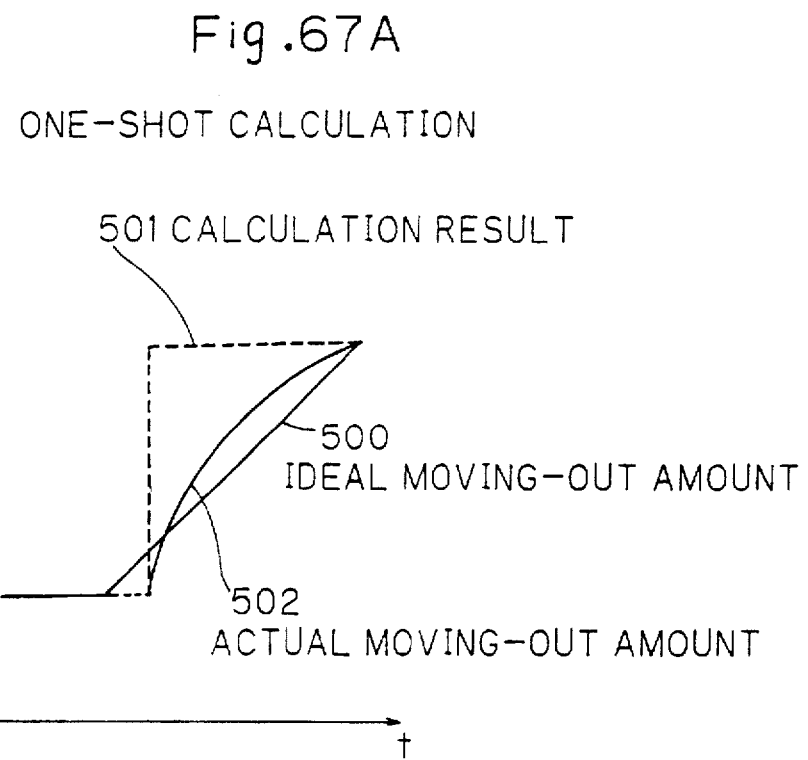
FIGS. 67A and 67B graphically show manners of pursuit of in-focus condition in a one-shot calculation and in a continuous calculation, respectively.
Figure 67B:
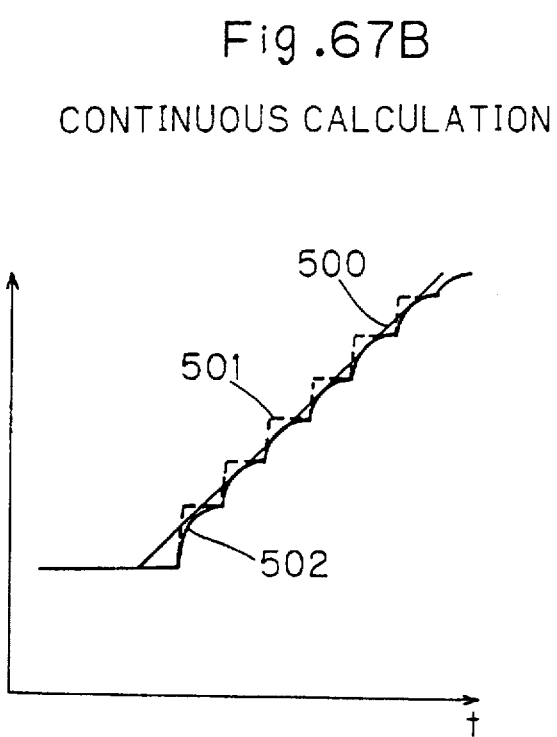

Letting $f_1$ and $f_2$ be a focal length obtained before zooming and a focal length obtained after or during zooming, respectively, the varifocal compensation calculation is performed by use of the equation (8). In FIGS. 67A and 67B, the numeral 500 represents an ideal moving-out amounts; the numeral 501 represents a calculation results; and the numeral 502 represents actual moving-out amounts.

Table 1 shows kinds of the varifocal compensation calculation. FIGS. 67A and 67B graphically show manners of the pursuit of in-focus condition in the one-shot calculation and in the continuous calculation, respectively.

(a) One-shot Calculation

The one-shot calculation is performed, while APZ is being driven, with respect to a target focal length specified by the camera body. In the one-shot calculation, although a final compensation driving position is immediately calculated, so compensation calculation is performed with respect to positions before the target focal length is obtained. The on-shot calculation is suitable for obtaining a large magnification change for a short period of time.

(b) Continuous Calculation

In this embodiment, an estimating calculation is performed as the continuous calculation during normal zooming.

In the continuous calculation, a zoom position to be reached in the near future is estimated from a zoom drive speed based on the current lens position. Based on the estimation value, the varifocal compensation calculation is repeated until the zoom lens is stopped. The continuous calculation is suitable for a case where importance is attached to a view looked through the finder (that is, a case where only a few blurs are caused within the finder), sine calculation is repeated so that in-focus condition can always be pursued in the continuous calculation.

As described above, OFS(f), C(f) and Q(f) of the equation (8) are values particular to an optical system, and vary depending on each product (or each production set).

If the values are calculated with respect to each product and are stored in an E²PROM (electrically erasable programmable read only memory) (the E²PROM may externally be attached or may be included by the microcomputer), compensation can be made with an excellent accuracy.

Since the values vary as the focal length varies, new values are continuously stored in the E²PROM according to the variation.

In a case where the continuous variation is obtained by a predetermined calculation expression, the expression is stored in a ROM, and an error with respect to each product is stored in the E²PROM.

In a case where the continuous variation cannot be obtained by a calculation expression, a discrete measurement value is stored in the E²PROM every time the focal length varies by a predetermined value, and linear interpolation of the measurement value is performed.

Of the above-mentioned three particular values, OFS(f) varies according to the zoom direction. The variation is caused by a backlash between gears and a play of a zoom mechanism (the play is provided by providing a mechanical looseness. If the play were reduced, the lens driving by the motor could not smoothly be performed). In this case, a data relating to the zoom direction (from the telephoto side to the wide side or from the wide side to the telephoto side) is also stored in the E²PROM every time the focal length varies by the predetermined value.

That is, OFS is calculated from: OFS($f_1$) obtained every time the focal length ($f_1$) is obtained; and an adjustment value of OFS which value is obtained every time the focal length varies by the predetermined value (this variation includes a variation in direction). In a case where the value is discrete, interpolation is performed to make the value continuous.

TABLE 1

VARIFOCAL COMPENSATION CALCULATION KIND

| Calculation kind | Usage |
| --- | --- |
| One-shot-type calculation | One-shot calculation is specified during APZ 150% finder |
| Continuous-type calculation (Estimating calculation) | Continuous calculation is specified during APZ Normal MPZ |
| Continuous-type calculation (Not estimating calculation) | When room stop is requested during MPZ (under SW OFF condition) |

Obviously, many modifications and variations of the present invention are possible in light of the above teachings, it is therefore to be understood that within the scope of the appended claims, the invention may be practiced other than as specifically described.

What is claimed is:

1. A camera system including a camera body and an interchangeable lens, comprising:

a first controller which is provided in the camera body and which controls an operation of the camera body;

a second controller which is provided in the interchangeable lens and which controls an operation of the interchangeable lens;

a communication circuit which performs data communication between said first controller and said second controller;

a type discriminator which determines that the camera body is one of a plurality of types; and a communication controller which changes the manner of data communication between the interchangeable lens and the camera body through said communication circuit, in dependence upon the camera body type determined by said type discriminator.

2. A camera system as claimed in claim 1, wherein said type discriminator determines data that the camera body can produce.

3. A camera system as claimed in claim 1, wherein said communication controller changes the king of data to be communicated.

4. A camera system as claimed in claim 1, wherein said communication controller changes the amount of data to be communicated.

5. A camera system as claimed in claim 1, wherein said interchangeable lens has a microcomputer comprising said second controller and said communication controller.

6. A camera system as claimed in claim 5, wherein said microcomputer also comprises said type discriminator.

7. An interchangeable lens attachable to a camera body, comprising:

a controller which controls an operation of said interchangeable lens;

a communication circuit which performs data communication between a controller provided in a camera body and said lens controller;

a receiving circuit which receives from a camera body a signal representing the type of camera body to which the interchangeable lens is attached; and a communication controller which changes the manner of data communication between the interchangeable lens and the camera body through said communication circuit, based on said signal representing the type of camera body which is received by said receiving circuit.

8. An interchangeable lens as claimed in claim 7, wherein said communication controller changes to the kind of data to be communicated.

9. An interchangeable lens as claimed in claim 7, wherein said communication controller changes the amount of data to be communicated.

10. An interchangeable lens as claimed in claim 7, wherein said interchangeable lens has a microcomputer comprising said controller and said communication controller.

11. A camera system including a camera body and an interchangeable lens that can communicate data between one another, comprising:

a controller which controls an operation of the camera body;

a communication circuit which performs data communication between a controller provided in the interchangeable lens and said camera body controller;

an output circuit which outputs to the interchangeable lens a signal which discriminates one type of camera body from another type of camera body; and a communication controller, responsive to said signal, which controls the manner of data communication between the interchangeable lens and the camera body, wherein, based on the signal representing the type of camera body, said interchangeable lens changes the kind of data to be communicated.

12. A camera system including an interchangeable lens and a camera body, comprising:

a manually operated operation member provided in the interchangeable lens;

a first output circuit provided in the interchangeable lens, which outputs a plurality of kinds of data to said camera body, said plurality of kinds of data including first data indicating whether said operation member has been operated, and data related to an operation of said operation member;

a second output circuit provided in the camera body, which outputs to the interchangeable lens a request signal for requesting said first data;

a communication controller provided in the interchangeable lens, which controls said first output circuit so as to output only said first data to the camera body when said request signal is outputted by said second output circuit; and a controller provided in the camera body, which controls an operation of the camera body based on data output by said first output circuit.

13. A camera system including an interchangeable lens and a camera body, comprising:

a manually operated operation member provided in the interchangeable lens;

a first output circuit provided in the interchangeable lens, which outputs a plurality of kinds of data to said camera body, said plurality of kinds of data including first data which indicates whether said operation member has been operated;

a second output circuit provided in the camera body, which outputs to the interchangeable lens a request signal for requesting said first data;

a communication controller provided in the interchangeable lens, which controls said first output circuit so as to output only said first data to the camera body when said request signal is output by said second output circuit; and a controller provided in the camera body, which controls an operation of the camera body based on data output by said first output circuit.

14. A camera system as claimed in claim 13, wherein said first output circuit outputs a plurality of said first data.

15. A camera system including an interchangeable lens and a camera body, comprising:

a manually operated operation member provided in the interchangeable lens;

a first output circuit provided in the interchangeable lens and operating in a plurality of modes, which outputs data to said camera body, said plurality of modes including a first mode where only first data indicating whether said operation member has been operated, and data related to an operation of said operation member is output and a second mode where second data which is a data other than said first data is output;

a second output circuit provided in the camera body, which outputs to said interchangeable lens a request signal for requesting said first mode of operation;

a communication controller provided in the interchangeable lens, which causes said first output circuit to operate in the first mode when said request signal is outputted by said second output circuit; and a controller provided in the camera body, which controls an operation of the camera body based on data output by said first output circuit.

16. A camera system including an interchangeable lens and a camera body, comprising:

an operation member provided in the interchangeable lens;

a first output circuit provided in the interchangeable lens and operating in a plurality of modes, which outputs data to said camera body, said plurality of modes including a first mode where only first data which indicates whether said operation member has been operated is output and a second mode where second data which is a data other than said first data is output;

a second output circuit provided in the camera body, which outputs to said interchangeable lens a request signal for requesting said first mode;

a communication control device provided in the interchangeable lens, which causes said first output circuit to operate in the first mode when said request signal is output by said second output circuit; and a control device provided in the camera body, which controls an operation of the camera body based on a data output by said first output circuit.

17. A camera system as claimed in claim 16, wherein said first output circuit outputs a plurality of said first data in the first mode.

18. An interchangeable lens attachable to a camera body, comprising:

a manually operated operation member;

an output circuit operating in a plurality of modes, which outputs data to said camera body, said plurality of modes including a first mode where only first data indicating whether said operation member has been operated is output and a second mode where second data which is data other than said first data is output;

a receiving circuit which receives a request signal from a camera body for requesting the first mode of operation; and a communication controller which causes said first output circuit to operate in the first mode when said receiving circuit receives said request signal.

19. An interchangeable lens as claimed in claim 18, wherein said output circuit outputs a plurality of said first data in the first mode.

* * * * *